United States Patent
McClave et al.

(10) Patent No.: US 10,997,633 B2
(45) Date of Patent: May 4, 2021

(54) CROWDSOURCE AND CONVERSATIONAL CONTEXTUAL INFORMATION INJECTION APPARATUSES, METHODS AND SYSTEMS

(71) Applicant: Click Sales Inc., Boise, ID (US)

(72) Inventors: Christopher Robert McClave, Westminster, CO (US); Christopher Edward Haffey, Denver, CO (US); Edward Katzin, Boise, ID (US); Andrew Hust, Littleton, CO (US); Vera Coberley, Arvada, CO (US)

(73) Assignee: Click Sales, Inc., Boise, ID (US)

( * ) Notice: Subject to any disclaimer, the term of this patent is extended or adjusted under 35 U.S.C. 154(b) by 652 days.

(21) Appl. No.: 15/610,581

(22) Filed: May 31, 2017

(65) Prior Publication Data
US 2018/0053221 A1    Feb. 22, 2018

Related U.S. Application Data

(60) Provisional application No. 62/378,186, filed on Aug. 22, 2016, provisional application No. 62/378,188, (Continued)

(51) Int. Cl.
*G06Q 30/02* (2012.01)
*H04L 29/08* (2006.01)
(Continued)

(52) U.S. Cl.
CPC ..... *G06Q 30/0274* (2013.01); *G06Q 30/0201* (2013.01); *G06Q 30/0214* (2013.01);
(Continued)

(58) Field of Classification Search
CPC ............................. G06Q 40/06; G06Q 50/01
See application file for complete search history.

(56) References Cited

U.S. PATENT DOCUMENTS 9,219,787 B1 * 12/2015 Manion ................. H04L 67/142
2007/0143186 A1    6/2007 Apple
(Continued)

FOREIGN PATENT DOCUMENTS

WO      2009029940       3/2009
WO   WO-2009029940 A1 *  3/2009  ......... G06Q 30/0641

OTHER PUBLICATIONS

Aaron Cahn, et al. An Empirical Study of Web Cookies, Apr. 2016 (Year: 2016).*

*Primary Examiner* — E Carvalho
(74) *Attorney, Agent, or Firm* — Hanchuk Kheit LLP; Walter G. Hanchuk

(57) ABSTRACT

The Crowdsource and Conversational Contextual Information Injection Apparatuses, Methods and Systems ("CCCII") transforms communication data, advertising link click request, campaign generation request, campaign search request, campaign investment request inputs via CCCII components into commission settlement, vendor ad campaign data, campaign search response, campaign investment confirmation, campaign control outputs. A tracking link request is obtained from a source communication channel. A match target for the contents is determined, and an attribution link is retrieved. A tracking link configured to identify the source channel and the attribution link is generated and provided to the source channel. A tracking link click request is obtained from the receiving user. The tracking link is analyzed to determine the source channel and the attribution link. A tracking cookie is placed on the receiving user's client. The attribution link is configured using the pixel drop data. The receiving user's client is redirected to the configured attribution link.

17 Claims, 20 Drawing Sheets

Related U.S. Application Data filed on Aug. 22, 2016, provisional application No. 62/378,192, filed on Aug. 22, 2016.

(51) Int. Cl.
*G06Q 40/06* (2012.01)
*G06Q 50/00* (2012.01)

(52) U.S. Cl.
CPC ..... *G06Q 30/0246* (2013.01); *G06Q 30/0249* (2013.01); *G06Q 30/0277* (2013.01); *G06Q 40/06* (2013.01); *G06Q 50/01* (2013.01); *H04L 67/146* (2013.01); *H04L 67/22* (2013.01); *H04L 67/306* (2013.01)

(56) References Cited

U.S. PATENT DOCUMENTS

| | | |
|---|---|---|
| 2011/0167005 A1 | 7/2011 | Camelio |
| 2012/0054143 A1* | 3/2012 | Doig ................ G06Q 30/0269 706/47 |
| 2014/0164049 A1 | 6/2014 | Yakos |
| 2014/0207567 A1 | 7/2014 | Gould |
| 2014/0279682 A1 | 9/2014 | Feldman |
| 2014/0337513 A1* | 11/2014 | Amalapurapu ......... H04L 67/22 709/224 |
| 2016/0019598 A1* | 1/2016 | Harrison ............ G06Q 30/0275 705/14.71 |
| 2016/0225037 A1 | 8/2016 | Ezumba |
| 2017/0093759 A1* | 3/2017 | Wistow ............... H04L 67/2847 |

* cited by examiner

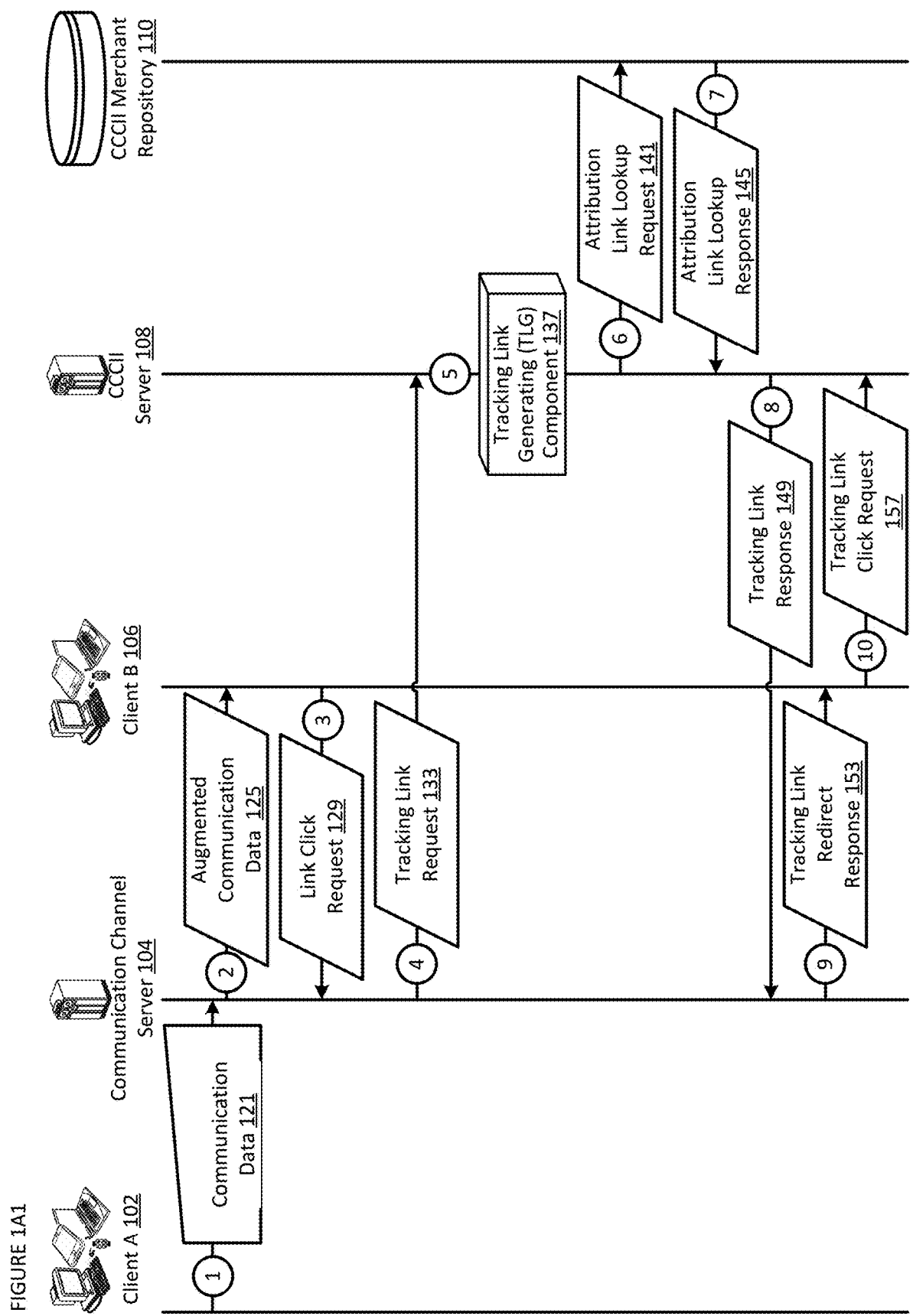
FIGURE 1A1

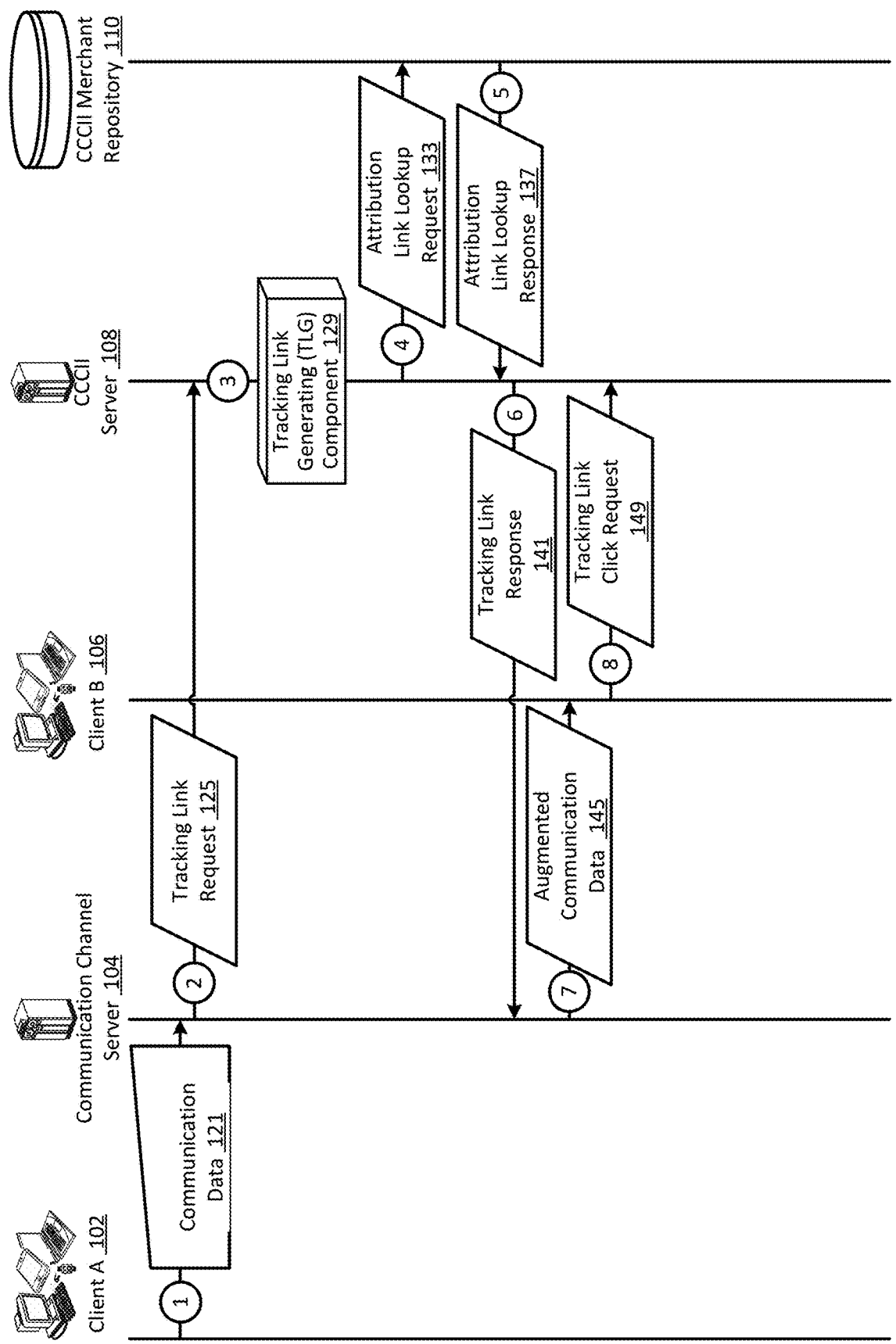
FIGURE 1A2

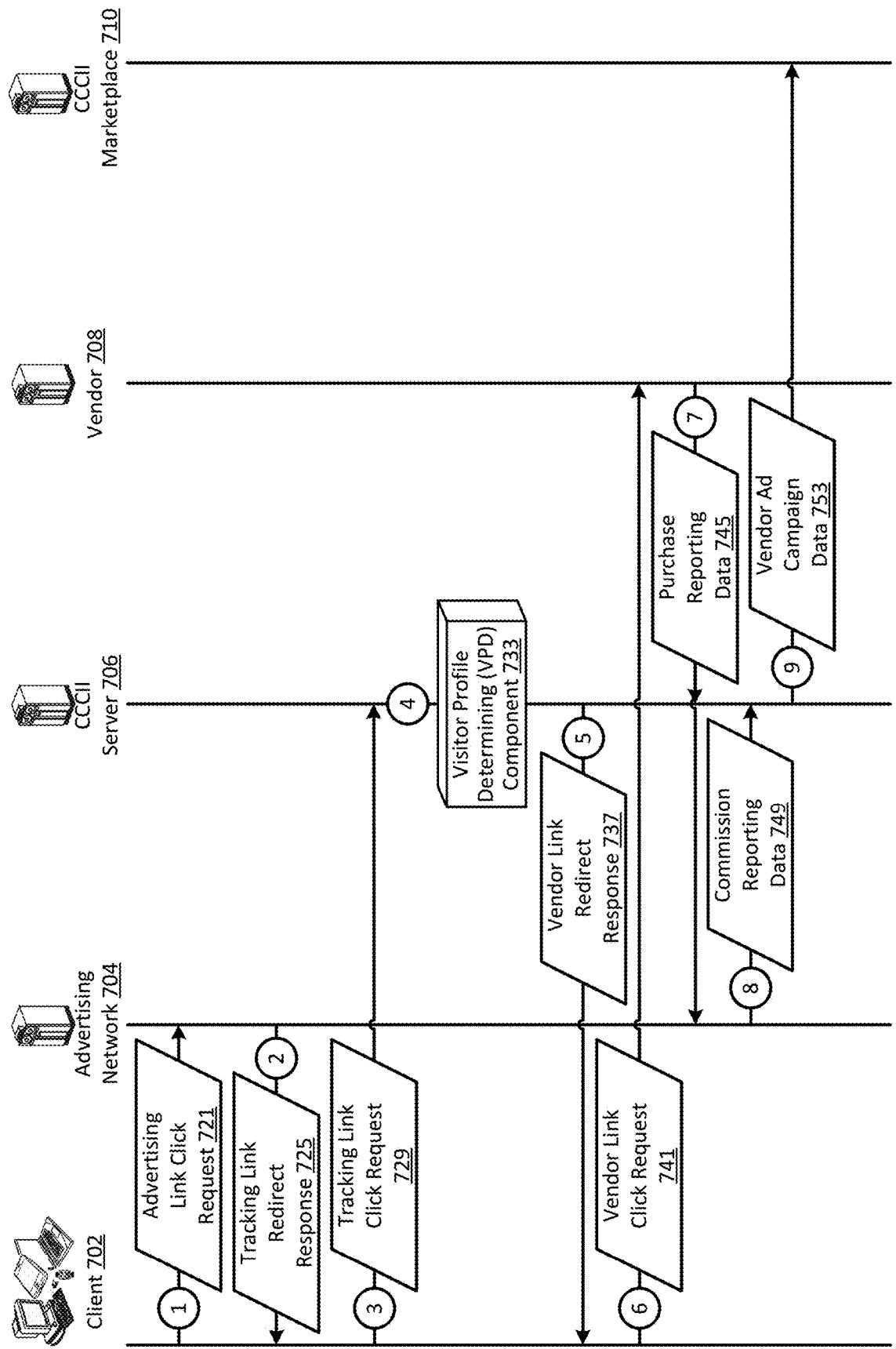

CAMPAIGN GENERATOR WEBPAGE

| Field | Value |
|---|---|
| Vendor Identifier | Vendor A |
| Campaign Duration | 10 Days |
| Daily Budget | $10,000 |
| Vendor Daily Contribution | $2,000 |
| Channel | Facebook Ads |
| Initial Daily Budget | $5,000 |
| Channel | Google AdWords |
| Initial Daily Budget | $5,000 |
| Commission Rate | 30% |
| Estimated Yield | 45% |

[GENERATE CAMPAIGN]

FIGURE 13

CROWDSOURCE AND CONVERSATIONAL CONTEXTUAL INFORMATION INJECTION APPARATUSES, METHODS AND SYSTEMS

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

PRIORITY CLAIM

Applicant hereby claims benefit to priority under 35 USC § 119 as a non-provisional conversion of: U.S. provisional patent application Ser. No. 62/378,186, filed Aug. 22, 2016, entitled "Crowdsource and Conversational Contextual Information Injection Apparatuses, Methods and Systems,", US provisional patent application Ser. No. 62/378,188, filed Aug. 22, 2016, entitled "Crowdsource Media Network Distribution Donation Apparatuses, Methods and Systems,", and U.S. provisional patent application Ser. No. 62/378,192, filed Aug. 22, 2016, entitled "Conversational Contextual Information Injection Apparatuses, Methods and Systems,".

The entire contents of the aforementioned applications are herein expressly incorporated by reference.

FIELD

The present innovations generally address parsing and detecting inquiries and data and crowdsourcing, and more particularly, include Crowdsource and Conversational Contextual Information Injection Apparatuses, Methods and Systems.

However, in order to develop a reader's understanding of the innovations, disclosures have been compiled into a single description to illustrate and clarify how aspects of these innovations operate independently, interoperate as between individual innovations, and/or a cooperate collectively. The application goes on to further describe the interrelations and synergies as between the various innovations; all of which is to further compliance with 35 U.S.C. § 112.

BACKGROUND

Technologies such as instant messaging are often uses by users to communicate with one another over the internet. Users also often use information sources, such as Google's search engine, to find information on the internet, and such search engines make use of ad networks to show users advertising. Crowd funding companies such as Kickstarter exist online allowing users to fund interesting projects and in return they often receive early versions of the funded projects.

BRIEF DESCRIPTION OF THE DRAWINGS

Appendices and/or drawings illustrating various, non-limiting, example, innovative aspects of the Crowdsource and Conversational Contextual Information Injection Apparatuses, Methods and Systems (hereinafter "CCCII") disclosure, include:

FIGS. 1A1-1B (collectively, hereinafter, "FIG. 1, or FIG. 1") show a datagraph diagram illustrating embodiments of a data flow for the CCCII;

FIG. 13 shows a screenshot diagram illustrating embodiments of the CCCII;

Figure 1B:
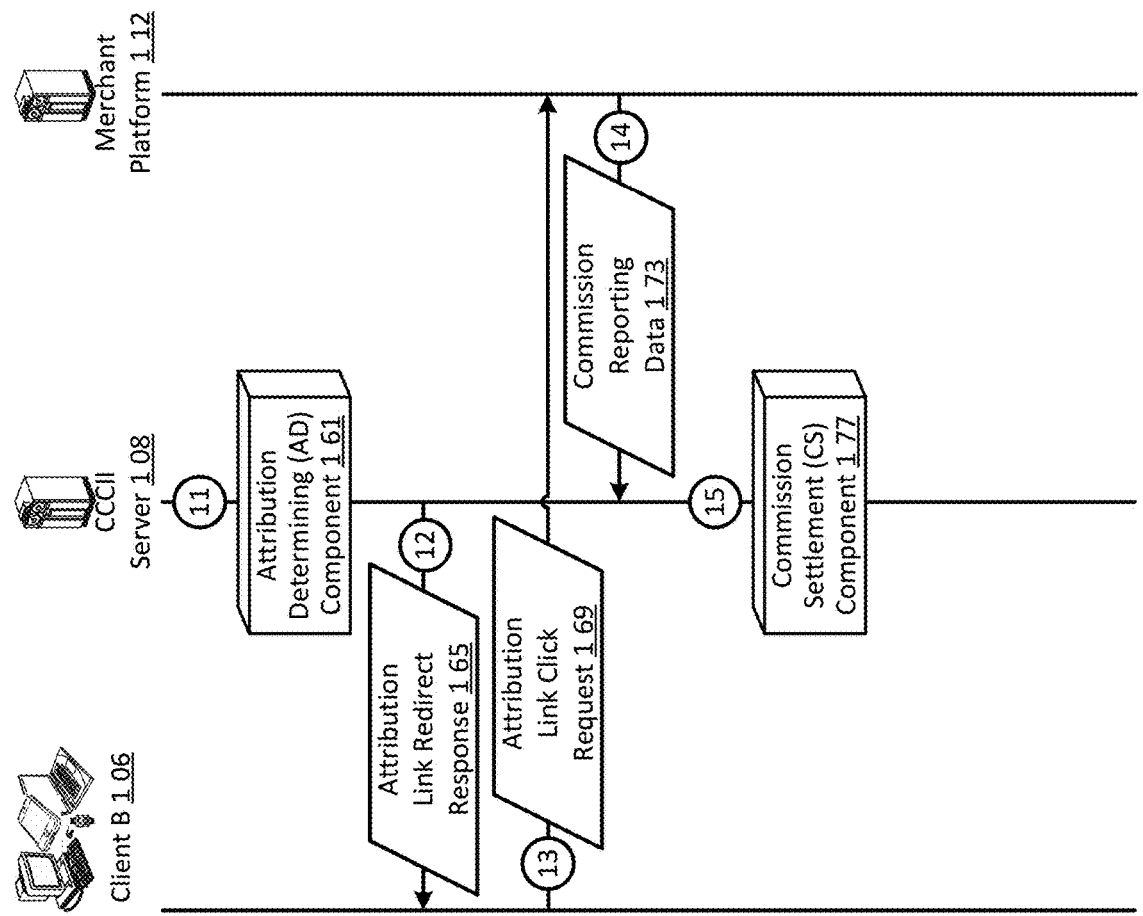

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Crowdsource and Conversational Contextual Information Injection Apparatuses, Methods and Systems (hereinafter "CCCII") transforms communication data, advertising link click request, campaign generation request, campaign search request, campaign investment request inputs, via CCCII components (e.g., TLG, AD, CS, VPD, CG, CM, CC, etc. components), into commission settlement, vendor ad campaign data, campaign search response, campaign investment confirmation, campaign control outputs. The CCCII components, in various embodiments, implement advantageous features as set forth below.

INTRODUCTION

In one embodiment, CCCII allows for crowdfunding ad campaigns at scale, automatically, with client money. The crowdfunding platform may be made available for donation, in exchange for a share of the proceeds, and other consideration.

In one embodiment, the CCCII provides a crowdsourcing mechanism. CCCII account holders select campaigns to fund based on metrics the CCCII provides that communicate average yield for prior campaigns and the risk of a negative return. Campaigns can be setup by vendors or affiliates. Clients provide funds towards a budget for traffic purchases, by day, up to a certain maximum funding level.

The CCCII solves problem for crowdfunding of online advertising—presenting a marketplace of investment options that enable $3^{rd}$ party funders to analyze, select, and fund ad campaigns for online merchants. In one embodiment, the CCCII crowdfunded ad platform uses $3^{rd}$ party funds to pay for ad campaigns created by online merchants, in exchange for a share of the proceeds. Selecting an ad campaign to fund may require research and analysis by the $3^{rd}$ party whereby they evaluate multiple options and ultimately, select a campaign to back by transferring money for the purposes of funding that campaign.

The CCCII ad investment marketplace provides a mechanism for presentment of campaigns along with metrics of past performance, potential risk rates for negative returns. In addition, the marketplace presents information about the online merchant, the types of products sold and other details that inform the $3^{rd}$ party funder as to the nature of the ad campaigns and products offered. Lastly, the marketplace gives the $3^{rd}$ party visibility to which ad campaign budgets are available for funding, which have closed due to reaching 100% funding and what upcoming budgets are opening soon. The CCCII marketplace helps to build a thriving ecosystem for crowdfunding ad campaigns in exchange for a share of the proceeds.

The CCCII establishes a marketplace that provides all the information necessary for a 3rd party to select an option whereby they can provide funds towards an online merchant's ad campaigns in exchange for a portion of the proceeds. It covers the ability to view historic yield rates, negative return risk rates and other metrics which are important to the 3rd party decision making process for selecting an online merchant to fund. A crowdfunding marketplace provides a component for discovery of online merchants whose ad campaigns yield positive results for backers. This marketplace makes the $3^{rd}$ party experience successful.

CCCII

FIG. 1 shows a datagraph diagram illustrating embodiments of a data flow for the CCCII. In one embodiment, the data flow may proceed as shown in FIG. 1A1. In FIG. 1A1, client A 102 may send communication data 121 to a communication channel server 104. For example, client A may be a desktop, a laptop, a tablet, a smartphone, and/or the like that is utilized by a first user to send communication data (e.g., an instant message, a text message) via a communication channel (e.g., via a chat app of a social network, such as Facebook, SnapChat, etc., associated with the communication channel server) to a second user. In one implementation, communication data may include data such as a message identifier, a chat identifier, a sending user identifier, a receiving user(s) identifier(s), contents (e.g., text, links), and/or the like. For example, client A may provide the following example communication data, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
            //it should be noted that although several client details
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>CCCII.app</app_name>
        <app_version>1.0 </app_version>
        <app_webkit_name>Mobile Safari</client_webkit_name>
        <client_version>537.51.2</client_version>
    </client_details>
```

```
<client_details> //iOS Client with Webbrowser
    <client_IP>10.0.0.123</client_IP>
    <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
    <client_product_type>iPhone6,1</client_product_type>
    <client_serial_number>DNXXX1X1XXXX</client_serial_number>
    <client_UDID>3XXXXXXXXXXXXXXXXXXXXXXXXD</client_UDID>
    <client_OS>iOS</client_OS>
    <client_OS_version>7.1.1</client_OS_version>
    <client_app_type>web browser</client_app_type>
    <client_name>Mobile Safari</client_name>
    <client_version>9537.53</client_version>
</client_details>
<client_details> //Android Client with Webbrowser
    <client_IP>10.0.0.123</client_IP>
    <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
    <client_product_type>Nexus S</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Android</client_OS>
    <client_OS_version>4.0.4</client_OS_version>
    <client_app_type>web browser</client_app_type>
    <client_name>Mobile Safari</client_name>
    <client_version>534.30</client_version>
</client_details>
<client_details> //Mac Desktop with Webbrowser
    <client_IP>10.0.0.123</client_IP>
    <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
    <client_product_type>MacPro5,1</client_product_type>
    <client_serial_number>YXXXXXXXXZ</client_serial_number>
    <client_UDID>FXXXXXXXXX-XXXX-XXXX-XXXX-XXXXXXXXXXXX</client_UDID>
    <client_OS>Mac OS X</client_OS>
    <client_OS_version>10.9.3</client_OS_version>
    <client_app_type>web browser</client_app_type>
    <client_name>Mobile Safari</client_name>
    <client_version>537.75.14</client_version>
</client_details>
<communication_data>
    <message_identifier>ID_message_1</message_identifier>
    <chat_identifier>ID_chat_1</chat_identifier>
    <sending_user_identifier>ID_user_1</sending_user_identifier>
    <receiving_user_identifier>ID_user_2</receiving_user_identifier>
    <contents>
        just signed up for venusfactor.com and it's awesome
    </contents>
</communication_data>
</auth_request>
```

The communication channel server may send augmented communication data 125 to client B 106 utilized by the second user. For example, the communication channel server may parse the communication data to determine links (e.g., URIs) in the communication data, and may generate the augmented communication data by transforming such links into communication channel links (e.g., a communication channel link for an original link may a display the original link's text (e.g., venusfactor.com), underlined to indicate a clickable link, and the original link may be augmented to point to a different address that is associated with the communication channel (e.g., augmented to point to http://www.communicationchannel.com/link?ref=http://venusfactor.com) and that may be used to obtain information regarding the original address). In one implementation, the augmented communication data may include data such as a message identifier, a chat identifier, a sending user identifier, a receiving user(s) identifier(s), augmented contents (e.g., text, links), and/or the like. For example, the communication channel server may provide the following example augmented communication data, substantially in the form of a HTTP(S) POST message including XML-formatted data, as provided below:

```
POST /augmented_communication_data.php HTTP/1.1
Host: www.server.com
Content-Type: Application/XML
Content-Length: 667
<?XML version = "1.0" encoding = "UTF-8"?>
<augmented_communication_data>
    <message_identifier>ID_message_1</message_identifier>
    <chat_identifier>ID_chat_1</chat_identifier>
    <sending_user_identifier>ID_user_1</sending_user_identifier>
    <receiving_user_identifier>ID_user_2</receiving_user_identifier>
    <augmented_contents>
        just signed up for
venusfactor.com<http://www.communicationchannel.com/link?ref=
http://venusfactor.com>
        and it's awesome
    </augmented_contents>
</augmented_communication_data>
```

Client B may send a link click request 129 to the communication channel server. In one implementation, the link click request may be sent when the second user clicks on a communication channel link. For example, the second user may click (e.g., in a chat window) on a link (e.g., with displayed text of venusfactor.com) and the second user's browser may be directed to open the address associated with the link (e.g., http://www.communicationchannel.com/link?ref=http://venusfactor.com).

The communication channel server may send a tracking link request 133 to a CCCII server 108. For example, the address opened by the second user's browser may be a web page that directs the communication channel server to retrieve information regarding the original address associated with the clicked on link (e.g., venusfactor.com) and to send the tracking link request (e.g., via an API call) to obtain a tracking link associated with the original address. In one implementation, the tracking link request may include data such as a request identifier, a communication channel identifier, a sending user identifier, a link (e.g., a URI), a match type, and/or the like. For example, the communication channel server may provide the following example tracking link request, substantially in the form of a HTTP(S) POST message including XML-formatted data, as provided below:

```
POST /tracking_link_request.php HTTP/1.1
Host: www.server.com
Content-Type: Application/XML
Content-Length: 667
<?XML version = "1.0" encoding = "UTF-8"?>
<tracking_link_request>
    <request_identifier>ID_request_1</request_identifier>
    <request_type>link</request_type>
    <communication_channel_identifier>ID_communication_channel_1
</communication_channel_identifier>
    <sending_user_identifier>ID_user_1</sending_user_identifier>
    <link>http://venusfactor.com</link>
    <match_type>domain</match_type>
</tracking_link_request>
```

A tracking link generating (TLG) component 137 may utilize data provided in the tracking link request to facilitate generating a tracking link (e.g., for the link provided in the tracking link request). See FIG. 2 for additional details regarding the TLG component.

The CCCII server may send an attribution link lookup request 141 to a CCCII merchant repository 110 to retrieve an attribution link (e.g., for the link provided in the tracking link request). In one implementation, data requested via the attribution link lookup request (e.g., via one or more SQL statements) may be used by the TLG component to facilitate generating the tracking link. The CCCII merchant repository may provide the requested data to the CCCII server via an attribution link lookup response 145.

The CCCII server may send a tracking link response 149 to the communication channel a server to provide the generated tracking link. In one implementation, the tracking link response may include data such as a response identifier, a link, a tracking link, and/or the like. For example, the CCCII server may provide the following example tracking link response, substantially in the form of a HTTP(S) POST message including XML-formatted data, as provided below:

```
POST /tracking_link_response.php HTTP/1.1
Host: www.server.com
Content-Type: Application/XML
Content-Length: 667
<?XML version = "1.0" encoding = "UTF-8"?>
<tracking_link_response>
    <response_identifier>ID_response_1</response_identifier>
    <link>http://venusfactor.com</link>
    <tracking_link>http://shamalama.venusind.hop.clickbank.net
    </tracking_link>
</tracking_link_response>
```

The communication channel server may send a tracking link redirect response 153 to client B utilized by the second user to redirect the second user's browser to the tracking link (e.g., via a JavaScript redirect). Accordingly, client B may send a tracking link click request 157 to the CCCII server (e.g., the second user's browser may open the tracking link).

Figure 2:
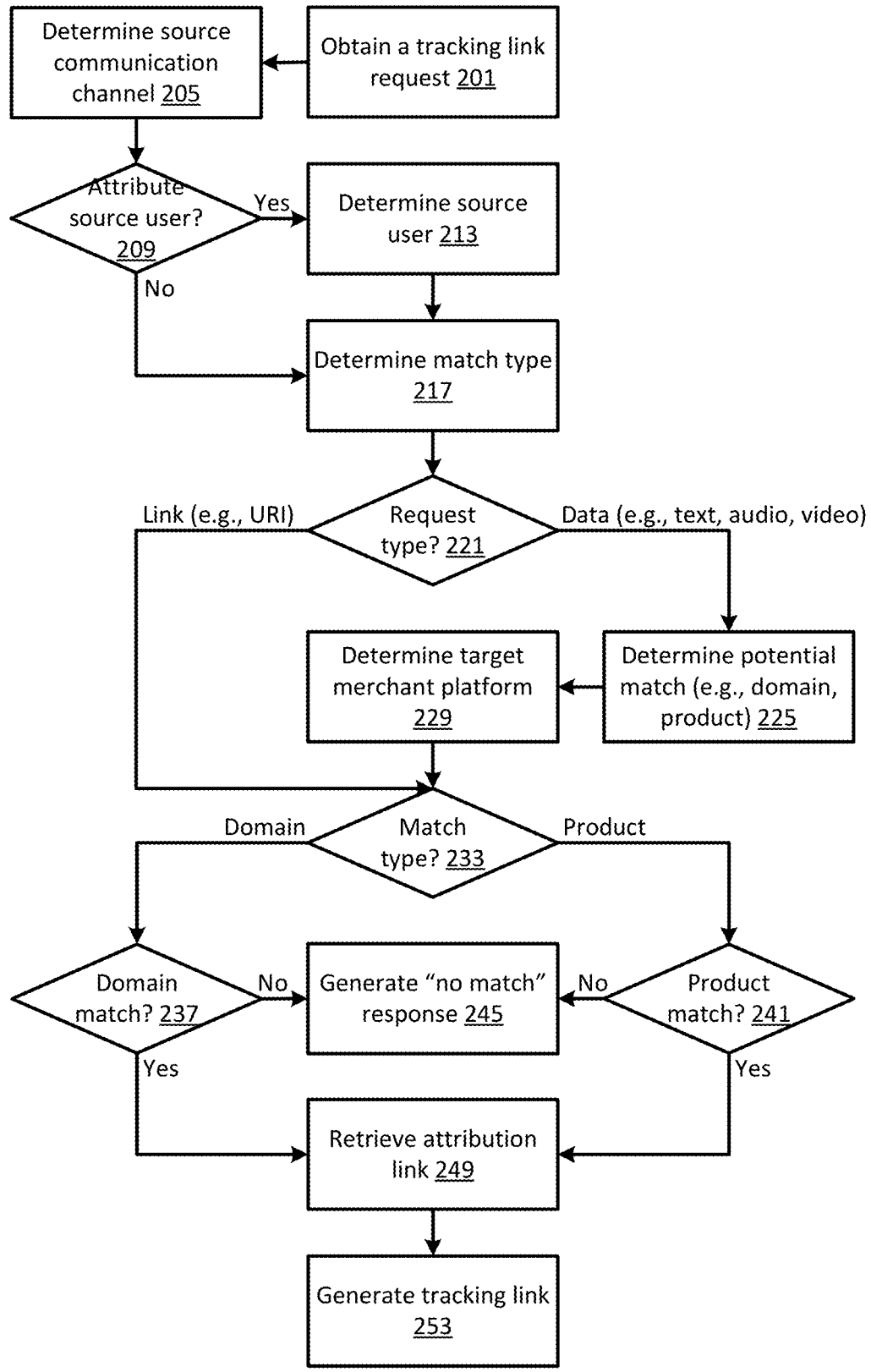
FIG. 2 shows a logic flow diagram illustrating embodiments of a tracking link generating (TLG) component for the CCCII.

In another embodiment, the data flow may proceed as shown in FIG. 1A2. In FIG. 1A2, client A 102 may send communication data 121 to a communication channel server 104. For example, client A may be a desktop, a laptop, a tablet, a smartphone, and/or the like that is utilized by a first user to send communication data (e.g., a video stream or broadcast) via a communication channel (e.g., via a pre-recorded YouTube video clip, Facebook live video, etc., associated with the communication channel server) to a second user. In one implementation, communication data may include data such as a stream identifier, a sending user identifier, a receiving user(s) identifier(s), contents (e.g., audio, video), and/or the like.

For example, client A may provide the following example communication data, substantially in the form of a HTTP(S) POST message including XML-formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>JohnDaDoeDoeDoooe@gmail.com</account_name>
            <password>abc123</password>
            //OPTIONAL <cookie>cookieID</cookie>
            //OPTIONAL <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
```

```
            //sections are provided to show example variants of client
            //sources, further messages will include only on to save
            //space
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>CCCII.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS
X) AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client_details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14 (KHTML, like Gecko) Version/7.0.3
Safari/537.75.14</user_agent_string>
        <client_product_type>MacPro5,1</client_product_type>
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <communication_data>
        <stream_identifier>ID_stream_1</stream_identifier>
        <sending_user_identifier>ID_user_1</sending_user_identifier>
        <receiving_user_identifier>ID_user_2</receiving_user_identifier>
        <contents>video stream contents</contents>
    </communication_data>
</auth_request>
```

The communication channel server may send a tracking link request 125 to a CCCII server 108. For example, the communication server may send a tracking link request (e.g., via an API call) to provide communication data to the CCCII server for analysis of video stream contents to obtain tracking links associated with any websites, products, services, etc. mentioned in the video stream. In one implementation, the tracking link request may include data such as a request identifier, a request type, a communication channel identifier, a sending user identifier, a stream identifier, contents, a match type, and/or the like. For example, the communication channel server may provide the following example tracking link request, substantially in the form of a HTTP(S) POST message including XML-formatted data, as provided below:

```
POST /tracking_link_request.php HTTP/1.1
Host: www.server.com
Content-Type: Application/XML
Content-Length: 667
<?XML version = "1.0" encoding = "UTF-8"?>
<tracking_link_request>
    <request_identifier>ID_request_1</request_identifier>
    <request_type>data</request_type>
    <communication_channel_identifier>
ID_communication_channel_1</communication_channel_identifier>
    <sending_user_identifier>ID_user_1</sending_user_identifier>
    <stream_identifier>ID_stream_1</stream_identifier>
    <contents>video stream contents</contents>
    <match_type>product</match_type>
</tracking_link_request>
```

A tracking link generating (TLG) component 129 may utilize data provided in the tracking link request to facilitate generating tracking links (e.g., for any websites, products, services, etc. mentioned in the video stream). See FIG. 2 for additional details regarding the TLG component.

The CCCII server may send an attribution link lookup request 133 to a CCCII merchant repository 110 to retrieve an attribution link (e.g., for any websites, products, services, etc. mentioned in the video stream). In one implementation, data requested via the attribution link lookup request (e.g., via one or more SQL statements) may be used by the TLG component to facilitate generating the tracking links. The CCCII merchant repository may provide the requested data to the CCCII server via an attribution link lookup response 137.

The CCCII server may send a tracking link response 141 to the communication channel server to provide the generated tracking links. For example, a tracking link response may be sent each time a relevant (e.g., having an attribution link) website, product, service, etc. is identified in the video stream. In one implementation, the tracking link response may include data such as a response identifier, a stream identifier, a time index, tracking link description, a tracking link, and/or the like. For example, the CCCII server may provide the following example tracking link response, substantially in the form of a HTTP(S) POST message including XML-formatted data, as provided below:

```
POST /tracking_link_response.php HTTP/1.1
Host: www.server.com
Content-Type: Application/XML
Content-Length: 667
<?XML version = "1.0" encoding = "UTF-8"?>
<tracking_link_response>
    <response_identifier>ID_response_1</response_identifier>
    <stream_identifier>ID_stream_1</stream_identifier>
    <time_index>1:23</time_index>
    <tracking_link_description>Visit venusfactor.com
    </tracking_link_description>
    <tracking_link>http://shamalama.venusind.hop.clickbank.net
    </tracking_link>
</tracking_link_response>
```

The communication channel server may send augmented communication data 145 to client B 106 utilized by the second user. For example, the video stream may be augmented to include, at the appropriate time index, a tracking link description (e.g., via a GUI widget overlaying the video stream) that includes a link (e.g., with displayed text of venusfactor.com) that points to the address of the tracking link (e.g., http://shamalama.venusind.hop.cickbank.net).

Client B may send a tracking link click request 149 to the CCCII server. In one implementation, the tracking link click request may be sent when the second user clicks on a link added to the video stream. For example, the second user may click (e.g., via a GUI widget overlaying the video stream) on a link (e.g., with displayed text of venusfactor.com) and the second user's browser may be directed to open the tracking link (e.g., http://shamalama.venusind.hop.clickbank.net).

In FIG. 1B, an attribution determining (AD) component may utilize data provided in the tracking link click request to facilitate attribution of the referral (e.g., to the CCCII, to the communication channel, to the first user) via an attribution link. See FIG. 3 for additional details regarding the AD component.

The CCCII server may send an attribution link redirect response 165 to client B utilized by the second user to redirect the second user's browser to the attribution link (e.g., via a JavaScript redirect). Accordingly, client B may send an attribution link click request 169 to a merchant platform 112 (e.g., the second user's browser may open the attribution link). For example, the merchant platform may be associated with a vendor (e.g., Amazon), a marketing platform (e.g., CJ), and/or the like.

The merchant platform may send commission reporting data 173 to the CCCII server. In one implementation, commission reporting data may include information regarding purchases attributed to the CCCII (e.g., based on purchases made by the second user), commissions paid to the CCCII, and/or the like.

A commission settlement (CS) component 177 may utilize data provided in the commission reporting data to facilitate commission settlement (e.g., with the communication channel, with the first user). See FIG. 4 for additional details regarding the CS component.

FIG. 2 shows a logic flow diagram illustrating embodiments of a tracking link generating (TLG) component for the CCCII. In FIG. 2, a tracking link request may be obtained at 201. For example, the tracking link request may be obtained when a user clicks on a link in a chat window and a communication channel server sends the tracking link request to obtain a corresponding tracking link. In another example, the tracking link request may be obtained when a communication channel server sends a video stream for analysis to obtain tracking links for any websites, products, services, etc. mentioned in the video stream.

A source communication channel associated with the tracking link request may be determined at 205. In one implementation, the tracking link request may be parsed (e.g., using PHP commands) to determine a communication channel identifier of the source a communication channel. For example, the determined communication channel identifier may be used to associate the source communication channel with the generated tracking link to attribute the source communication channel.

A determination may be made at 209 whether a source user should be attributed. For example, the source user may be attributed for providing a product recommendation. In one implementation, this determination may be made based on a configuration setting associated with the source communication channel (e.g., the source communication channel may wish to attribute its users to reward them for providing product recommendations). In another implementation, this determination may be made based on a configuration setting associated with the source user (e.g., the source user may be signed up with the CCCII to be rewarded for providing product recommendations).

If the source user should be attributed, the source user associated with the tracking link request may be determined at 213. In one implementation, the tracking link request may be parsed (e.g., using PHP commands) to determine a sending user identifier of the source user. For example, the determined sending user identifier may be used to associate the source user with the generated tracking link to attribute the source user.

A match type associated with the tracking link request may be determined at 217. In one implementation, the tracking link request may be parsed (e.g., using PHP commands) to determine the match type. For example, the match type may be domain (e.g., to indicate that the CCCII should look for a matching domain name). In another example, the match type may be product (e.g., to indicate that the CCCII should look for a matching product page for a product, service, etc.). In another implementation, the match type may be determined based on analysis of the tracking link request. For example, if the tracking link request is for a website domain, the match type may be set to domain. In another example, if the tracking link request is for a product, service, etc., the match type may be set to product.

A request type associated with the tracking link request may be determined at 221. In one implementation, the tracking link request may be parsed (e.g., using PHP commands) to determine the request type. For example, the request type may be link (e.g., to indicate that the tracking link request is for a specified link). In another example, the request type may be data (e.g., to indicate that the tracking request is for text, audio, video, and/or the like data to be analyzed to determine relevant (e.g., having an attribution link) websites, products, services, etc. mentioned in the data).

If the request type is data, the provided contents (e.g., video stream contents) may be analyzed to determine a potential match at 225. In one implementation, the contents may be parsed, analyzed via a speech recognition engine, analyzed via an image recognition engine, and/or the like to determine a website, product, service, etc. (e.g., iPad) mentioned in the contents, and the determined website, product, service, etc. may be used in a search query (e.g., as a parameter of an API call) to determine if a corresponding attribution link (e.g., for a vendor that advertises iPads) is available. A target merchant platform (e.g., Amazon) for a determined relevant website, product, service, etc. may be determined at 229. In one implementation, the relevant website, product, service, etc. may have a corresponding attribution link from a single merchant platform (e.g., this merchant platform may be chosen as the target merchant platform). In another implementation, the relevant website, product, service, etc. may have corresponding attribution links from multiple merchant platform (e.g., the merchant platform that provides the highest expected commission may be chosen as the target merchant platform).

If it is determined at 233 that the match type is domain, a determination may be made at 237 whether a domain match exists for the specified link or for the determined relevant website, product, service, etc. In one implementation, a domain match exists if there is an attribution link for the domain (e.g., venusfactor.com) associated with the specified link or for the determined relevant website, product, service, etc. If a domain match does not exist, a "no match" response may be generated at 245. For example, if the request type is link, the "no match" response may be returned to the communication channel server. In another example, if the request type is data, the "no match" response may be used as an indicator to continue analyzing the data (e.g., to obtain tracking links for other websites, products, services, etc. mentioned in the data). If a domain match exists, an attribution link associated with the domain may be retrieved at 249. For example, the attribution link may be retrieved via a MySQL database command similar to the following:

```
SELECT attribution_link
FROM Ads
WHERE adSourceURL = "venusfactor.com";
```

If it is determined at 233 that the match type is product, a determination may be made at 241 whether a product match exists for the specified link or for the determined relevant product, service, etc. In one implementation, a product match exists if there is an attribution link for the product (e.g., iPad) associated with the specified link or for the determined relevant product, service, etc. If a product match does not exist, a "no match" response may be generated at 245. For example, if the request type is link, the "no match" response may be returned to the communication channel server. In another example, if the request type is data, the "no match" response may be used as an indicator to continue analyzing the data (e.g., to obtain tracking links for other websites, products, services, etc. mentioned in the data). If a product match exists, an attribution link associated with the product may be retrieved at 249. For example, the attribution link may be retrieved via a MySQL database command similar to the following

```
SELECT attribution_link
FROM Ads
WHERE adMerchantID = "Amazon" AND adProduct = "iPad";
```

A tracking link may be generated at 253. In one embodiment, the tracking link is generated to identify tracking data such as the source communication channel, the source user (e.g., if the source user should be attributed), the attribution link, the affiliate account of the CCCII on the merchant platform associated with the attribution link, and/or the like. In one implementation, the tracking link may be generated to include a URL query string with the tracking data (e.g., http://venusind.hop.clickbank.net/?scc=ID_communication_channel_1&su=ID_user_1&attribution link=http://venusfactor.com/?affiliate=&affiliate_account=aa12345). In another implementation, the tracking data may be stored in a database record, and the tracking link (e.g., http://shamalama.venusind.hop.clickbank.net) may be generated to be associated with the database record (e.g., the initial portion of the tracking link (e.g., shamalama.venusind) may be used as a key that may be used to retrieve the associated tracking data). For example, if the request type is link, the tracking link may be returned to the communication channel server. In another example, if the request type is data, the tracking link may be returned to the communication channel server and may be used as an indicator to continue analyzing the data (e.g., to obtain tracking links for other websites, products, services, etc. mentioned in the data).

Figure 3:
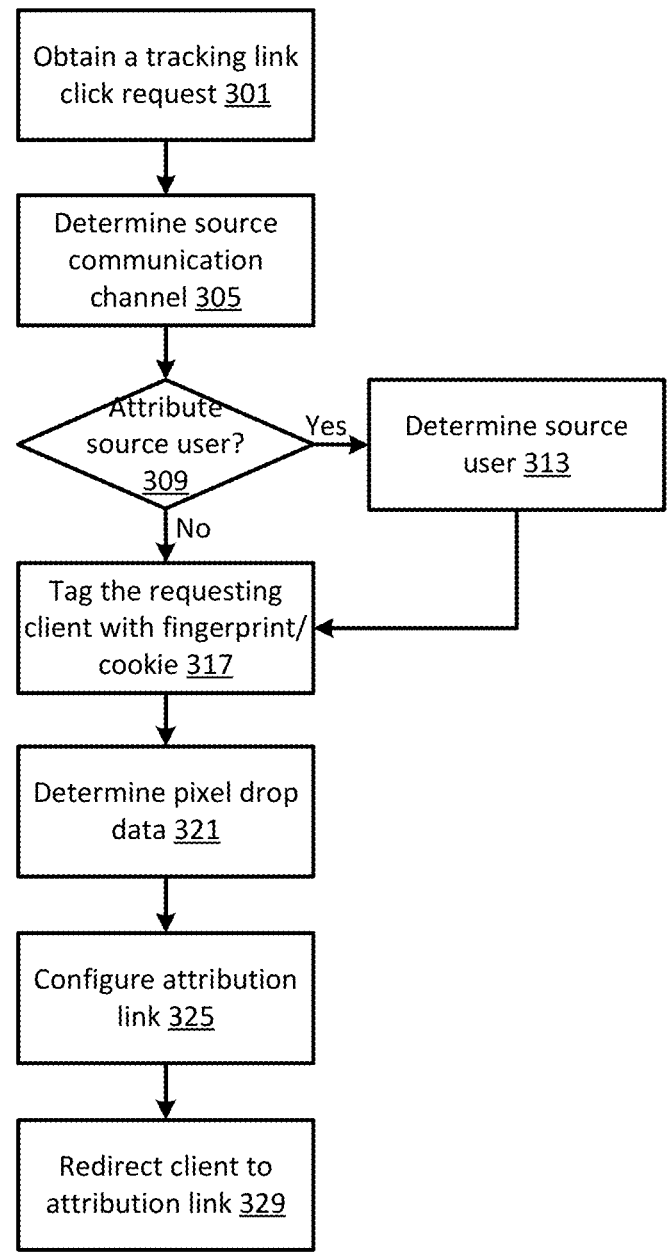
FIG. 3 shows a logic flow diagram illustrating embodiments of an attribution determining (AD) component for the CCCII.

FIG. 3 shows a logic flow diagram illustrating embodiments of an attribution determining (AD) component for the CCCII. In FIG. 3, a tracking link click request (e.g., for a tracking link) may be obtained at 301. For example, the tracking link click request may be obtained when a user clicks on a link in a chat window and the user's browser is redirected to the tracking link. In another example, the tracking link click request may be obtained when a user clicks on the tracking link in a GUI widget overlaying a video stream.

A source communication channel associated with the tracking link click request may be determined at 305. In one implementation, the tracking link's URL query string may be parsed (e.g., using PHP commands) to determine associated tracking data (e.g., a communication channel identifier of the source communication channel). In another implementation, the tracking link (e.g., the initial portion of the tracking link) may be used to retrieve associated tracking data (e.g., a communication channel identifier of the source communication channel) from a database.

A determination may be made at 309 whether a source user should be attributed. In one implementation, this determination may be made based on whether the tracking data associated with the tracking link includes data regarding the source user. In another implementation, this determination may be made based on a configuration setting (e.g., associated with the source communication channel, associated with the source user).

If the source user should be attributed, the source user associated with the tracking link click request may be determined at 313. In one implementation, the tracking link's URL query string may be parsed (e.g., using PHP commands) to determine associated tracking data (e.g., a user identifier of the source user). In another implementation, the tracking link (e.g., the initial portion of the tracking link) may be used to retrieve associated tracking data (e.g., a user identifier of the source user) from a database.

The requesting client (e.g., the user's client) may be tagged with a fingerprint and/or cookie at 317. For example, the fingerprint and/or cookie may be utilized to track the requesting client (e.g., as the user makes purchases) and/or to attribute the source communication channel and/or the source user (e.g., for the purchases). In one implementation, a fingerprint of the requesting client may be generated (e.g., via a hash function based on a set of client features such as operating system, browser, browser version, geographic location, time zone, fonts installed, etc. that may be used to uniquely identify the client). In another implementation, a tracking cookie may be placed on the requesting client (e.g., the tracking cookie may include information regarding the source communication channel and/or the source user, the tracking cookie may include the fingerprint).

Pixel drop data may be determined at 321. In one implementation, pixel drop data (e.g., a URL of a tracking pixel, an identifier (e.g., tp12345) utilized by a merchant platform to determine a URL of a tracking pixel) may be retrieved (e.g., via one or more SQL statements). For example, a different tracking pixel may be associated with each merchant platform (e.g., the tracking pixel for the merchant platform associated with the attribution link may be retrieved). In one embodiment, the tracking pixel may be placed (e.g., by the merchant platform associated with the attribution link (e.g., using an <img> tag)) on a purchase order page (e.g., on the order form, on the order confirmation page). In one implementation, when the tracking pixel is activated (e.g., when the user makes a purchase) information such as purchase transaction data (e.g., vendor, time, items purchased, quantities, purchase prices), tracking cookie data (e.g., the tracking cookie may include information regarding the source communication channel and/or the source user, the tracking cookie may include the fingerprint generated at 317), a fingerprint of the user's client at the time of purchase, and/or the like may be obtained (e.g., by a CCCII server) and stored in a database record.

The attribution link associated with the tracking link click request may be configured at 325. In one implementation, the tracking link's URL query string may be parsed (e.g., using PHP commands) to determine associated tracking data (e.g., the attribution link, the affiliate account of the CCCII on the merchant platform associated with the attribution link). In another implementation, the tracking link (e.g., the initial portion of the tracking link) may be used to retrieve associated tracking data (e.g., the attribution link, the affiliate account of CCCII on the merchant platform associated with the attribution link) from a database. The attribution link (e.g., http://venusfactor.com/?affiliate=) may be configured using data such as the affiliate account of CCCII (e.g., aa12345), pixel drop data (e.g., tp12345), and/or the like to generate a configured attribution link (e.g., http://venusfactor.com/?affiliate=aa12345&pixel=tp12345).

The requesting client (e.g., the user's client) may be redirected to the configured attribution link at 329. In one implementation, the requesting client may be redirected using a JavaScript redirect (e.g., window.location.href="http://venusfactor.com/?affiliate=aa12345&pixel=tp12345").

Figure 4:
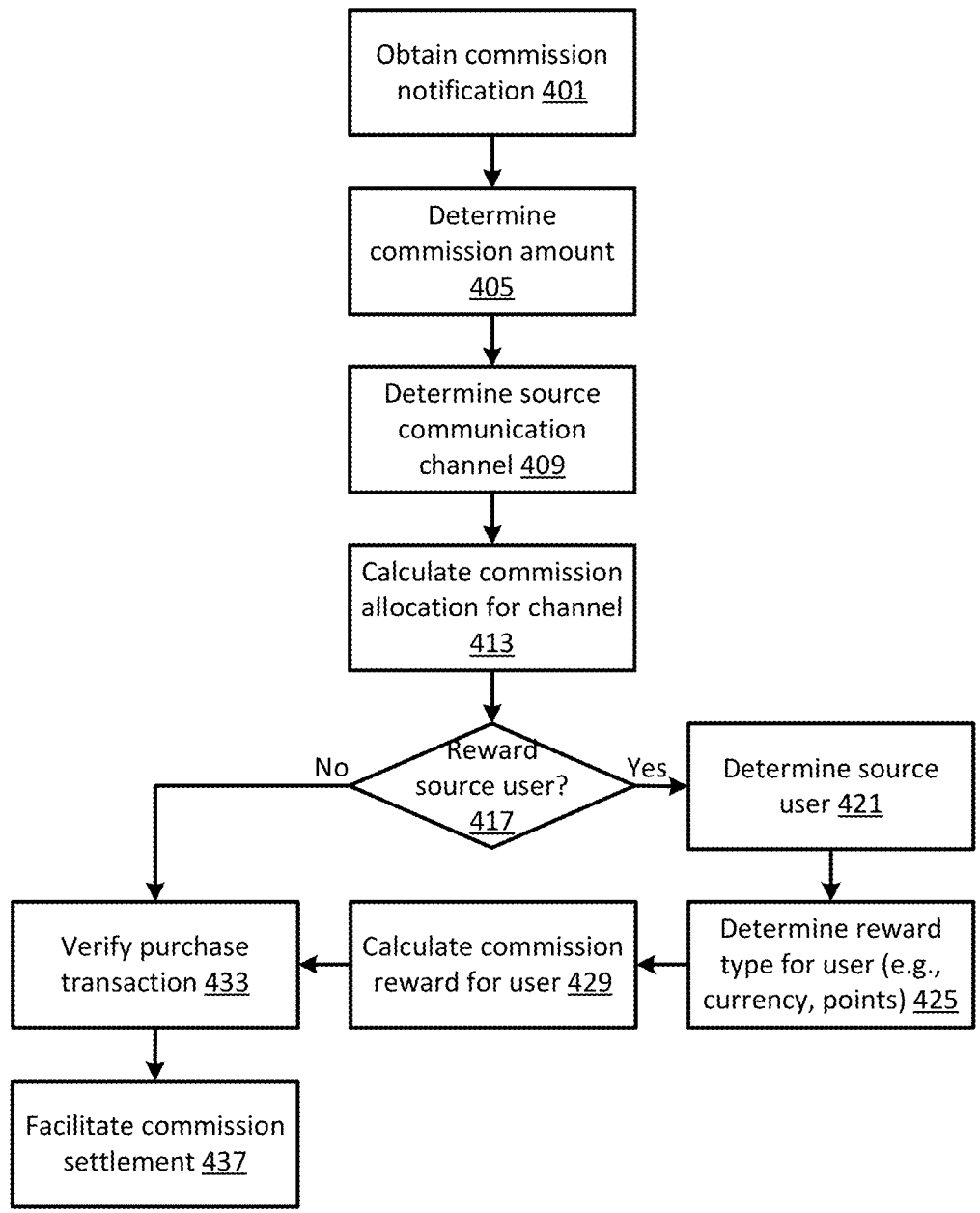
FIG. 4 shows a logic flow diagram illustrating embodiments of a commission settlement (CS) component for the CCCII.

FIG. 4 shows a logic flow diagram illustrating embodiments of a commission settlement (CS) component for the CCCII. In FIG. 4, a commission notification may be obtained at 401. For example, the commission notification may be obtained when a merchant platform notifies a CCCII server (e.g., via commission reporting data) regarding a purchase transaction attributed to the CCCII (e.g., via an instant notification after the purchase transaction, via a periodic (e.g., daily, monthly) transaction report).

A commission amount associated with the purchase transaction may be determined at 405. In one implementation the commission notification may be parsed (e.g., using PHP commands) to determine the commission amount. For example, the commission notification may include a field that specifies the commission amount (e.g., $10) for the purchase transaction.

A source communication channel associated with the purchase transaction may be determined at 409. In one implementation, information regarding the purchase transaction (e.g., vendor, time, items purchased, quantities, purchase prices) provided in the commission notification may be matched against stored purchase transaction data obtained from tracking pixel activations, and the source communication channel associated with the matching database record may be retrieved (e.g., via one or more SQL statements).

A commission allocation for the source communication channel may be determined at 413. In one implementation, the source communication channel may be associated with a commission allocation percentage (e.g., 50% of the commission amount). Accordingly, the commission allocation (e.g., $5) may be calculated based on the commission allocation a percentage.

A determination may be made at 417 whether a source user should be rewarded. In one implementation, this determination may be made based on whether the stored tracking cookie data obtained from the tracking pixel activation associated with the purchase transaction includes data regarding the source user. In another implementation, this determination may be made based on a configuration setting (e.g., associated with the source communication channel, associated with the source user).

If the source user should be rewarded, the source user associated with the purchase transaction may be determined at 421. In one implementation, information regarding the purchase transaction (e.g., vendor, time, items purchased, quantities, purchase prices) provided in the commission notification may be matched against stored purchase transaction data obtained from tracking pixel activations, and the source user associated with the matching database record may be retrieved (e.g., via one or more SQL statements).

A reward type for the source user may be determined at 425. For example, the reward type may be currency (e.g., a percentage of the commission amount), points (e.g., which may be used via the source communication channel), badges, merchandise, and/or the like. In one implementation, this determination may be made based on a configuration setting (e.g., associated with the source communication channel, associated with the source user).

A commission reward for the source user may be determined at 429. In one implementation, the source user may be associated with a commission reward percentage (e.g., 20% of the commission amount). Accordingly, the commission reward (e.g., $2) may be calculated based on the commission reward percentage. In another implementation, the source user may be provided points (e.g., at a rate of 20 points per dollar of the commission amount). Accordingly, the commission reward (e.g., 200 points) may be calculated based on the commission amount.

The purchase transaction may be verified at 433. In one implementation, the fingerprint of the client associated with the tracking link click request (e.g., obtained from the tracking cookie) may be matched against the fingerprint of the client obtained from the tracking pixel activation at the time of purchase to verify that the fingerprints match. For example, if the fingerprints do not match, the purchase transaction may be audited.

Commission settlement may be facilitated at 437. In one implementation, the commission amount may be obtained (e.g., via an ACH transfer) from the merchant platform, the CCCII may provide the source communication channel with the calculated commission allocation (e.g., as part of a periodic payment), the CCCII may provide the source user with the calculated commission reward, and/or the like.

Figure 5:
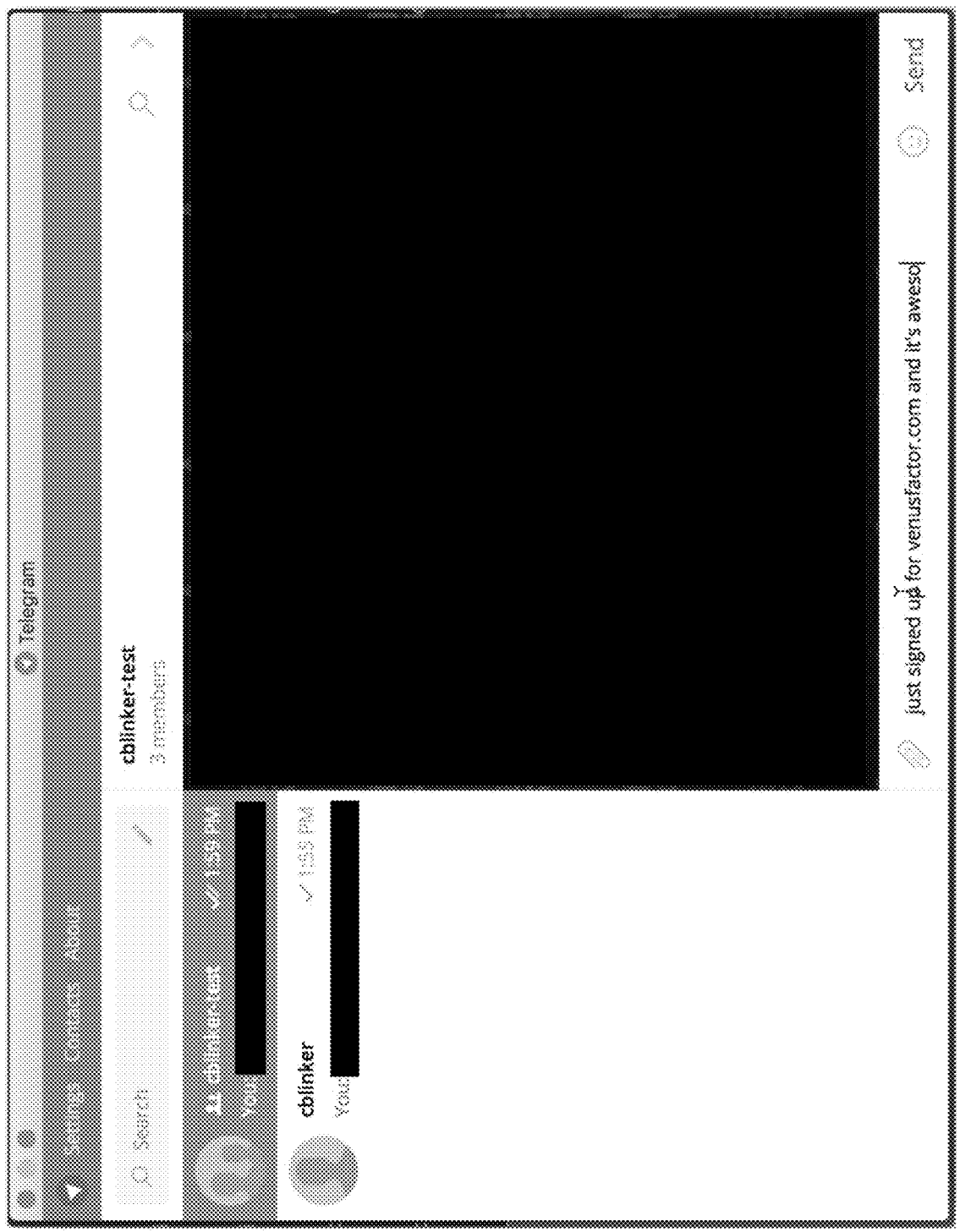
FIG. 5 shows a screenshot diagram illustrating embodiments of the CCCII.
Figure 6:
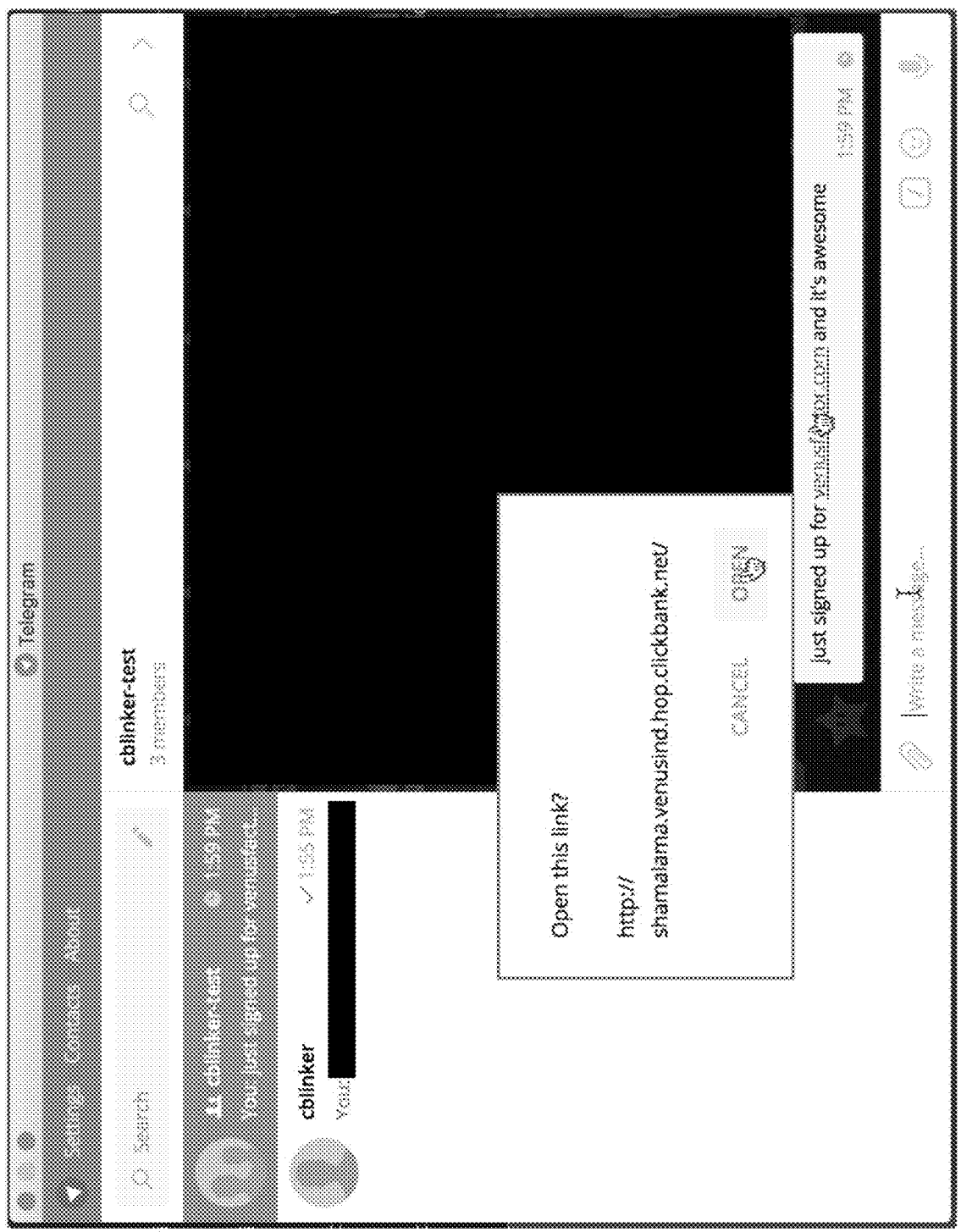
FIG. 6 shows a screenshot diagram illustrating embodiments of the CCCII.

FIG. 5 shows a screenshot diagram illustrating embodiments of the CCCII. In FIG. 5, a user types in text (e.g., just signed up for venusfactor.com and it's awesome) into a Telegram messaging app during a chat. As illustrated in FIG. 5, the text includes a link (e.g., venusfactor.com). FIG. 6 shows a screenshot diagram illustrating embodiments of the CCCII. In FIG. 6, the text is augmented by transforming the link into a communication channel link, and the augmented text is displayed to the users participating in the chat. When a user clicks on the communication channel link, a corresponding tracking link is obtained and the user's browser may be directed to open the tracking link (e.g., http://shamalama.venusind.hop.clickbank.net). In one implementation, the app may confirm whether the user wants to open the tracking link.

Figure 7B:
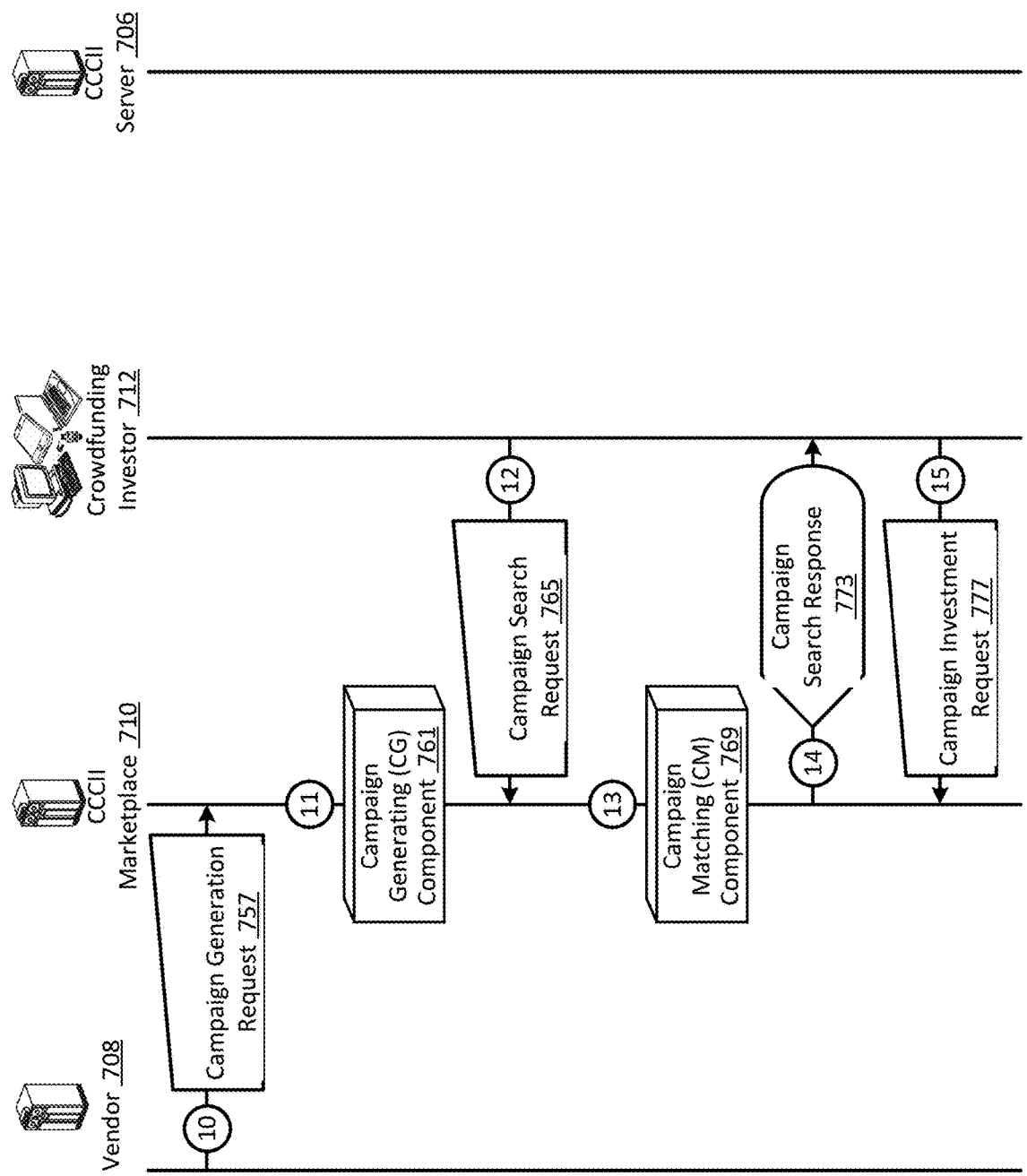
FIGS. 7A-7C (collectively, hereinafter, "FIG. 7, or FIG. 7") show a datagraph a diagram illustrating embodiments of a data flow for the CCCII.
Figure 7:
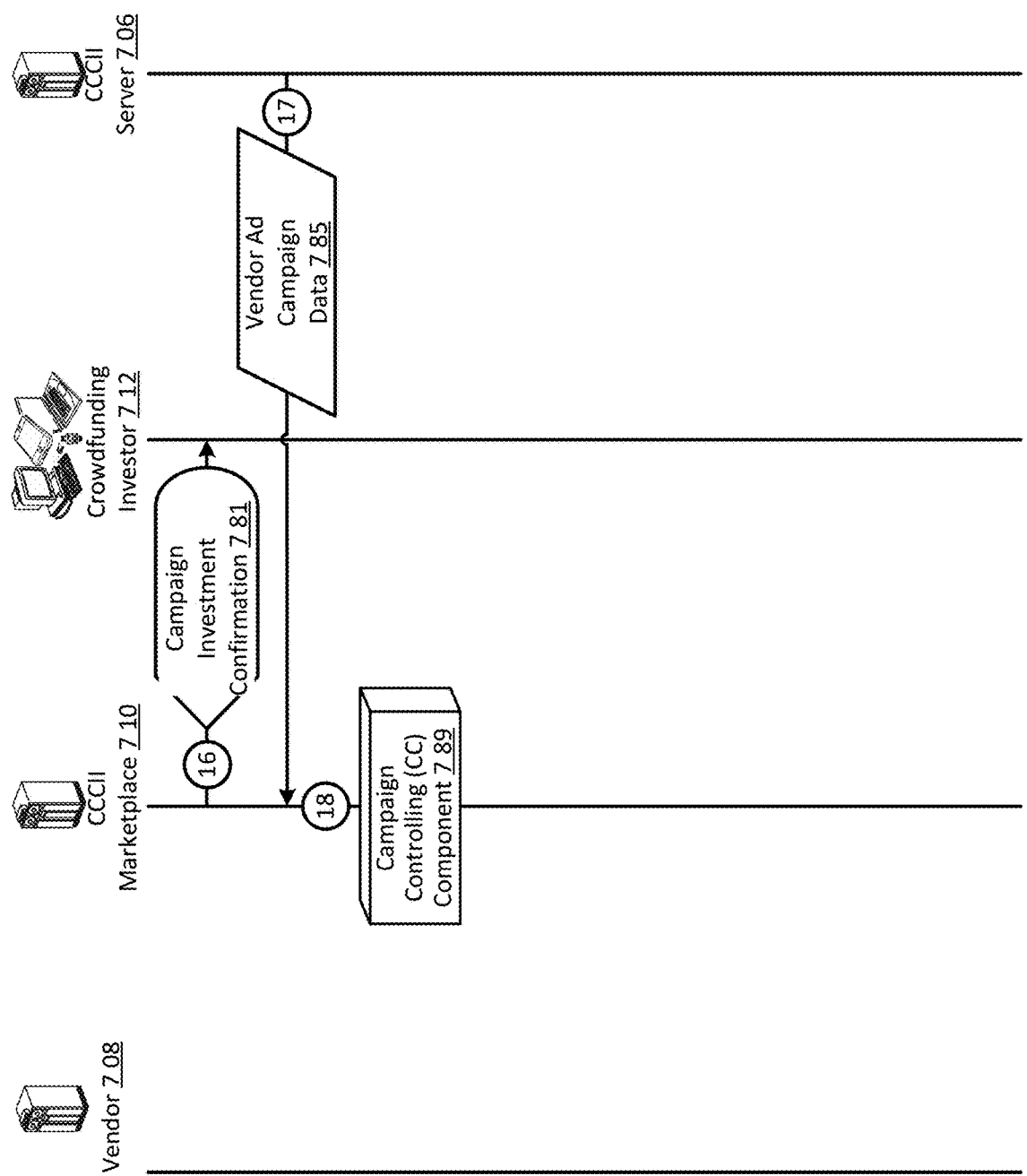

FIG. 7 shows a datagraph diagram illustrating embodiments of a data flow for the CCCII. In FIG. 7, a client 702 may send an advertising link click request 721 to an advertising network 704. For example, the client may be a desktop, a laptop, a tablet, a smartphone, and/or the like that is utilized by a user to click on an advertising link. For example, the advertising network may be Amazon Advertising Platform, Google AdWords, Facebook ads, CJ, and/or the like. In one implementation, the advertising link click request may be sent when the user clicks on the advertising link (e.g., the user's browser may open the advertising link) associated with an ad campaign. In one embodiment, the CCCII may be an intermediary between advertising networks and vendors, and may administer ad campaigns on the advertising networks for the vendors. For example, an ad campaign may include purchasing advertising via communication data of a communication channel. In one implementation, the CCCII may analyze advertising link clicks associated with the ad campaigns and/or redirect the advertising link clicks to the vendors.

The advertising network may send a tracking link redirect response 725 to the client to redirect the user's browser to a tracking link (e.g., via a JavaScript redirect) associated with a CCCII server 706. Accordingly, the client may send a tracking link click request 729 to the CCCII server (e.g., the user's browser may open the tracking link).

A visitor profile determining (VPD) component 733 may analyze data associated with the client to provide a visitor profile associated with the user (e.g., whether the user is a high value customer, whether the user is associated with a high refund likelihood, whether the user is a bot, data regarding purchase transactions) to a vendor. See FIG. 8 for additional details regarding the VPD component.

The CCCII server may send a vendor link redirect response 737 to the client to redirect the user's browser to a vendor link (e.g., via a JavaScript redirect) associated with a vendor 708. In one implementation, the vendor link may be configured to include the visitor profile (e.g., via a URL query string). Accordingly, the client may send a vendor link click request 741 to the vendor (e.g., the user's browser may open the vendor link).

The vendor may provide purchase reporting data 745 to the CCCII server to inform the CCCII server regarding purchases facilitated by the ad campaign. In one implementation, a tracking pixel may be activated when the user makes a purchase and purchase transaction data (e.g., vendor, time, items purchased, quantities, purchase prices) associated with the purchase may be obtained. The vendor may also provide purchase reporting data to the advertising network.

The advertising network may send commission reporting data 749 to the CCCII server to inform the CCCII server regarding advertising cost (e.g., commission cost) associated with the ad campaign. For example, the commission reporting data may be sent via an instant notification after the purchase, via a periodic (e.g., daily, monthly) transaction report, and/or the like.

The CCCII server may send vendor ad campaign data 753 to a CCCII marketplace 710. In one implementation, the vendor ad campaign data may include data such as the vendor's vendor identifier, the ad campaign's campaign identifier, earnings data associated with the ad campaign, advertising cost associated with the ad campaign, and/or the like. For example, the CCCII server may provide the following example vendor ad campaign data, substantially in the form of a HTTP(S) POST message including XML-formatted data, as provided below:

```
POST /vendor_ad_campaign_data.php HTTP/1.1
Host: www.server.com
Content-Type: Application/XML
Content-Length: 667
<?XML version = "1.0" encoding = "UTF-8"?>
<vendor_ad_campaign_data>
    <vendor_identifier>ID_vendor_1</vendor_identifier>
    <campaign_identifier>ID_ad_campaign_1</campaign_identifier>
    <earnings_data>campaign earnings of $1.2M</earnings_data>
    <advertising_cost_data>campaign cost of $1.0M
    </advertising_cost_data>
</vendor_ad_campaign_data>
```

The vendor may send a campaign generation request 757 the CCCII marketplace to create an investor funded (e.g., crowdfunded) ad campaign. For example, the vendor may utilize a campaign generator webpage associated with the CCCII marketplace to specify campaign parameters for the investor funded ad campaign. See FIG. 13 for an exemplary campaign generator webpage. In one implementation, the campaign generation request may include data such as a campaign identifier, the vendor's vendor identifier, campaign description, campaign duration, a requested advertising budget, a vendor contribution to budget, campaign advertising channels, campaign commission rate, and/or the like. For example, the vendor may provide the following example campaign generation request, substantially in the form of a HTTP(S) POST message including XML-formatted data, as provided below:

```
POST /campaign_generation_request.php HTTP/1.1
Host: www.server.com
Content-Type: Application/XML
Content-Length: 667
<?XML version = "1.0" encoding = "UTF-8"?>
<campaign_generation_request>
    <campaign_identifier>ID_ad_campaign_2</campaign_identifier>
    <vendor_identifier>ID_vendor_1</vendor_identifier>
    <campaign_description>Summer clothing for sale
    </campaign_description>
    <campaign_duration>10 days</campaign_duration>
    <requested_advertising_budget>$10K per day
    </requested_advertising_budget>
    <vendor_contribution>$2K per day</vendor_contribution>
    <advertising_channels>
        <channel>
            <channel_identifier>Google AdWords
            </channel_identifier>
            <channel_budget>$5K per day</channel_budget>
        </channel>
        <channel>
            <channel_identifier>Facebook ads - text
            </channel_identifier>
            <channel_budget>$3K per day </channel_budget>
        </channel>
        <channel>
            <channel_identifier>Facebook ads - video
            </channel_identifier>
            <channel_budget>$2K per day </channel_budget>
        </channel>
    </advertising_channels>
    <commission_rate>30%</commission_rate>
</campaign_generation_request>
```

A campaign generating (CG) component 761 may utilize the vendor ad campaign data and/or the specified campaign parameters to facilitate generating the investor funded ad campaign. See FIG. 9 for additional details regarding the CG component.

A crowdfunding investor 712 may send a campaign search request 765 to the CCCII marketplace. For example, the crowdfunding investor may utilize a campaign search webpage associated with the CCCII marketplace to specify search parameters for investor funded ad campaigns that the crowdfunding investor may be interested in funding. See FIG. 14 for an exemplary campaign search webpage. In one implementation, the campaign search request may include data such as an investor identifier, campaign search parameters, and/or the like. For example, the crowdfunding investor may provide the following example campaign search request, substantially in the form of a HTTP(S) POST message including XML-formatted data, as provided below:

```
POST /campaign_search_request.php HTTP/1.1
Host: www.server.com
```

-continued

```
Content-Type: Application/XML
Content-Length: 667
<?XML version = "1.0" encoding = "UTF-8"?>
<campaign_search_request>
    <investor_identifier>ID_user_3</investor_identifier>
    <search_parameters>
        <vendor_category>Clothing</vendor_category>
        <budget_limits>less than or equal to $15K per day
        </budget_limits>
        <open_funding_remaining>more than $50K
        </open_funding_remaining>
        <budget_window>next 7 days</budget_window>
        <expected_yield>more than or equal to 25%
        </expected_yield>
        <yield_consistency>more than 20 days</yield_consistency>
        <negative_return_rate>less than 15%
        </negative_return_rate>
    </search_parameters>
</campaign_search_request>
```

A campaign matching (CM) component 769 may utilize the specified search parameters to facilitate providing the crowdfunding investor with matching investor funded ad campaigns. See FIG. 10 for additional details regarding the CM component.

The CCCII marketplace may send a campaign search response 773 to the crowdfunding investor. The campaign search response may be used to provide the matching investor funded ad campaigns to the crowdfunding investor. For example, the crowdfunding investor may utilize the campaign search response to display results (e.g., information regarding the matching investor funded ad campaigns).

The crowdfunding investor may send a campaign investment request 777 to the CCCII marketplace. For example, the crowdfunding investor may utilize a webpage associated with the CCCII marketplace to select an investor funded ad campaign that the crowdfunding investor is interested in funding.

The CCCII marketplace may send a campaign investment confirmation 781 to the crowdfunding investor. The campaign investment confirmation may be used to confirm the crowdfunding investor's investment into the selected investor funded ad campaign. For example, the campaign investment confirmation may be displayed using a webpage associated with the CCCII marketplace, sent via email, and/or the like.

The CCCII server may send vendor ad campaign data 785 to the CCCII marketplace. For example, the vendor ad campaign data may include earnings data, advertising cost data, and/or the like associated with the selected investor funded ad campaign.

A campaign controlling (CC) component 789 may utilize the vendor ad campaign data associated with the selected investor funded ad campaign to facilitate administering (e.g., to direct funds into effective advertising channels, to end the selected investor funded ad campaign if its budget is spent or if its yield falls below a specified threshold, to facilitate distribution of earnings to investors) the selected investor funded ad campaign. See FIG. 11 for additional details regarding the CC component.

Figure 8:
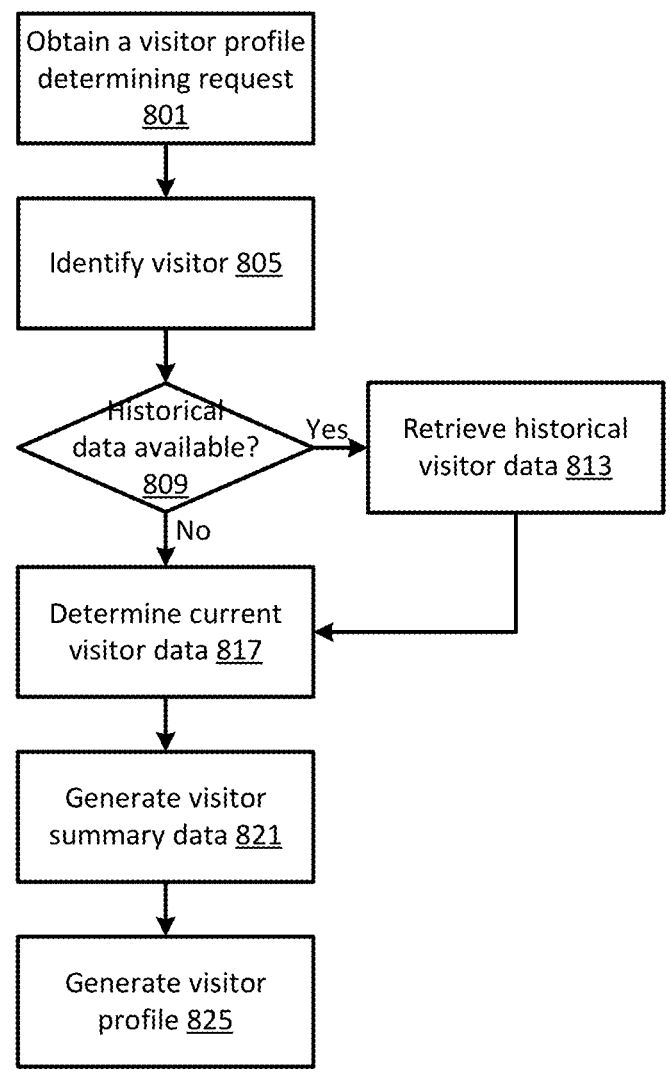
FIG. 8 shows a logic flow diagram illustrating embodiments of a visitor profile determining (VPD) component for the CCCII.

FIG. 8 shows a logic flow diagram illustrating embodiments of a visitor profile determining (VPD) component for the CCCII. In FIG. 8, a visitor profile determining request may be obtained at 801. For example, the visitor profile determining request may be obtained when the CCCII is configured to determine a visitor profile of a visitor associated with a tracking link click request for a vendor.

The visitor may be identified at 805. In one implementation, a fingerprint of the visitor's client may be generated and used as a visitor identifier. In another implementation, a tracking cookie associated with the visitor may be parsed (e.g., using PHP commands) to determine a visitor identifier (e.g., v12345).

A determination may be made at 809 whether historical visitor data for the visitor is available. For example, the visitor's historical visitor data may include information regarding purchases, refunds, browsing behavior (e.g., average time spent viewing a webpage), and/or the like obtained previously (e.g., from tracking cookies, based on analysis of commission reporting data). In one implementation, this determination may be made based on whether historical visitor data exists for the visitor identifier. If so, the visitor's historical visitor data may be retrieved at 813. For example, the visitor's historical visitor data may be retrieved via a MySQL database command similar to the following:

```
SELECT *
FROM VisitorProfiles
WHERE visitorID = "v12345";
```

The visitor's current visitor data may be determined at 817. For example, the visitor's current visitor data may include information regarding purchases, refunds, browsing behavior (e.g., average time spent viewing a webpage), and/or the like collected (e.g., in a tracking a cookie) since the last time the visitor's current visitor data was obtained (e.g., since the last time the visitor made a tracking link click request). In one implementation, the tracking cookie associated with the visitor may be parsed (e.g., using PHP commands) to obtain the visitor's current visitor data.

Visitor summary data for the visitor may be generated at 821. In one implementation, the visitor's historical visitor data and/or current visitor data may be analyzed to determine visitor summary data. For example, a visitor type (e.g., whether the visitor is a high value customer, whether the visitor is associated with a high refund likelihood, whether the visitor is a bot) of the visitor may be determined.

A visitor profile for the visitor may be generated at 825. In one implementation, the visitor profile may include the visitor's visitor summary data. For example, the visitor may be flagged as an ordinary visitor, a desirable visitor (e.g., a high value customer), an undesirable visitor (e.g., a bot), and/or the like. In another implementation, the visitor profile may include the visitor's historical visitor data and/or current visitor data (e.g., data regarding the visitor's previous purchase transactions at the vendor). In one embodiment, the visitor's visitor profile may be provided to the vendor (e.g., via a vendor link redirect response). For example, the vendor may use visitor profile data to configure the vendor's website differently for different types of visitors. In another embodiment, some visitors (e.g., undesirable bots) may be precluded from visiting the vendor (e.g., to help the vendor reduce web hosting expenses).

Figure 9:
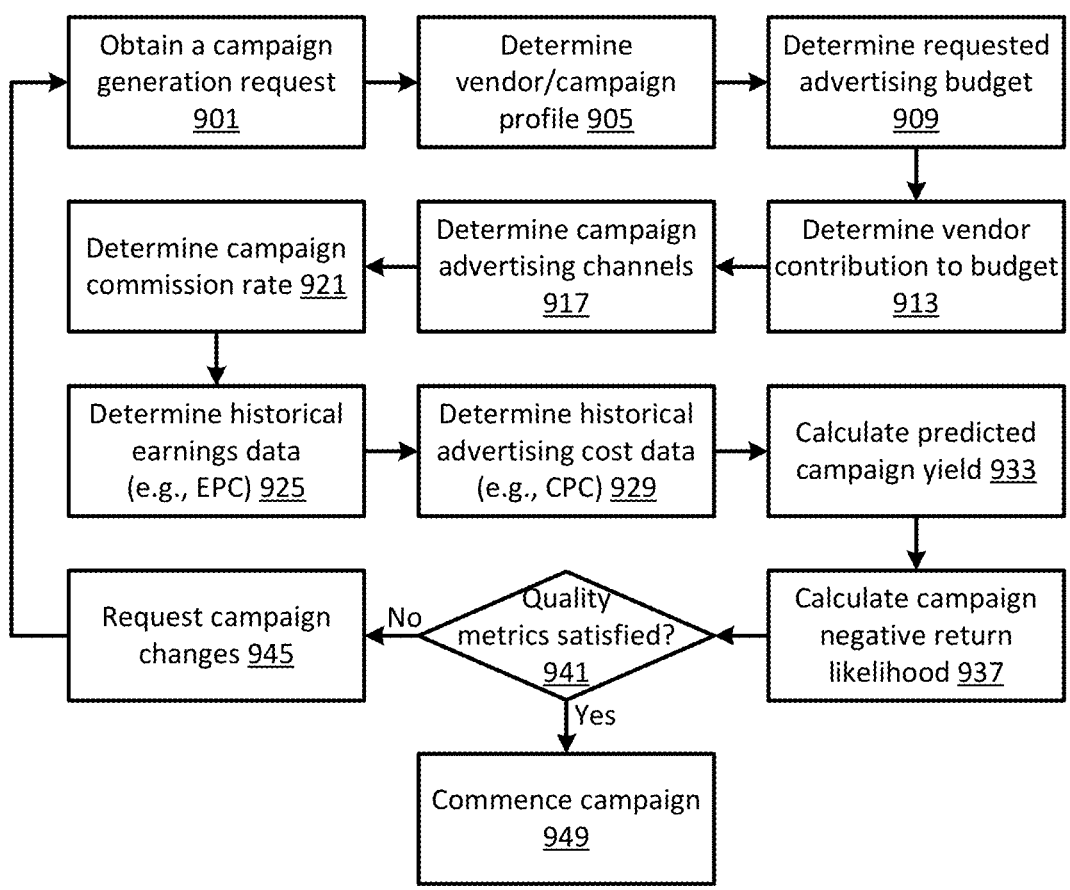
FIG. 9 shows a logic flow diagram illustrating embodiments of a campaign generating (CG) component for the CCCII.

FIG. 9 shows a logic flow diagram illustrating embodiments of a campaign generating (CG) component for the CCCII. In FIG. 9, a campaign generation request may be obtained at 901. For example, the campaign generation request may be obtained when a vendor submits a request to create an investor funded (e.g., crowdfunded) ad campaign.

Vendor and/or campaign profile may be determined at 905. In one embodiment, the vendor and/or campaign profile may describe the vendor and/or the investor funded ad campaign. In one implementation, the vendor profile may be retrieved from a database (e.g., via one or more SQL statements). For example, the vendor profile may include data such as the vendor's merchant category (e.g., health & fitness, clothing, photography), historical data regarding the vendor's past ad campaigns, and/or the like. In one implementation, the campaign profile may be determined by parsing (e.g., using PHP commands) the campaign a generation request. For example, the campaign profile may include data such as campaign description, campaign duration, the set of advertised products, and/or the like.

Requested advertising budget for the investor funded ad campaign may be determined at 909. In one implementation, the campaign generation request may be parsed (e.g., using PHP commands) to determine the requested advertising budget. For example, the requested advertising budget may be specified per period (e.g., $10K per day). In another example, the requested advertising budget may be specified in aggregate (e.g., $100K for the duration (e.g., 10 days) of the investor funded ad campaign).

The vendor's contribution to the investor funded ad campaign's advertising budget may be determined at 913. In one implementation, the campaign generation request may be parsed (e.g., using PHP commands) to determine the vendor's contribution. For example, the vendor's contribution may be specified per period (e.g., $2K per day). In another example, the vendor's contribution may be specified in aggregate (e.g., 20% of the advertising budget).

Campaign advertising channels for the investor funded ad campaign may be determined at 917. In one implementation, the campaign generation request may be parsed (e.g., using PHP commands) to determine the advertising channels. For example, data such as advertising network (e.g., Google AdWords, Facebook ads), ad format (e.g., text, video), channel budget (e.g., initial daily channel budget allocation), and/or the like may be determined for each advertising channel.

Campaign commission rate for the investor funded ad campaign may be determined at 921. In one implementation, the campaign generation request may be parsed (e.g., using PHP commands) to determine the commission rate (e.g., 30%). In one embodiment, commission rate may be a convenient, well understood, and readily comparable metric for vendors familiar with the affiliate model (e.g., in the affiliate model the vendor determines how much of sales proceeds (e.g., commission rate) to share with the affiliate who referred the customer) that may be utilized to control yield (e.g., yield percentage) for investors who provide funds for the investor funded ad campaign.

Historical earnings data associated with the vendor's previous ad campaigns may be determined at 925. For example, historical earnings per click (EPC) data may be retrieved. In a one implementation, a historical EPC amount may be calculated based on an average (e.g., weighted) of EPC amounts in the vendor's previous ad campaigns. In another implementation, the set of advertised products associated with the investor funded ad campaign may be determined (e.g., based on the campaign profile), a historical product EPC amount for each product in the set may be determined (e.g., based on an average of product EPC amounts for the respective product in the vendor's previous ad campaigns), and a historical EPC amount may be calculated based on an average of the historical product EPC amounts for the set of advertised products.

Historical advertising cost data associated with the vendor's previous ad campaigns may be determined at 929. For example, historical cost per click (CPC) data may be retrieved. In one implementation, a historical CPC amount may be calculated based on an average (e.g., weighted) of CPC amounts in the vendor's previous ad campaigns. In another implementation, the set of advertised products associated with the investor funded ad campaign may be determined (e.g., based on the campaign profile), a historical product CPC amount for each product in the set may be determined (e.g., based on an average of product CPC amounts for the respective product in the vendor's previous ad campaigns), and a historical CPC amount may be calculated based on an average of the historical product CPC amounts for the set of advertised products.

A predicted campaign yield for investors may be calculated at 933. In one implementation, the predicted yield for investors may be calculated according to the following formula:

Predicted Yield Percentage=(historical investor earnings −historical advertising cost)/historical advertising cost For example, using the historical EPC and CPC amounts, the predicted yield for investors may be calculated according to the following formula:

Predicted Yield Percentage=((historical EPC*commission rate)−historical CPC)/historical CPC In another implementation, the predicted yield for investors may be calculated based on an average of historical yields for the vendor's previous ad campaigns.

Campaign negative return likelihood (e.g., rate) for the investor funded ad campaign may be determined at 937. In one implementation, the campaign negative return likelihood may be calculated as the percentage of the vendor's previous ad campaigns that provided a negative return.

A determination may be made at 941 whether the investor funded ad campaign satisfies quality metrics specified by a CCCII administrator. For example, the quality metrics may include minimum and/or maximum values for advertising budget, vendor contribution to budget, commission rate, predicted campaign yield, negative return likelihood, and/or the like. See FIG. 15 for an exemplary marketplace administration webpage. In one implementation, values associated with the investor funded ad campaign may be checked against the specified quality metrics to verify that the quality metrics are satisfied.

If the quality metrics are not satisfied, campaign changes may be requested from the vendor at 945. For example, if the predicted campaign yield is too low, the vendor may be requested (e.g., via a webpage associated with a CCCII marketplace, via email) to adjust the commission rate to increase the predicted campaign yield to an acceptable level.

If the quality metrics are satisfied the CCCII may commence the investor funded ad campaign at 949. In one implementation, the investor funded ad campaign may be made available to investors for consideration. For example, investors may be able to search for, bookmark, invest in, and/or the like the investor funded ad campaign.

Figure 10:
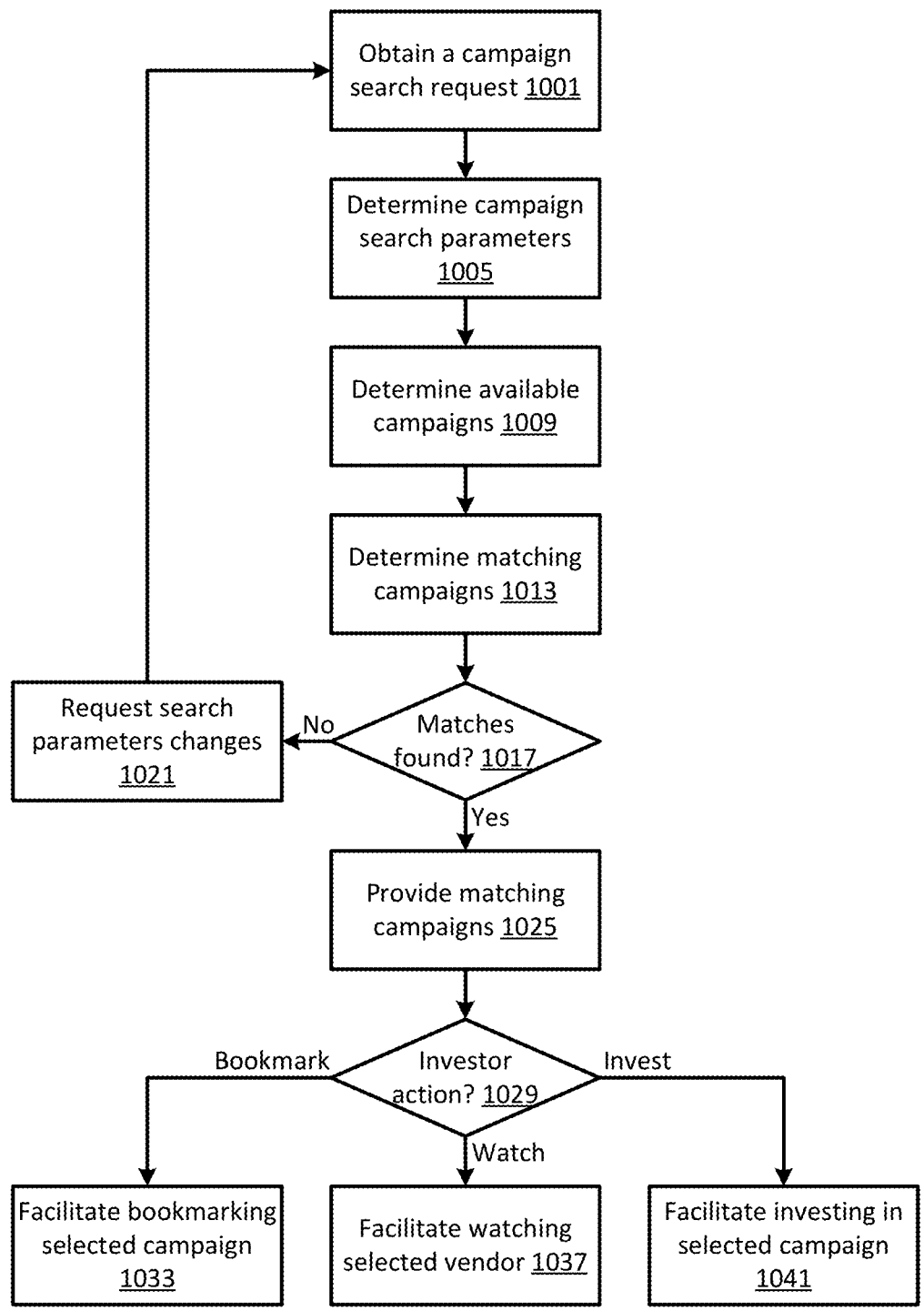
FIG. 10 shows a logic flow diagram illustrating embodiments of a campaign matching (CM) component for the CCCII.

FIG. 10 shows a logic flow diagram illustrating embodiments of a campaign matching (CM) component for the CCCII. In FIG. 10, a campaign search request may be obtained at 1001. For example, the campaign search request may be obtained when an investor submits a request to find investor funded ad campaigns that the investor may be interested in funding.

Campaign search parameters may be determined at 1005. In one implementation, the campaign search request may be parsed (e.g., using PHP commands) to determine the campaign search parameters. For example, the campaign search parameters may include allowed values for vendor category, budget limits, open funding remaining, budget window, expected yield, yield consistency, negative return rate, and/or the like specified by the investor.

Available campaigns may be determined at 1009. In one implementation, available campaigns may include investor funded ad campaigns that have commenced and that have not been fully funded. In another implementation, available campaigns may include investor funded ad campaigns that the investor is qualified to fund (e.g., a campaign may have specified prerequisites for investors such as a minimum funding amount, a minimum income level, and/or the like).

Matching campaigns may be determined at 1013. In one implementation, values of the campaign search parameters may be matched against the corresponding values associated with the available campaigns to find matching investor funded ad campaigns. For example, the matching campaigns may be determined via a MySQL database command similar to the following:

```
SELECT campaignID
FROM Campaigns
WHERE campaignCommenced = TRUE AND
    campaignPredictedYield >= 0.25 AND
    campaignNegativeReturnLikelihood < 0.15;
```

A determination may be made at 1017 whether matching investor funded ad campaigns have been found. If matching investor funded ad campaigns have not been found, search parameters changes may be requested from the investor at 1021. For example, the investor may be informed that no matches have been found and asked to adjust the search parameters (e.g., via a webpage associated with a CCCII marketplace).

If matching investor funded ad campaigns have been found, the matching campaigns may be provided to the investor at 1025. For example, the investor may be shown a list of the matching investor funded ad campaigns and information regarding each campaign (e.g., campaign profile, predicted campaign yield, negative return likelihood). In another example, the investor may select a matching investor funded ad campaign to see additional details regarding the campaign and/or to take an action with regard to the selected campaign.

An investor action with regard to the selected investor funded ad campaign may be determined at 1029. In one embodiment, the investor may wish to bookmark the selected investor funded ad campaign. Accordingly, bookmarking the selected campaign may be facilitated at 1033. For example, the selected campaign may be added to a list of the investor's bookmarks. In another embodiment, the investor may wish to watch a vendor (e.g., associated with the selected investor funded ad campaign). Accordingly, watching the vendor may be facilitated at 1037. For example, the investor may be informed when the selected vendor creates new investor funded ad campaigns (e.g., campaigns that match specified search parameters). In yet another embodiment, the investor may wish to invest in the selected investor funded ad campaign. Accordingly, investing in the selected campaign may be facilitated at 1041. For example, funds specified by the investor may be transferred into an escrow account associated with the selected campaign.

Figure 11:
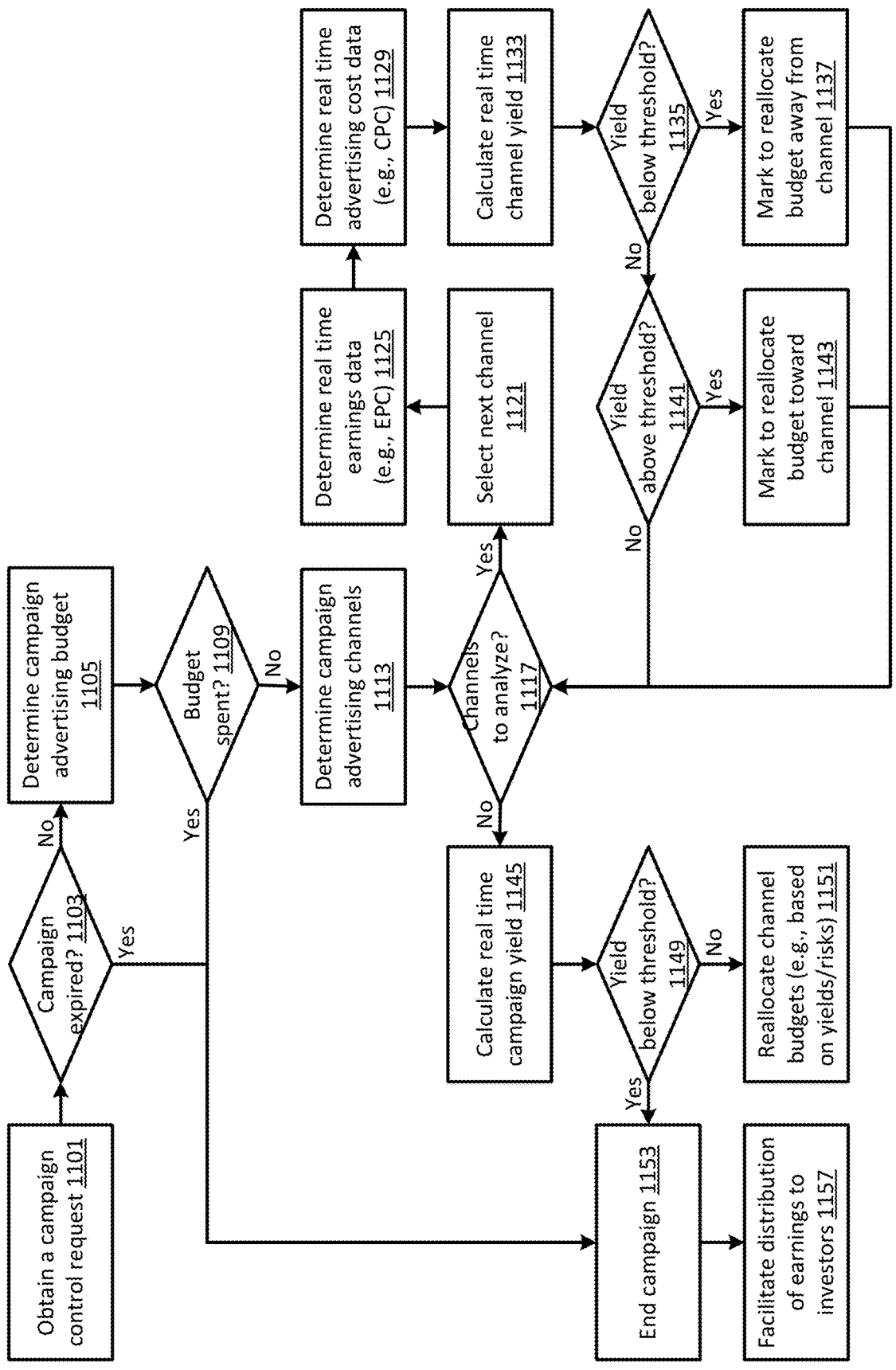
FIG. 11 shows a logic flow diagram illustrating embodiments of a campaign controlling (CC) component for the CCCII.

FIG. 11 shows a logic flow diagram illustrating embodiments of a campaign controlling (CC) component for the CCCII. In FIG. 11, a campaign control request may be obtained at 1101. For example, the campaign control request may be obtained periodically (e.g., hourly) or as configured (e.g., when updated earnings and/or advertising cost data is obtained) to facilitate desired campaign operation of an investor funded (e.g., crowdfunded) ad campaign of a vendor.

A determination may be made at 1103 whether the investor funded ad campaign expired. In one implementation, the investor funded ad campaign may have an expiration time that may be checked against the current time to make this determination. If the investor funded ad campaign expired, the campaign may be ended at 1153. In one implementation, advertising activities associated with the campaign may be stopped.

If the investor funded ad campaign did not expire, campaign advertising budget for the investor funded ad campaign may be determined at 1105. For example, the campaign advertising budget may be retrieved via a MySQL database command similar to the following:

```
SELECT campaignAdvertisingBudget
FROM Campaigns
WHERE campaignID = ID_ad_campaign_2;
```

A determination may be made at 1109 whether the campaign advertising budget has been spent. In one implementation, the budget amount spent so far may be determined in real time as clicks occur (e.g., from direct control over the CPC budget settings for the vendor), a and may be compared with the campaign advertising budget to make this determination. If the campaign advertising budget has been spent, the campaign may be ended at 1153. In one implementation, advertising activities associated with the campaign may be stopped.

If the campaign advertising budget has not been spent, campaign advertising channels for the investor funded ad campaign may be determined at 1113. For example, data regarding the campaign advertising channels may be retrieved via a MySQL database command similar to the following:

```
SELECT campaignAdvertisingChannels
FROM Campaigns
WHERE campaignID = ID_ad_campaign_2;
```

A determination may be made at 1117 whether there remain campaign advertising channels to analyze. In one implementation, any campaign advertising channel (e.g., for which advertising activities have not been stopped) associated with the investor funded ad campaign may be analyzed. If there remain campaign advertising channels to analyze, the next campaign advertising channel to analyze may be selected at 1121.

Real time earnings data associated with the selected campaign advertising channel may be determined at 1125. In one implementation, tracking pixel activations (e.g., that indicate purchases) and/or vendor ad campaign data (e.g., regarding purchases) associated with the selected campaign advertising channel may be analyzed to determine earnings associated with the selected campaign advertising channel. For example, EPC for the time period associated with the campaign control request (e.g., for the last hour) may be calculated by dividing the total earnings (e.g., from purchase transactions) associated with the selected campaign advertising channel for the time period by the total clicks (e.g., determined based on the number of tracking link clicks) associated with the selected campaign advertising channel for the time period.

Real time advertising cost data associated with the selected campaign advertising channel may be determined at 1129. In one implementation, tracking link clicks and/or vendor ad campaign data (e.g., regarding advertising cost) associated with the selected campaign advertising channel may be analyzed to determine advertising cost associated with the selected campaign advertising channel. For example, CPC for the period associated with the campaign control request (e.g., for the last hour) may be calculated by dividing the total advertising cost associated with the selected campaign advertising channel for the time period by the total clicks (e.g., determined based on the number of tracking link clicks) associated with the selected campaign advertising channel for the time period.

Real time channel yield for investors may be calculated at 1133. In one implementation, the real time yield for investors may be calculated according to the following formula:

Yield Percentage=(investor earnings for the time period−advertising cost for the time period)/ advertising cost for the time period For example, using the real time EPC and CPC amounts, the real time channel yield for investors may be calculated according to the following formula:

Yield Percentage=((EPC for the time period*commission rate)−CPC for the time period)/CPC for the time period A determination may be made at 1135 whether the real time yield for investors for the selected campaign advertising channel for the time period is below a specified lower threshold. In one implementation, the lower threshold may be specified as a fixed value (e.g., if the yield is below 0%). For example, different fixed values may be specified for different time periods (e.g., during hour 1 of 24 the lower threshold may be −100%, during hour 12 of 24 the lower threshold may be 0%). In another implementation, the lower threshold may be specified based on the risk of a negative yield (e.g., if the risk is above 40%). For example, the risk of a negative yield may be calculated using a linear regression to forecast whether the yield for the next period is likely to be negative (e.g., based on yields calculated for the last three time periods). In another example, additional factors such as the average uptime for the vendor's website, the average uptime for the selected campaign advertising channel, the relative uptime for the vendor's purchase transaction processor, and/or the like may be used to calculate (e.g., based on a weighted average) the risk of a negative yield. If the yield is below the specified lower threshold, the selected campaign advertising channel may be marked as underperforming at 1137 to reallocate advertising budget away from the channel.

A determination may be made at 1141 whether the real time yield for investors for the selected campaign advertising channel for the time period is above a specified upper threshold. In one implementation, the upper threshold may be specified as a fixed value (e.g., if the yield is above 50%). In another implementation, the upper threshold may be specified based on the risk of a negative yield (e.g., if the risk is below 5%). If the yield is above the specified upper threshold, the selected campaign advertising channel may be marked as outperforming at 1143 to reallocate advertising budget toward the channel.

If there are no more campaign advertising channels to analyze, real time campaign yield for investors for the investor funded ad campaign for the time period may be calculated at 1145. In one implementation, the real time campaign yield may be calculated in a similar manner as described with regard to 1133 but using real time earnings and advertising data associated with the investor funded ad campaign (e.g., aggregated across campaign advertising channels for which advertising activities have not been stopped).

A determination may be made at 1149 whether the real time campaign yield for investors for the time period is below a specified lower threshold. In one implementation, the lower threshold may be specified as a fixed value (e.g., if the yield is below 0%). In another implementation, the lower threshold may be specified based on the risk of a negative yield (e.g., if the risk is above 40%).

If the real time campaign yield is not below the specified lower threshold, channel budgets for the campaign advertising channels may be reallocated at 1151. For example, a CCCII administrator may specify a budget reallocation method. In one implementation, channel budgets may be adjusted to reallocate the campaign advertising budget away from underperforming channels and toward the outperforming channels (e.g., based on real time yields and/or negative yield risks associated with the channels). For example, advertising activities associated with underperforming channels may be stopped and their budgets reallocated to outperforming channels.

If the real time campaign yield is below the specified lower threshold, the campaign may be ended at 1153. In one implementation, advertising activities associated with the campaign may be stopped.

Distribution of earnings to investors may be facilitated at 1157. In one implementation, investors who contributed to funding the campaign may be paid at a percentage rate equivalent a to the percentage of the campaign budget that they funded. For example, if an investor paid for 10% of the advertising cost, the investor earns 10% of the campaign yield (e.g., payment to the investor=total campaign earnings*the commission rate*10%).

Figure 12:
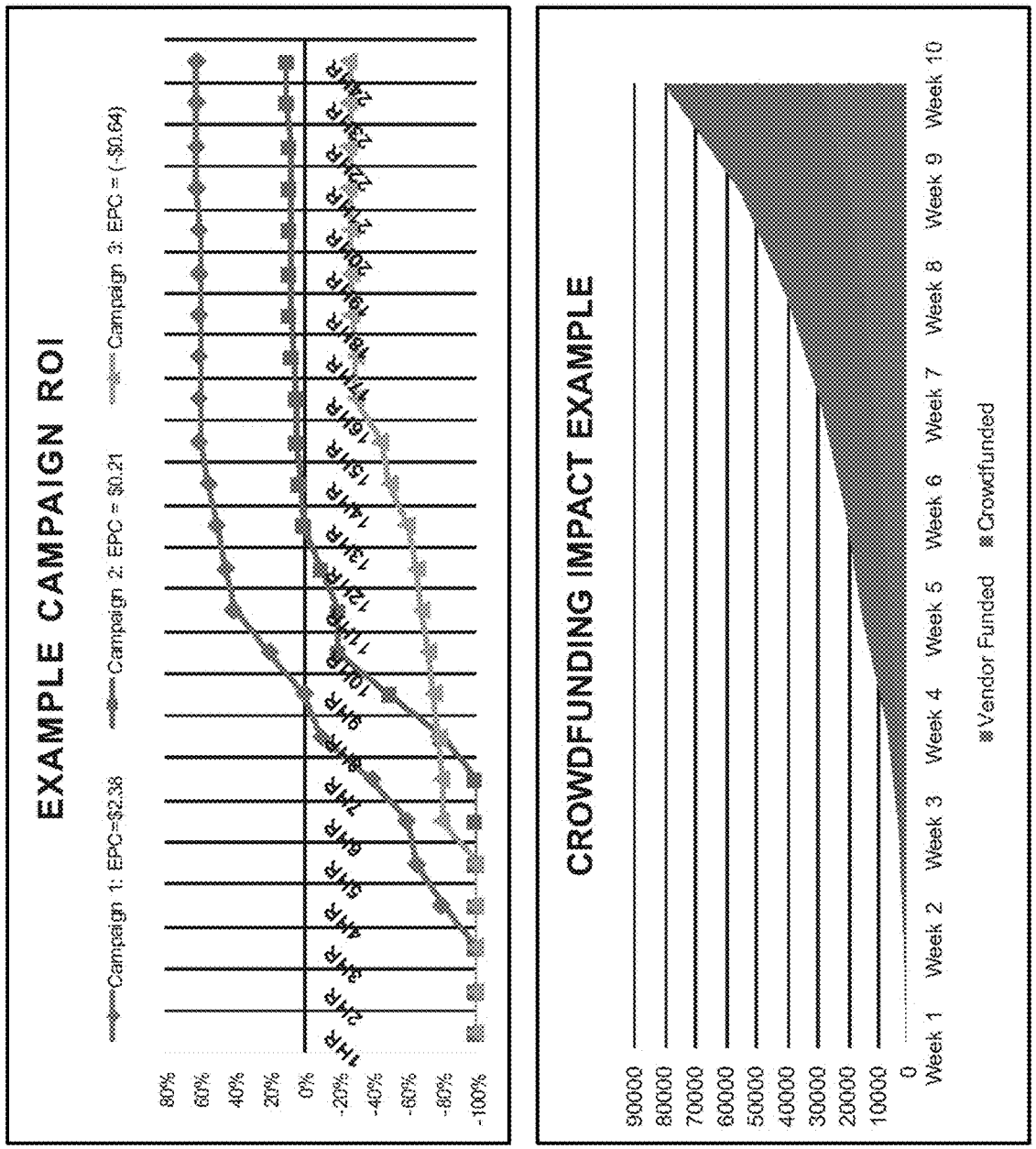
FIG. 12 shows a screenshot diagram illustrating embodiments of the CCCII.

FIG. 12 shows a screenshot diagram illustrating embodiments of the CCCII. In FIG. 12, an example campaign yield across three campaign advertising channels is shown for a day (e.g., over 24 one-hour time periods). Advertising channels 1 and 2 provide positive yields for investors, while advertising channel 3 provides a negative yield. Accordingly, channel budgets may be reallocated to shift advertising budget away from advertising channel 3 and toward advertising channel 1 (e.g., toward the advertising channel with the best yield). Net EPC (e.g., calculated as EPC minus CPC) for each advertising channel (e.g., $2.38 for advertising channel 1, $0.21 for advertising channel 2, ($0.64) for advertising channel 3) is also shown.

A crowdfunding impact example is also shown in FIG. 12. The crowdfunding impact example illustrates that earnings growth from a crowdfunded ad campaign may be significantly higher than earnings growth from a vendor funded ad campaign because of additional advertising budget available for the crowdfunded ad campaign.

FIG. 13 shows a screenshot diagram illustrating embodiments of the CCCII. In FIG. 13, the shown campaign generator GUI may be used by a vendor (e.g., Vendor A) to specify campaign parameters for an investor funded ad campaign. The ad campaign may be configured to have a campaign duration of 10 days, a daily budget of $10,000, and a vendor daily contribution of $2,000. The vendor may specify advertising channels, Facebook ads with an initial daily budget of $5,000 and Google AdWords with an initial daily budget of $5,000, for the ad campaign. The vendor may also specify that the commission rate should be 30%, which would result in an estimated yield to investors of 45%. The Generate Campaign button may be used to submit a campaign generation request with the specified campaign parameters to a CCCII marketplace.

Figure 14:
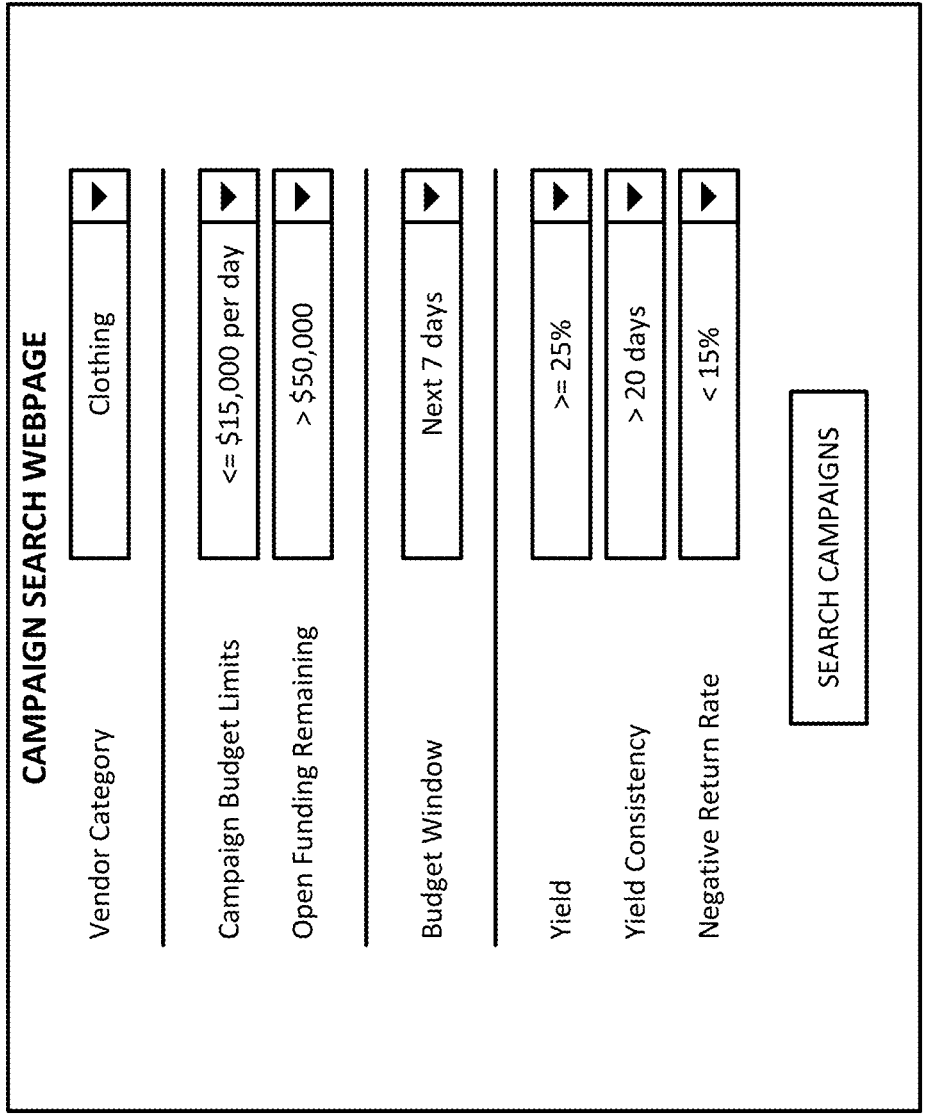
FIG. 14 shows a screenshot diagram illustrating embodiments of the CCCII.

FIG. 14 shows a screenshot diagram illustrating embodiments of the CCCII. In FIG. 14, the shown campaign search GUI may be used by an investor to specify search parameters for investor funded ad campaigns that the investor may be interested in funding. The investor may specify that the investor is interested in ad campaigns from vendors associated with the clothing vendor category, with campaign budget limit of less than or equal to $15,000 per day, with open funding remaining of more than $50,000, and with a budget window for the next 7 days. The investor may also specify that the campaign should have an estimated yield to investors of more than or equal to 25%, a yield consistency (e.g., average duration in days where the vendor associated with the ad campaign had a positive yield to investors) of more than 20 days, and a negative return rate of less than 15%. The Search Campaigns button may be used to submit a campaign search request with the specified search parameters to a CCCII marketplace.

Figure 15:
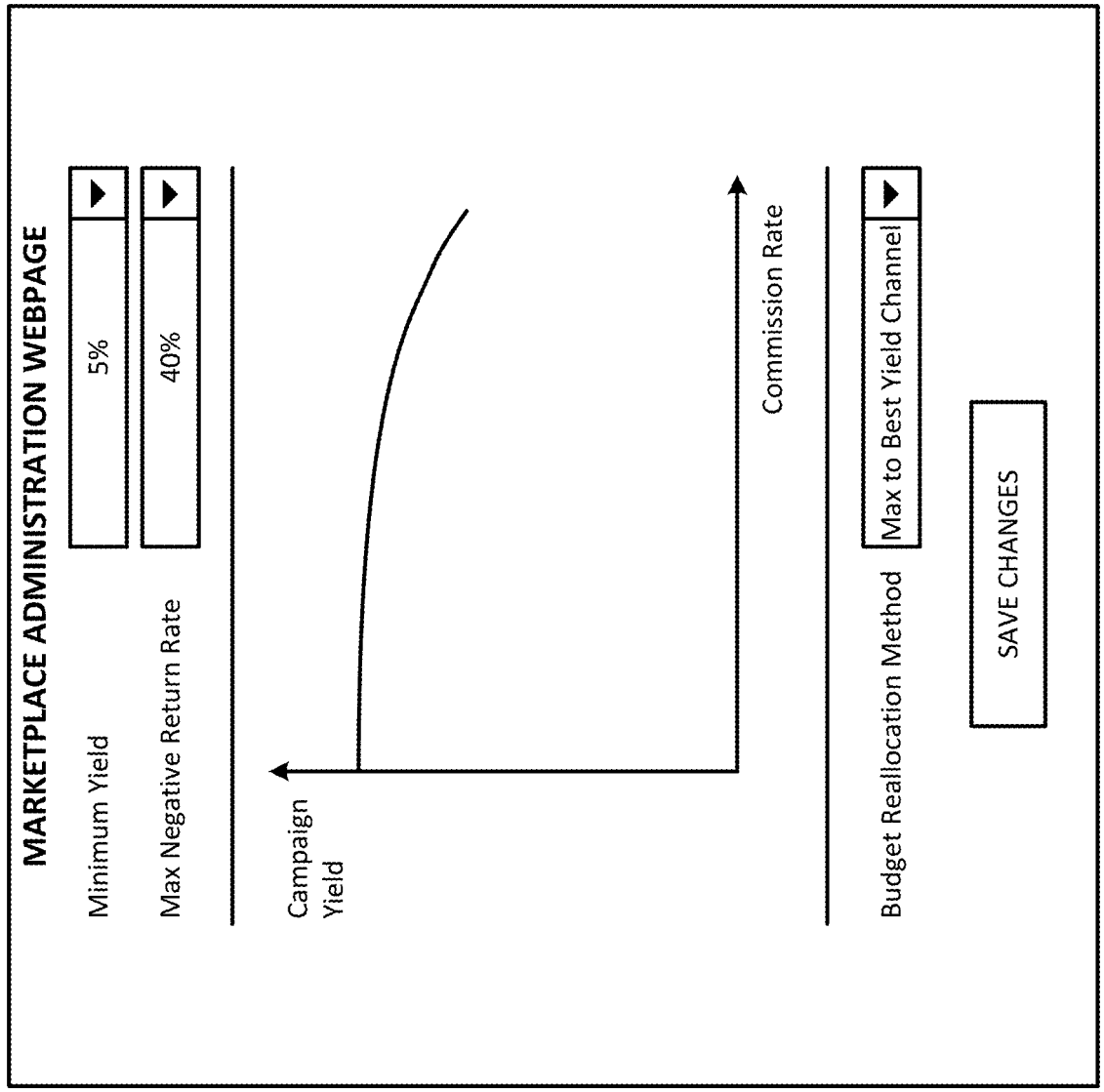
FIG. 15 shows a screenshot diagram illustrating embodiments of the CCCII.

FIG. 15 shows a screenshot diagram illustrating embodiments of the CCCII. In FIG. 15, the shown marketplace administration GUI may be used by a CCCII administrator to configure a CCCII marketplace. The CCCII administrator may specify quality metrics for investor funded ad campaigns, such as a minimum expected yield to investors of 5% and a maximum negative return rate of 40%. The CCCII administrator may also specify how a marketplace commission rate (e.g., commission paid to the CCCII marketplace from earnings that reduces earnings for the vendor and for the investors) should be adjusted depending on campaign yield (e.g., the marketplace commission rate may be reduced for ad campaigns with a lower campaign yield to improve the attractiveness of such ad campaigns to investors). The CCCII administrator may also specify a budget reallocation method for advertising channels (e.g., reallocate maximum advertising budget toward the advertising channel with the best yield to investors).

Additional Alternative Embodiment Examples

The following alternative example embodiments provide a number of variations of some of the core principles already discussed for expanded color on the abilities of the CCCII.

CCCII Ad Campaigns

The CCCII allows, for example, an ad campaign to be purchased via an ad platform (e.g., via the ClickBank platform); this provides a Cost to Acquire. The purchase may be visible or powered by the platform. This provides a realtime Earnings-per-Click (EPC). The campaigns available for funding are, for example, those who have a funnel that yields a positive ROI. Campaigns could be Cost-per-Sale or Cost-per-Acquisition (CPA) (e.g., a fixed bounty for a paying customer). Anyone with a CCCII account can fund the campaigns for a high performing funnel.

In one embodiment, the CCCII platform calculates risk for the investment and the returns on the investment in realtime, automatically. Funds are routed to profitable campaigns and turned off when the return is negative. Clients start new campaigns and grow the returns with their own cash until it turns positive; then the CCCII system kicks in.

The percentage of the daily budget funded by a given CCCII account holder is the portion of the earnings received from that campaign. If the funding source provided 10% of the traffic, they get 10% of the ROI. CCCII may charge for a part of the proceeds on several portions, for profitable campaigns, plus the existing transaction fee.

In one embodiment, the CCCII includes and/or incorporate an ad network platform/component. A Demand-Side Platform (DSP) is used by advertisers who are willing to pay for traffic. DSPs are available from numerous companies that offer pre-built connections to many ad networks such as Facebook, Google, Yahoo, AOL, etc. CCCII can obtain and may need to modify, a commercial off-the-shelf DSP platform; these are often SAAS solutions.

In one embodiment, the CCCII allows users to configure and fund campaigns. The daily budget amounts for campaigns may be limited according to rules that can be configured and controlled by CCCII staff. Cash may be paid by CCCII into the exchange for the purchase of traffic; in essence, it is CCCII doing the buying. The CCCII may include rules to keep a client from spending hundreds per click because it is not their money.

In one embodiment, the CCCII may include an escrow system/component. CCCII employs a mechanism for an account holder to push instructions (e.g., optionally credits, funding, etc.) into CCCII which can then be spent for ad campaigns. CCCII includes realtime, accurate metrics to ensure the system is routing funds to profitable campaigns and away from negative campaigns. The EPCs and Risk %'s will be revised for a given marketplace. Mechanisms for asset (e.g., fund) management, determination of how much is permitted for a daily ad budget, and when payout windows are locked, are defined.

An example campaign ROI. The CCCII may channel money to Campaign 1 and Campaign 2. Payouts for this day's ad spend would be blended across the results of the 3 channels. As clicks and subscription revenue come in over time, the EPC will grow and payouts will continue. However, initial payouts for standard sales and upsells should lock after a period of time.

An example crowdfunding. For example, the impact of pushing additional revenue into campaigns that perform well is seen here. Crowdfunded spending can accelerate growth. As such, the CCCII margin can be generated on: ad spend, earned revenue payouts, and transaction fees. The CCCII provides more efficient resource utilization. It flips the cycle on its head. In cases where clients are spending money in negative campaigns, the CCCII can channel that cash flow to positive ROI funnels. This may compound earnings. Since the CCCII is buying the ads, it can use that scale to achieve additional margin and strong relationships. The CCCII provides a high converting funnel. The tools that power this can compound earnings for everyone. In one embodiment, the CCCII is offered as a platform, for free.

In one embodiment, the CCCII includes tools to detect criminals and/or those that try to game the system so as to spot and close cash leaks, e.g., for properly managing refunds/chargebacks so that expenses can be recouped.

In one embodiment, the CCCII provides a tool to balance supply and demand (e.g., ad saturation) to manage, e.g., any natural cap to the number of potential consumers who will buy a product. As campaign spending grows, the return may decrease. As such, the CCCII may optimize for yield by avoiding over-spending. This may create a supply & demand solution for crowdfunded ad buy problems.

In one embodiment, the CCCII provides controls on how money is spent for ad campaigns (e.g., via an ad platform), e.g., offering the ability for clients to manage the campaign with CCCII managing the funding.

In one embodiment, CCCII helps with important metrics and workflow.

Success=Cost of Acquisition <Immediate Customer Value (e.g., this metric often referred to as Earnings Per Click or EPC)

EPC=Immediate Customer Value−Cost of Acquisition

A focus of such a metric may include:
The cost per visitor is generally steady and fixed by ad supply & demand.
Clients focus on optimizing the conversions in their funnel, to yield the highest return.
Once they have an offer that converts with a positive ROI, they spend as much as they can to buy traffic for that funnel.
The CCCII allows various affiliate interaction:
Good vendors attempt to educate the affiliate space as much as possible about how to buy traffic that will convert with a successful EPC.
Vendors tout their EPC to try and attract powerful affiliates.
Affiliates face the same math problem in buying advertising.

CCCII Ad Investment Marketplace

In one embodiment, the crowdsource component works as follows:

1. Calculations and algorithms for determining the following important metrics, which are presented through this Ad Investment Marketplace, namely: Real-time Yield, Negative Return Prediction, Yield Consistency 2. For each online merchant, the marketplace will aggregate and average the yield for historical ad campaigns, including the prior day's performance, and the negative return prediction.

3. The marketplace presents a complete list of online merchants whose ad campaigns are available for funding which can be discovered using the following hierarchical or sorting/filtering conditions:

166.1. a. Online Merchant Category (e.g., Health & Fitness, Clothing, Photography, etc.)
166.2. b. Ad Campaign Budget Limits (e.g., Online Merchants who have ad budgets broken down into different tiers such as "Less than $1,000 per day", "Less than $10,000 per day", etc.)
166.3. c. Yield Consistency (e.g., Average duration in days where the online merchant had a positive yield)
166.4. d. Open Funding Amount Remaining (e.g., amount of an upcoming ad campaign budget that remains to be funded in either dollar or percentage increments)
166.5. e. Budget Window (e.g., a setting that allows the 3rd party to find budget windows that can be "today", "tomorrow", "next 7 days", etc. This shows ad campaign spending cycles for different time frames)
166.6. f. Yield Rates (e.g., Show online merchants whose yield is greater or lower than some threshold. "Greater than 10%", or "Greater than 25%", etc.)
166.7. g. Negative Return Rates (e.g., Show online merchants whose predicted negative rates are greater or lower than some threshold. "Less than 20%", "Less than 5%")

4. The marketplace provides individual online merchant listings including statistics for.

167.1. a. Category
167.2. b. Ad Campaign Budget Limit (e.g., Maximum budget window cycle funding permitted for the online merchant. For example, "$500 per Day per Campaign")
167.3. c. Ad Campaign Budget Window Cycle (e.g., budgets are set daily/weekly/monthly, etc.)
167.4. d. Average Yield Across All Campaigns for Merchant
167.5. e. Yield Consistency
167.6. f. Open Funding Windows (e.g., what budget cycles remain available for funding)
167.7. g. Funding Amount Remaining per Window (e.g., what ad campaign budgets remain open for funding)
167.8. h. Negative Return Prediction
167.9. i. Online Merchant Description
167.10. j. Links to merchant store 5. The marketplace also provides access to the purchase option for a 3rd party to issue funds for a given online merchant's budget window. The 3rd party would use this to trigger a funding event.

6. The marketplace provides 3rd parties the following capabilities to manage their processes:
   169.1. a. Bookmarking an online merchant's listing
   169.2. b. Watch feature that enables the 3rd party to receive notification when a specific online merchant has an open funding window CCCII Ad Yield Prediction The CCCII solves a problem for online advertising—predicting the future yield of an ad campaign based on historical performance. Over a period of time, online advertising results in less and less traction with consumers as they become accustomed to the creative assets and techniques used to attract their attention and ultimately, their money. Ad campaigns may also reach saturation points where the market of consumers who are willing to purchase a product or engage with such an ad has been exhausted and new supplies of consumers needs to be generated or ad creative and offers needs to be cycled and refreshed. The yield for ad campaigns will follow a declining trend which can be forecast given the capabilities of the CCCII Crowdfunded Ad Buying Platform.

As such, multiple variables are measured including ad spend yield, in real-time, to forecast the trend of the yield for the ad campaign. The major variables include a linear regression of yield trend over multiple time periods. Ad Yield predictions provide crowdfunded ad buyers the ability to plan ad campaigns and schedule refreshes appropriately, for ad creative assets. In addition, a forecast on the expiration of a given campaign can provide ad campaign creators insights into testing for future campaigns and planning of resources. The CCCII provides commercial advantage in optimizing the efficient use of time and resources as applied to ad configuration and execution. In one embodiment, yield prediction occurs as follows:

1. Online merchants will use the Crowdfunded Ad Buying Platform to configure and execute ad campaigns.

2. The ad platform calculates the yield in real-time.

3. For every campaign that an online merchant configures and executes, the platform will track the funds spent against those campaigns versus the return of those campaigns.

4. As yield results from the campaigns are calculated for discreet periods of time, a linear regression will be used to forecast the life expectancy of the campaign as it declines. (i.e., over time, a series of decreasing yield results will provide a forecast for when that yield result will fall into negative rates.) The linear regression also provides a measure of error in prediction that will also be used within the final calculation for the predicted cessation of the campaign.

5. The yield forecast is then presented as a value for decision making by the crowdfunded ad platform.

Yield Control

In one embodiment, the CCCIII solves a problem for crowdfunding of online advertising—providing a mechanism for online merchants to control 3rd party yield results through commission rates for various products sold. The CCCIII Crowdfunded Ad Platform may use 3rd party funds to pay for ad campaigns created by online merchants, in exchange for a share of the proceeds. Proceeds are defined in the form of commissions for the products sold by the online merchant. As an example, a strength training weight set may have a commission rate that can vary between 20% and 45%. In a typical affiliate model, the online merchant determines how much of the sale proceeds for that product are shared with the affiliate who referred the customer. With the CCCIII Crowdfunded Ad Platform, the commission rates determine the yield for the 3rd parties who funded the ad campaign. The a higher the online merchant sets the commissions, the higher the yield and vice versa.

The CCCIII describes a mechanism where the yield rates for 3rd party funds can be determined and set by the online merchant based on historical ad campaign results. The online merchant sees the Net Earnings per Click and the subsequent yield to 3rd parties based on current commission rate settings. In one embodiment, the CCCII displays a grid of 3rd party yield rates for varying settings in the commission rates for products. This gives the online merchant an ability to see how they can increase or decrease yield for the 3rd parties who are funding the ad campaigns in the platform. Adjusting the commission rates, correspondingly adjusts the yield rates.

3rd Party funding of ad campaigns work in exchange for a portion of the proceeds. The proceeds are determined by the commission rates set for the products sold by the online merchant. The CCCIII gives the online merchant the ability to see how changes in commission rates will affect yield rates for the ad campaign backers. This increases the efficiency of the marketplace where online merchants may be in competition for limited ad campaign funding. Also, it maximizes the overall yield for ad campaign backers as online merchants adjust to remain competitive. In one embodiment, the CCCII provides yield control as follows:

1. 3rd party yield rates are determined in large measure by the commission rates set by the online merchant for their products. Higher commissions drive higher yields. Transactions are often a blend of commission rates as consumers select different products. This turns into an average over a period of time.

2. The system knows historical yield and transaction value and the blend of products sold. It uses this information to show historical yield for the 3rd parties.

3. Based on blended rates, the system shows potential increases or decreases in yield for 3rd parties by increasing or decreasing commission rates for the products.

4. Online merchants who have very high performing funnels with very high commission rates may be giving too much money to the 3rd parties funding the ad campaigns and thus will lower yield by decreasing commissions to maximize their earnings.

5. Under performing online merchants who have difficulty obtaining 3rd party interest due to low yield rates can see how increasing their commission rates will drive higher yields, leading to greater interest from backers.

Crowdsource Traffic Acquisition

The CCCII solves the problem for online advertising—increasing the available capital for purchase of traffic destined to an online website. Online merchants are often restricted from acquiring new customers through advertising, because they have limited capital to spend to source traffic through internet marketing. As they develop a marketing funnel that produces profitable results, some portion of their earnings must be re-invested into acquiring new customers. The cash flow cycle can be limited by payment cycles for their platform/merchant account/retailing model and they may also experience limited growth due to the time required to incrementally grow the investment in advertising as capital grows from sales. The dominant, existing market solutions, are primarily in the form of companies that offer capital for media buying in exchange for a portion of the revenue. Unlike the CCCII, these companies typically operate manually and by partnership with a given online merchant, to help them configure and drive their campaigns in exchange for revenue shares. Examples include: Media-Funding.com and MediaFundingGroup.com.

To solve this problem, the (CCCII Crowdfunded Traffic Buying) CCCII crowdfunds profitable ad campaigns at scale, automatically, with 3rd party money, in exchange for a share of the proceeds from that campaign, paid to those 3rd parties in the form of portions of an affiliate commission, in an amount that corresponds with the portion of the traffic capital provided.

In one embodiment, it works as follows:

1. CCCII vendors, using the CCCII platform, setup ad campaigns for paid traffic through an interface that provides access and inventory to online ad exchanges.

2. Though vendors are creating and managing their own campaigns, it is a CCCII account with the ad network that is being billed for campaigns.

3. As transactions are completed on the CCCII platform, for traffic from a given ad campaign, a realtime earnings per visitor metric is calculated.

4. The ROI for a campaign is calculated based on subtracting the cost paid per visitor from the earnings per visitor.

5. Vendors use the CCCII platform to set the affiliate commission rate for their products, which influences the yield rate, for those who fund the campaign.

6. CCCII account holders select campaigns to fund, based on metrics the platform provides that communicate average yield for prior campaigns and the risk of a negative return as calculated by the rate of negative returns. Only campaigns that have a history of positive ROI will be available for funding by 3rd parties.

7. Each day, a daily budget cap for campaigns for each vendor will be made available for funding. Once a campaign reaches the maximum funding level, that funding opportunity will be closed.

8. At the close of a given cycle, usually Net-20 or Net-30 days, CCCII will be charged by the ad exchange for all traffic purchased through the platform. The funds contributed by 3rd party account holders will be held in escrow until needed to settle the ad network invoices.

9. 3rd party accounts who contribute to funding a campaign are paid at a percentage rate equivalent to the percentage of the budget they funded. For example, if they paid for 10% of the day's traffic, they earn 10% of the yield.

Escrow Management of Crowdsourcing

The CCCII solves the problem for crowdfunding of online advertising—providing a mechanism for 3rd party ad campaign backers to provide and manage their money for the purposes of purchasing online advertising campaigns controlled by an online merchant who is a separate entity. The CCCII Crowdfunded Ad Platform may use 3rd party money to pay for ad campaigns created by online merchants, in exchange for a share of the proceeds. Once a backer (the 3rd party who desires to give money towards an ad campaign) selects an online merchant that they wish to give funds to, a mechanism must exist to capture those funds, designated for that online merchant, and then manage the allocation of those funds for that purpose. The CCCII solves a barrier to crowdfunding for ad campaigns by providing a method whereby funds are captured, designated, and managed for ad campaign expenses.

Though the mechanism by which the monies are transferred between any 3rd party backer and CCCII are well understood and common, including ACH, XACH, Wire, Credit Card, Check, etc., the CCCII provides the methods for allocation and locking of such funds, in escrow, specifically for ad campaign purchases controlled by a separate entity.

The CCCII provides 3rd parties the ability to manage their money which is used towards the funding of ad campaigns for online merchants. The system enables these individuals to un-designate, add and withdraw funds as needed. Crowdfunding for ad campaigns in exchange for a portion of the proceeds does not work without acquiring funds from 3rd parties and managing those monies. The CCCII is critical towards the success of the model. In one embodiment, the CCCII escrow component works as follows:

1. 3rd party backers provide funds to CCCII which are then held in escrow until allocated and spent.

2. The platform provides a display to the 3rd party that shows:

201.1. a. Total funds held 201.2. b. Funds "locked" towards a budget window for a given online merchant; a locked state is achieved some period of time prior to the execution of that campaign and are considered fully 'spent' at that point.

201.3. c. Funds "designated" towards a budget window for a given online merchant along with the "Lock" date; designated funds have been set towards a budget, but are not locked until the lock date and thus, are able to be removed and reallocated towards different campaigns or purposes.

201.4. d. Funds "unspent" and returned from a campaign budget that did not fully spend out (e.g., $10,000 may be allocated for a given day's campaign, but the ad network does not fully spend that money and thus, the funds are returned to the 3rd parties)

201.5. e. Funds spent and the yield from those spends 201.6. f. Reserves held for future returns (CCCII manages reserve rate settings on accounts to ensure funds are available for paying to consumers as returns and chargebacks occur. In the event that a refund or chargeback happens, those parties who earned revenue from that initial transaction are debited to cover the refund or chargeback)

3. The platform provides a mechanism for the 3rd party to take the following actions:
- 202.1. a. Un-allocated funds that are designated but not locked.
- 202.2. b. Add Funds—allows them to put more money into their CCCII account for purposes of ad campaign funding
- 202.3. c. Distribute Funds—Allows them to set aside a portion of the funds available for issuing to them via direct deposit, check, etc.

CCCII Negative Return Predictor

The CCCII solves the problem for online advertising—predicting the risk of a negative return for ad expenditure. As online merchants pay for advertising campaigns, there is little information that they can use to understand the percentage of risk that their funds could return a negative earnings rate. In the CCCII Crowdfunded Ad Buying Platform, 3rd party accounts will select specific online merchants that they wish to fund. For campaigns where the real-time yield is positive, there will remain some level of risk that the return could be negative. The CCCII provides a mechanism and algorithm for calculating the percentage risk that a negative return may be incurred for funding a given online merchant.

There are several conditions that could cause a campaign spend to result in a negative return including:
1. Poorly configured campaign with inaccurate targeting which results in spend to acquire consumers who are not interested in the products offered
2. Ad saturation where consumer interest in a given campaign declines over time due to high volumes of ad impressions
3. An outage in the ad platform or referral tracking platform that prevents consumers from reaching the destination merchant website
4. An outage on the online merchant's website which results in error conditions preventing consumers from shopping
5. An outage in the transaction processor that results in error conditions preventing consumers from buying the products
6. A lack of physical product inventory resulting in missed sales for traffic that clicked through advertisements to visit the online merchant Multiple variables are measured including ad spend yield, in real-time, to determine the odds of a negative return for a given online merchant. The major variables include a linear regression of yield trend over multiple time periods, frequency of negative return weighted by rate of return, and frequency of downtime among the various constituent platforms involved in the system. Negative return predictions provide crowdfunded ad buyers the ability to view a measure of their potential risk for choosing to fund a given time period for a given online merchant. Some merchants will provide consistent, steady returns, and other less capable online merchants will cause ad purchases to result in negative returns more frequently. This provides a unique advantage where the CCCII Crowdfunded Ad Platform channels funds to the most lucrative opportunities with the most stable return on those funds. In one embodiment, the CCCII does this as follows:

1. Online merchants will use the Crowdfunded Ad Buying Platform to configure and execute ad campaigns.
2. The ad platform calculates the yield in real-time.
3. For every campaign that an online merchant configures and executes, the platform will track the funds spent against those campaigns versus the return of those campaigns.
4. The rate of negative dollars spent versus positive dollars spent is tracked for a a given time period.
5. As yield results from the campaigns are calculated for discreet periods of time, a linear regression will be used to forecast the potential negative return. (i.e., over time, a series of decreasing yield results will provide a forecast for when that yield result will fall into negative rates.) The linear regression also provides a measure of error in prediction that will also be used within the final calculation for the predicted risk of return.
6. The platform also tracks the relative uptime for the online merchant's website to determine their average down time rates.
7. The platform also tracks the relative uptime for the referral tracking system to determine their average down time rates.
8. The platform tracks the relative uptime for the transaction processor to determine their average down time rates.
9. The risk of a negative yield is calculated based on a fixed time frame for each of the rates identified above, which are then weighted based on the impact; for example, a complete outage of a portion of the platform would yield −100% return versus poor targeting which may yield −20%. (i.e., for a 20% loss, you would anticipate earning $80 on a $100 spend).

CCCII Real-Time Yield Calculation

The CCCII solves the problem for online advertising—calculating the yield on ad spend on a near-real-time basis. As online merchants or affiliates pay for advertising campaigns which drive customers to an online storefront, the results of that campaign are often calculated days or weeks after the campaign has completed. The measurements are frequently conducted by combining data from multiple service provider platforms including an ad exchange or demand-side platform, a referral tracking system, a transaction engine such as a payment gateway or payment facilitator, and an affiliate commission system. A delayed view in ad performance can result in wasted ad expenditures as funds are spent for ad campaigns that are not returning a positive result. The CCCII combines multiple capabilities for the purposes of displaying near real-time yield results from advertising campaigns, for both online merchants and affiliate advertisers. Such a feature is made possible by combining the ad buying event, the click and referral tracking event, the transaction event, and commission payment events into a single platform.

To solve this problem, the CCCII Crowdfunded Ad Platform calculates the ad expenditure in real-time as clicks occur, from direct control over the cost-per-click budget settings for the online merchant. Tracking mechanisms provide the platform knowledge of a discrete consumer, visiting due to a click on an advertisement, which is connected to data from the transaction engine. This determines the yield for non-affiliate expenditures. Platform knowledge of product commission rates will be used to calculate the ad campaign yield for affiliate advertisers, in near real-time.

The Real-Time Yield Calculation combines metrics, in real-time, from multiple events including the cost paid for an ad click through the referral event which tracks the Internet device, to the transaction event to provide real-time yield results for stakeholders. In the current online advertising and merchant space, advertisers and online merchants must combine data from disparate platforms to measure ad campaign yields days or weeks after the advertising spend has been made. With the CCCII, the determination of success is moved up to a near real-time state, allowing ad spend to be channeled to campaigns that produce positive returns versus those that are losing money. This unique advantage is possible because the platform includes both the ad expense in real-time and the transaction event, in real-time. In one embodiment, the CCCII does this as follows:

1. Advertisement campaigns are managed through the platform where a cost-per-click budget is set.

2. Clicks on advertisements are routed through a referral tracking mechanism that ties the consumer's Internet device to the ad campaign. The click event is tracked by the platform, which adds a cost-per-click event to the yield calculation.

3. Consumers who purchase generate transaction events that include a transaction order value. Each transaction adds to the total transaction value for the real-time calculation.

4. The system determines if the traffic is purchased by an affiliate advertiser fund source. This determines if the yield is factoring a commission rate for total transaction value.

5. For online merchants, yield is calculated for a single time period such as 1 hour or 1 day. The calculation is:
  a. Earnings=Total Transaction Value in the Time Period
  b. Traffic Cost=Total Clicks in the Time Period×Cost-per-Click
  c. Earnings per Click (EPC)=Earnings/Total Clicks in the Time Period
  d. Yield %=(Earnings per Click−Cost-per-Click)/Cost-per-Click
  e. Net Earnings per Click (Net EPC)=EPC−Cost-per-Click 6. For affiliate advertisers, the earnings are a percentage of the total transaction value, as set by the commission rates. Therefore, to calculate the remaining values such as Yield and Net Earnings per Click, the following rule is applied:
  234.1. a. Earnings=Total Transaction Value in the Time Period×Commission Rate 7. The yield is calculated from the moment an ad campaign begins and is presented to the platform users in real-time.

Context Injector

The context injector includes: 1. Extraction of information identifying products and merchants from conversations between users; 2. Translation of that information to referrals for performance marketing; and 3. Collection of the resulting commissions for payments to the conversation channel technology provider.

CCCII provides the first go-to-market implementation for contextual conversational commerce. The system provides an elegant, fast, scalable matching engine designed to take a series of URIs, translate those to referral attribution URLs for merchants and return them to the conversation channel for link clicks by customers. CCCII may operate as the affiliate for the referrals and then share the commission payments back to the communication channel.

There are several factors that limit the ability for major businesses and conversation channels (e.g., FaceBook, SnapChat, etc.) to track Word-Of-Mouth marketing and to monetize it including Most viral communication results in a separate session instance designed to discover the business of interest, outside the original communication channel; no attribution exists for this broken session; companies can measure SEO performance or ad click through, but they cannot reach further back in time to capture the intent of the customer nor the trigger behind their interest; a major conversation or broadcast channel does not share in revenue beyond CPM/CPC advertising.

The CCCII Contextual Conversational Commerce platform powers auditable Word-of-Mouth marketing and revenue streams by: providing performance based marketing services for a broad network of mainstream merchants; opens APIs to the conversation channel that permits any word-of-mouth recommendation to be translated in real time into an attribution link, with no consumer overhead; captures the resulting contextual relationship that exists between users in the communication channel as they engage with the attribution link; shares performance based revenue back to the communication channel, and potentially the user who created the recommendation, through a revenue share commission system.

Use cases include:

1. User 1 pastes a URL into their status update or reply for a specific channel like Facebook (example: www.xyzcompany.com)
  241.1. a. Channel hosting the content gives the URL and optionally a token uniquely identifying the user, to the CCCII platform via API
  241.2. b. CCCII Platform determines if there is a match to the vendor who owns the URL that is paying commissions for referrals
  241.3. c. CCCII Platform crafts a referral attribution link with unique tagging for the Channel, and optionally the user 2. Channel posts the referral link displayed as www.xyzcompany.com but which is actually a referral link 3. User 2 with a relationship to User 1 sees the post in their feed and clicks on the link 4. User 2 transits the CCCII referral and attribution platform 5. User 2 buys from the merchant 6. CCCII attributes the channel (and optionally User 1) with a commission from the sale Another use case includes:

1. User 1 pastes a URL into a message/post for a specific channel like iMessage (example: www.xyzcompany.com)

2. Channel posts the link displayed as www.xyzcompany.com

3. User 2 with a relationship to User 1 sees the message and clicks on the link
  250.1. a. Channel hosting the content gives the URL and optionally a token uniquely identifying the user, to the CCCII platform via API
  250.2. b. CCCII Platform determines if there is a match to the vendor who owns the URL that is paying commissions for referrals
  250.3. c. CCCII Platform crafts a referral attribution link with unique tagging for the Channel, and optionally the user 4. Channel sends the User 2's browser to the referral link 5. User 2 transits the referral and attribution platform 6. User 2 buys from the merchant 7. CCCII attributes the channel (and optionally User 1) with a commission from the sale CCCII success factors include:

1. User behavior is not altered in any way. Users do not have to actually create their own referral links 2. Broad network of merchants maximizes the channel's ability to gain revenue from word-of-mouth marketing 3. Simple, fast API integration keeps the user experience seamless and gives the channel easy traction to add this revenue stream 4. The biggest influence marketers are individuals operating in their own personal networks; the scale opportunity is massive 5. Channels that extend the monetization as a benefit to their user base are more likely to experience word-of-mouth marketing revenue because users will be incented to communicate through those channels Example CCCII contextual injector pseudo code follows:

```go
package main
import (
    "bytes"
    "encoding/json"
    "fmt"
    "io/ioutil"
    "net/http"
    "strings"
    "time"
    log "github.com/Sirupsen/logrus"
    "github.com/gorilla/handlers"
    "github.com/gorilla/mux"
    "github.com/spf13/viper"
)
var (
    domainToVendor = make(map[string]vendor)
    updateChan     = make(chan payload)
)
type payload struct {
    UpdateID int64   `json:"update_id"`
    Message  message `json:"message"`
}
type message struct {
    MessageID int64  `json:"message_id"`
    Text      string `json:"text"`
    Chat      chat   `json:"chat"`
}
type chat struct {
    ID int64 `json:"id"`
}
type response struct {
    MessageID            int64  `json:"message_id"`
    ChatID               int64  `json:"chat_id"`
    Text                 string `json:"text"`
    ParseMode            string `json:"parse_mode"`
    DisableWebPagePreview bool  `json:"disable_web_page_preview"`
}
type vendor struct {
    baseURL     string
    nickname    string
    description string
    iconURL     string
}
func loggingHandler(h http.Handler) http.Handler {
    return http.HandlerFunc(func(w http.ResponseWriter, r *http.Request) {
        start := time.Now()
        h.ServeHTTP(w, r)
        log.WithFields(log.Fields{"headers": r.Header, "url": r.URL, "useragent": r.UserAgent(), "method": r.Method, "time": time.Since(start)}).Info("request")
    })
}
func main() {
    fillMap()
    for i := 0; i < 10; i++ {
        go updateMsg()
    }
    conf := viper.New()
    conf.SetDefault("port", 8000)
    conf.SetDefault("host", "localhost")
    conf.AutomaticEnv()
    server := &http.Server{
        Addr:    fmt.Sprintf("%s:%d", conf.GetString("host"), conf.GetInt("port")),
        Handler: handlers.RecoveryHandler()(loggingHandler(handlers.CompressHandler(routes()))),
        ReadTimeout:  5 * time.Second,
        WriteTimeout: 10 * time.Second,
    }
    log.WithField("port", conf.GetInt("port")).Info("Listening....")
    log.Fatal(server.ListenAndServe())
}
func routes() *mux.Router {
```

```
        r := mux.NewRouter( )
        r.HandleFunc("/", msgResv).Methods("POST")
        return r
}
func msgResv(w http.ResponseWriter, r *http.Request) {
        var msg payload
        decoder := json.NewDecoder(r.Body)
        err := decoder.Decode(&msg)
        if err != nil {
                fmt.Println(err)
                return
        }
        updateChan <- msg
}
func updateMsg( ) {
        for {
                m := <-updateChan
                for k, v := range domainToVendor {
                        if strings.Contains(m.Message.Text, k) {
                                r := response{
                                        DisableWebPagePreview:   true,
                                        ParseMode:               "HTML",
                                        ChatID:                  m.Message.Chat.ID,
                                        Text:                    "<a
href=\"http://shamalama." + v.nickname + ".hop.clickbank.net\">" + v.baseURL +
"</a> - " + v.description,
                                }
                                b, _ := json.Marshal(r)
                                req, _ := http.NewRequest("POST",
"https://api.telegram.org/bot244679729:AAFgUIUAtvLY0iN-
2v7nMy156LGCxrFvMtg/sendMessage", bytes.NewBuffer(b))
                                req.Header.Set("Content-Type", "application/json")
                                client := &http.Client{ }
                                resp, err := client.Do(req)
                                if err != nil {
                                        fmt.Println(err)
                                        return
                                }
                                defer resp.Body.Close( )
                                s, _ := ioutil.ReadAll(resp.Body)
                                fmt.Println(string(s))
                        }
                }
        }
}
func fillMap( ) {
        domainToVendor["venusfactor.com"] = vendor{baseURL: "venusfactor.com",
nickname: "venusind", iconURL: "http://www.venusfactor.com/resources/cdn/venus-
factor/img/logo_swoosh_tab.png", description: "Venus Factor is for women from any
walk of life who are ready to make healthy lifestyle changes and follow a step by
step diet and exercise system designed to promote natural and healthy weight loss
without any need for pills, powders or potions. If you want to lose weight and
get in shape without having to spend countless hours in the gym or even
sacrificing all of your favorite foods or red wine to do it, then Venus Factor
may be a great fit for you."}
}
```

Additional CCCII context injector embodiments include:

1. Stream/Broadcast Audio Matching and Injection:

In the case where an audio stream is being generated (e.g., YouTube video clip, Facebook live video, Periscope feed, Pandora audio broadcast, Internet Radio stream, etc.), the CCCII may parse the audio and match product recommendations, website recommendations and other content against the merchant repository for matching affiliate links, returning those to the communication channel for display to the consumer. For example, a Facebook live video where a user is talking about a weight loss supplement may provide that feed to the CCCII speech recognition engine which would capture product/company recommendations, translate them into referral attribution links, and then provide those URLs back to the Facebook live app for rendering in the channel automatically. Users who click the resulting link would transit the CCCII referral attribution handler, giving attribution to Facebook Live and the user who uttered the recommendation. Subsequent sales would create a commission for Facebook and potentially the user who made the recommendation.

2. Broadcast Media Injection:

For live major media broadcasts, the CCCII engine provides speech recognition technology to automatically create product and merchant recommendations for content from within the feed. As an example, Ellen DeGeneres frequently recommends products on her TV show. This product recommendation would be provided as a feed to (1) the TV show production company for inclusion on their website, automatically and (2) the broadcast network for show viewers and (3) the network enabler (e.g., Comcast, Dish Network) who can then embed the recommendation into their interfaces. For example, the new Xfinity X1 voice activated remote could have a "show more about these products"

recognition that automatically pulls from the CCCII engine the content to send to the subscriber's on-file email address. Those referral links would include shared commission for multi-party including Ellen's TV Production company, the broadcast network and Xfinity.

3. Image Detection and Recommendation:

The CCCII engine has image processing capabilities to extract products from live and recorded broadcasts, offering them as affiliate links for viewers that can be displayed within the conversation channel. As an example, a YouTube video can include a recommendation to a product such as a mobile phone, which the image processor will identify, generate an affiliate link, return that link for display in the feed, which users can then click. The channel and optionally the promoter in the video can then be compensated for subsequent sales. Any channel with a video stream can then automatically create referral attribution opportunities using the CCCII engine and processors, that can result in monetization of word-of-mouth with no additional effort required on the part of the channel, the content creator making the recommendation, etc.

4. Multi-Party Commissions and Compensation:

The CCCII settlement engine will have the ability to share commissions and attribution to multiple parties in a given promotion. As illustrated above, a content creator within a given channel can receive a compensation for the simple act of making a recommendation via word-of-mouth, via audio, via video/images. The CCCII settlement engine uniquely identifies each party involved in the recommendation and automatically shares the earnings between those parties according to defined business rules.

5. Agent Conversation Enrichment and Transaction Donations:

The CCCII may allow users interacting with an intelligent agent (e.g., Amazon's Alexa, Apple's Siri, Microsofts Cortana, etc). and inquiring about a product, to be prompted with additional information and an option to donate. For example, if a user asks Siri about a product "Hey Siri, is the new Acme Hydrocoptor Drone any good?" while conversing, the CCCII may retrieve an Amazon review rating on that product, and also ask the user if they wish to donate to the products advertising crowdsource initiative.

CCCII Controller

Figure 16:
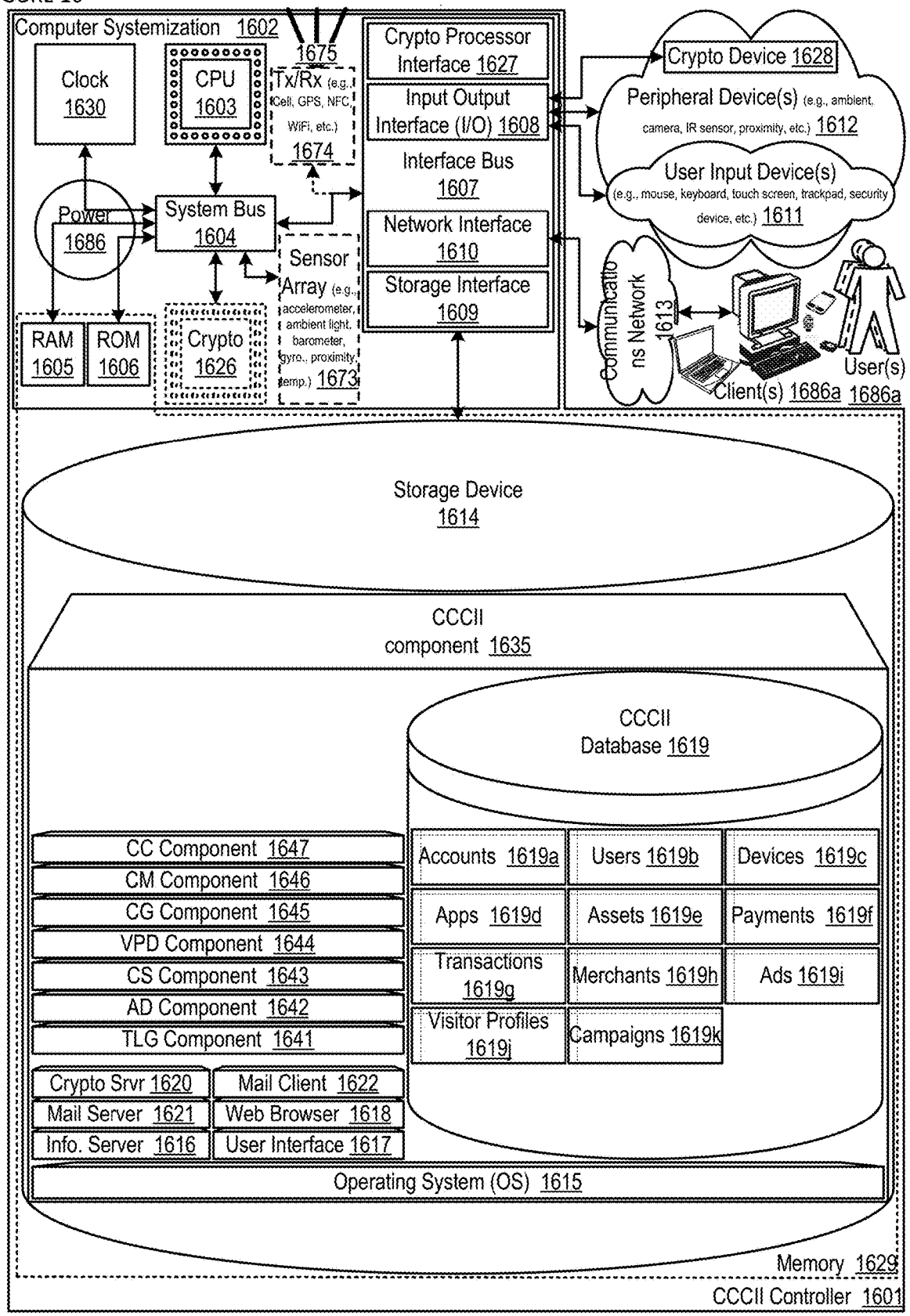
FIG. 16 shows a block diagram illustrating embodiments of a CCCII controller.

FIG. 16 shows a block diagram illustrating embodiments of a CCCII controller. In this embodiment, the CCCII controller 1601 may serve to aggregate, process, store, search, serve, identify, instruct, generate, match, and/or facilitate interactions with a computer through parsing and detecting inquiries and data and crowdsourcing technologies, and/or other related data.

Typically, users, which may be people and/or other systems, may engage information technology systems (e.g., computers) to facilitate information processing. In turn, computers employ processors to process information; such processors 1603 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 1629 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CCCII controller 1601 may be connected to and/or communicate with entities such as, but not limited to: one or more users from peripheral devices 1612 (e.g., user input devices 1611); an optional cryptographic processor device 1628; and/or a communications network 1613.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and a servers may access and interoperate with one another.

The CCCII controller 1601 may be based on computer systems that may comprise, but are not limited to, components such as: a computer systemization 1602 connected to memory 1629.

Computer Systemization

A computer systemization 1602 may comprise a clock 1630, central processing unit ("CPU(s)" and/or "processor(s)" (these terms are used interchangeable throughout the disclosure unless noted to the contrary)) 1603, a memory 1629 (e.g., a read only memory (ROM) 1606, a random access memory (RAM) 1605, etc.), and/or an interface bus 1607, and most frequently, although not necessarily, are all interconnected and/or communicating through a system bus 1604 on one or more (mother)board(s) 1602 having conductive and/or otherwise transportive circuit pathways through which instructions (e.g., binary encoded signals) may travel to effectuate communications, operations, storage, etc. The computer systemization may be connected to a power source 1686; e.g., optionally the power source may be internal. Optionally, a cryptographic processor 1626 may be connected to the system bus. In another embodiment, the cryptographic processor, transceivers (e.g., ICs) 1674, and/or sensor array (e.g., accelerometer, altimeter, ambient light, barometer, global positioning system (GPS) (thereby allowing CCCII controller to determine its location), gyroscope, magnetometer, pedometer, proximity, ultra-violet sensor, etc.) 1673 may be connected as either internal and/or external peripheral devices 1612 via the interface bus I/O 1608 (not pictured) and/or directly via the interface bus 1607. In turn, the transceivers may be connected to antenna(s) 1675, thereby effectuating wireless transmission and reception of various communication and/or sensor protocols; for example the antenna(s) may connect to various transceiver chipsets (depending on deployment needs), including. Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast a access addressable memory, and be capable of mapping and addressing memory 1629 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the CCCII controller and beyond through various interfaces. Should processing requirements dictate a greater amount speed and/or capacity, distributed processors (e.g., see Distributed CCCII below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the CCCII may be achieved by implementing a microcontroller such as CAST's R8051XC2 microcontroller; Intel's MCS 51 (i.e., 8051 microcontroller); and/or the like. Also, to implement certain features of the CCCII, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CCCII component collection (distributed or otherwise) and/or features may be implemented via the microprocessor and/or via embedded components; e.g., via ASIC, coprocessor, DSP, FPGA, and/or the like. Alternately, some implementations of the CCCII may be implemented with embedded components that are configured and used to achieve a variety of features or signal processing.

Depending on the particular implementation, the embedded components may include software solutions, hardware solutions, and/or some combination of both hardware/software solutions. For example, CCCII features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the CCCII features. A hierarchy of programmable interconnects allow logic blocks to be interconnected as needed by the CCCII system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the CCCII may be developed on regular FPGAs and then migrated into a fixed version that more resembles ASIC implementations. Alternate or coordinating implementations may migrate CCCII controller features to a final ASIC instead of or in addition to FPGAs. Depending on the implementation all of the aforementioned embedded components and microprocessors may be considered the "CPU" and/or "processor" for the CCCII.

Power Source

The power source 1686 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 1686 is connected to at least one of the interconnected subsequent components of the CCCII thereby providing an electric current to all subsequent components. In one example, the power source 1686 is connected to the system bus component 1604. In an alternative embodiment, an outside power source 1686 is provided through a connection across the I/O 1608 interface. For example, a USB and/or IEEE 1394 connection carries both data and power across the connection and is therefore a suitable source of power.

Interface Adapters

Interface bus(ses) 1607 may accept, connect, and/or communicate to a number of interface adapters, conventionally although not necessarily in the form of adapter cards, such as but not limited to: input output interfaces (I/O) 1608, storage interfaces 1609, network interfaces 1610, and/or the like. Optionally, cryptographic processor interfaces 1627 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 1609 may accept, communicate, and/or connect to a number of storage devices such as, but not limited to: storage devices 1614, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 1610 may accept, communicate, and/or connect to a communications network 1613. Through a communications network 1613, the CCCII controller is accessible through remote clients 1633b (e.g., computers with web browsers) by users 1633a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers a (e.g., see Distributed CCCII below), architectures may similarly be employed to pool, load balance, and/or otherwise decrease/increase the communicative bandwidth required by the CCCII controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 1610 may be used to engage with various communications network types 1613. For example, multiple network interfaces may be employed to allow for the communication over broadcast, multicast, and/or unicast networks.

Input Output interfaces (I/O) 1608 may accept, communicate, and/or connect to user, peripheral devices 1612 (e.g., input devices 1611), cryptographic processor devices 1628, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 1612 may be connected and/or communicate to I/O and/or other facilities of the like such as network interfaces, storage interfaces, directly to the interface bus, system bus, the CPU, and/or the like. Peripheral devices may be external, internal and/or part of the CCCII controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 1611 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the CCCII controller may be embodied as an embedded, dedicated, and/or monitor-less (i.e., headless) device, wherein access would be provided over a network interface connection.

Cryptographic units such as, but not limited to, microcontrollers, processors 1626, interfaces 1627, and/or devices 1628 may be attached, and/or communicate with the CCCII controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+MB/s of cryptographic instructions; VLSI Technology's 33 MHz 6868; and/or the like.

Memory

Generally, any mechanization and/or embodiment allowing a processor to affect the storage and/or retrieval of information is regarded as memory 1629. However, memory is a fungible technology and resource, thus, any number of memory embodiments may be employed in lieu of or in concert with one another. It is to be understood that the CCCII controller and/or a computer systemization may employ various forms of memory 1629. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 1629 will include ROM 1606, RAM 1605, and a storage device 1614. A storage device 1614 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 1629 may contain a collection of program and/or database components and/or data such as, but not limited to: operating system component(s) 1615 (operating system); information server component(s) 1616 (information server); user interface component(s) 1617 (user interface); Web browser component(s) 1618 (Web browser); database(s) 1619; mail server component(s) 1621; mail client component(s) 1622; cryptographic server component(s) 1620 (cryptographic server); the CCCII component(s) 1635; and/or the like (i.e., collectively a component collection). These components may be stored and accessed from the storage devices and/or from storage devices accessible through an interface bus. Although non-conventional program components such as those in the component collection, typically, are stored in a local storage device 1614, they may also be loaded and/or stored in memory such as: peripheral devices, RAM, remote storage facilities through a communications network, ROM, various forms of memory, and/or the like.

Operating System

The operating system component 1615 is an executable program component facilitating the operation of the CCCII controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS;

Samsung/Intel's Tizen; and/or the like. An operating a system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the CCCII controller to communicate with other entities through a communications network 1613. Various communication protocols may be used by the CCCII controller as a subcarrier transport mechanism for interaction, such as, but not limited to: multicast, TCP/IP, UDP, unicast, and/or the like.

Information Server

An information server component 1616 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CCCII controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CCCII database 1619, operating systems, other program components, user interfaces, Web browsers, and/or the like.

Access to the CCCII database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CCCII. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the CCCII as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 1617 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 1618 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CCCII enabled nodes. The combined application may be nugatory on systems employing standard Web browsers.

Mail Server

A mail server component 1621 is a stored program component that is executed by a CPU 1603. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may a support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CCCII. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the CCCII mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 1622 is a stored program component that is executed by a CPU 1603. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 1620 is a stored program component that is executed by a CPU 1603, cryptographic processor 1626, cryptographic processor interface 1627, cryptographic processor device 1628, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the CCCII may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the CCCII component to engage in secure transactions if so desired. The cryptographic component facilitates the secure accessing of resources on the CCCII and facilitates the access of secured resources on remote systems; i.e., it may act as a client and/or server of secured resources. Most frequently, the cryptographic a component communicates with information servers, operating systems, other program components, and/or the like. The cryptographic component may contain, communicate, generate, obtain, and/or provide program component, system, user, and/or data communications, requests, and/or responses.

The CCCII Database

The CCCII database component 1619 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the CCCII database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CCCII database is a implemented as a data-structure, the use of the CCCII database 1619 may be integrated into another component such as the CCCII component 1635. Also, the database may be implemented as a mix of data structures, objects, and relational structures. Databases may be consolidated and/or distributed in countless variations (e.g., see Distributed CCCII below). Portions of databases, e.g., tables, may be exported and/or imported and thus decentralized and/or integrated.

In one embodiment, the database component 1619 includes several tables 1619*a-k*:

An accounts table 1619*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccaountRatio, accountAddress, accountState, accountZIPcode, accountCountry, accountEmail, accountPhone, accountAuthKey, accountlPaddress, accountURLAccessCode, accountPortNo, accountAuthorizationCode, accountAccessPrivileges, accountPreferences, accountRestrictions, and/or the like;

A users table 1619*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), communication channel, individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, userAttributionSettings, userCommissionRewardType, userCommissionRewardPercentage, communicationChannelIdentifier, communicationChannelUsersAttributionSettings, communicationChannelCommissionAllocation, and/or the like (the user table may support and/or track multiple entity accounts on a CCCII);

An devices table 1619*c* includes fields such as, but not limited to: deviceID, sensorIDs, accountID, assetIDs, paymentIDs, deviceType, deviceName, deviceManufacturer, deviceModel, deviceVersion, deviceSerialNo, devicelPaddress, deviceMACaddress, device_ECID, deviceUUID, deviceLocation, deviceCertificate, deviceOS, appIDs, a deviceResources, deviceSession, authKey, deviceSecureKey, walletAppInstalledFlag, deviceAccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 1619*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 1619e includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 1619f includes fields such as, but not limited to: paymentID, accountID, userID, couponID, couponValue, couponConditions, couponExpiration, paymentType, paymentAccountNo, paymentAccountName, a paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 1619g includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 1619h includes fields such as, but not limited to: merchantID, vendorID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, vendorProfile, vendorAssociatedAdCampaignIDs, and/or the like;

An ads table 1619i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, a bidImpressionID, bidType, bidScore, adType (e.g., mobile, desktop, wearable, largescreen, interstitial, etc.), assetID, merchantID, vendorID, deviceID, userID, accountID, impressionID, impressionOS, impressionTimeStamp, impressionGeo, impressionAction, impressionType, impressionPublisherID, impressionPublisherURL, and/or the like;

A visitor profiles table 1619j includes fields such as, but not limited to: visitorID, visitorHistoricalData, visitorSummaryData, visitorProfile, and/or the like;

A campaigns table 1619k includes fields such as, but not limited to: campaignID, campaignAssociatedVendorID, campaignProfile, campaignDuration, campaignAdvertisingBudget, campaignVendorBudgetContribution, campaignAdvertisingChannels, campaignAssociatedAdIDs, campaignCommissionRate, campaignInvestorIdentifiers, campaignCommenced, campaignPredictedYield, campaignNegativeReturnLikelihood, and/or the like.

In one embodiment, the CCCII database may interact with other database systems. For example, employing a distributed database system, queries and data access by search CCCII component may treat the combination of the CCCII database, an integrated data security layer database as a single database entity (e.g., see Distributed CCCII below).

In one embodiment, user programs may contain various user interface primitives, which may serve to update the CCCII. Also, various accounts may require custom database tables depending upon the environments and the types of clients the CCCII may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 1619a-k. The CCCII may be configured to keep track of various settings, inputs, and parameters via database controllers.

The CCCII database may communicate to and/or with other components in a component collection, including itself, and/or facilities of the like. Most frequently, the CCCII database communicates with the CCCII component, other program components, and/or the like. The database may contain, retain, and provide information regarding other nodes and data.

The CCCIIs

The CCCII component 1635 is a stored program component that is executed by a CPU. In one embodiment, the CCCII component incorporates any and/or all combinations of the aspects of the CCCII that was discussed in the previous figures. As such, the CCCII affects accessing, obtaining and the provision of information, services, transactions, and/or the like across various communications networks. The features and embodiments of the CCCII discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the CCCII's features and facilities, and in many cases reduce the costs, energy consumption/requirements, and extend the life of CCCII's underlying infrastructure; this has the added benefit of making the CCCII more reliable. Similarly, many of the features and mechanisms are designed to be easier for users to use and access, thereby broadening the audience that may enjoy/employ and exploit the feature sets of the CCCII; such ease of use also helps to increase the reliability of the CCCII. In addition, the feature sets include heightened security as noted via the Cryptographic components 1620, 1626, 1628 and throughout, making access to the features and data more reliable and secure.

The CCCII transforms communication data, advertising link click request, campaign generation request, campaign search request, campaign investment request inputs, via CCCII components (e.g., TLG, AD, CS, VPD, CG, CM, CC), into commission settlement, vendor ad campaign data, campaign search response, campaign investment confirmation, campaign control outputs.

The CCCII component enabling access of information between nodes may be developed by employing standard development tools and languages such as, but not limited to: Apache components, Assembly, ActiveX, binary executables, (ANSI) (Objective-) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; scriptaculo.us; Simple Object Access Protocol (SOAP); SWFObject; Yahoo! User Interface; and/or the like), WebObjects, and/or the like. In one embodiment, the CCCII server employs a cryptographic server to encrypt and decrypt communications. The CCCII component may communicate to and/or with other components in a component collection, including itself, and/or facilities of the like. Most frequently, the CCCII component communicates with the CCCII database, operating systems, other program components, and/or the like. The CCCII may contain, communicate, generate, obtain, and/or provide program component, system, user, and/or data communications, requests, and/or responses.

Distributed CCCIIs

The structure and/or operation of any of the CCCII node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the CCCII controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for CCCII controller and/or CCCII component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (SON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar a may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CCCII controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

Additional embodiments include:

1. A context information injector apparatus, comprising:
    a memory;
    a component collection in the memory, including
        a tracking link generating component, and
        an attribution determining component;
    a processor disposed in communication with the memory, and configured to issue a plurality of processing instructions from the component collection stored in the memory,
        wherein the processor issues instructions from the tracking link generating component, stored in the memory, to:
            obtain, via at least one processor, a tracking link request from a source communication channel, wherein the tracking link request includes communication data contents sent from a source user to a receiving user via the source communication channel;
            determine, via at least one processor, a match target for the communication data contents;
            retrieve, via at least one processor, an attribution link associated with the match target,
            generate, via at least one processor, a tracking link configured to identify the source communication channel and the attribution link;
            provide, via at least one processor, the tracking link to the source communication channel;
        wherein the processor issues instructions from the attribution determining component, stored in the memory, to:
            obtain, via at least one processor, a tracking link click request associated with the tracking link from the receiving user,
            analyze, via at least one processor, the tracking link to determine the source communication channel and the attribution link;
            place, via at least one processor, a tracking cookie on the receiving user's client, wherein the tracking cookie includes information that identifies the source communication channel;
            determine, via at least one processor, pixel drop data for a tracking pixel associated with a purchase order page of a vendor associated with the attribution link, wherein information that identifies the source communication channel is obtained from the tracking cookie when the tracking pixel is activated;
            configure, via at least one processor, the attribution link using the pixel drop data; and
            redirect, via at least one processor, the receiving user's client to the configured attribution link.

2. The apparatus of embodiment 1, wherein the communication data contents include a URI.

3. The apparatus of embodiment 1, wherein the communication data contents include at least one of: a text stream, an audio stream, a video stream.

4. The apparatus of embodiment 1, wherein the match target is a link provided in the communication data contents.

5. The apparatus of embodiment 1, wherein the match target is a product or service mentioned in the communication data contents.

6. The apparatus of embodiment 1, further, comprising:
    the processor issues instructions from the tracking link generating component, stored in the memory, to:
        determine, via at least one processor, a target merchant platform for the match target, wherein the attribution link associated with the match target is retrieved based on the determined target merchant platform.

7. The apparatus of embodiment 1, further, comprising:
the processor issues instructions from the tracking link generating component, stored in the memory, to:
determine, via at least one processor, a match type for the match target, wherein the match type is one of: domain, product;
wherein the attribution link associated with the match target is retrieved based on the determined match type.

8. The apparatus of embodiment 1, wherein the tracking link is configured to also identify the source user, wherein the tracking cookie also includes information that identifies the source user, and wherein information that identifies the source user is also obtained from the tracking cookie when the tracking pixel is activated.

9. The apparatus of embodiment 1, wherein the pixel drop data includes a URI of the tracking pixel.

10. The apparatus of embodiment 1, wherein the pixel drop data includes an identifier utilized by a merchant platform to determine a URI of the tracking pixel.

11. The apparatus of embodiment 1, further, comprising:
the processor issues instructions from the attribution determining component, stored in the memory, to:
generate, via at least one processor, a fingerprint of the receiving user's client.

12. The apparatus of embodiment 1, further, comprising:
a commission settlement component in the component collection, and
the processor issues instructions from the commission settlement component, stored in the memory, to:
obtain, via at least one processor, a commission notification associated with a purchase transaction by the receiving user,
determine, via at least one processor, a commission amount associated with the purchase transaction;
determine, via at least one processor, the source communication channel based on analysis of the commission notification and analysis of stored data obtained as a result of tracking pixel activation;
calculate, via at least one processor, a commission allocation for the source communication channel based on the commission amount; and
facilitate, via at least one processor, providing the calculated commission allocation to the source communication channel.

13. The apparatus of embodiment 12, further, comprising:
the processor issues instructions from the commission settlement component, stored in the memory, to:
determine, via at least one processor, the source user based on analysis of the commission notification and analysis of stored data obtained as a result of tracking pixel activation;
calculate, via at least one processor, a commission reward for the source user based on the commission amount; and
facilitate, via at least one processor, providing the calculated commission reward to the source user.

14. The apparatus of embodiment 13, further, comprising:
the processor issues instructions from the commission settlement component, stored in the memory, to:
determine, via at least one processor, a reward type for the source user,
wherein the commission reward for the source user is calculated based on the determined reward type.

15. The apparatus of embodiment 14, wherein the reward type is one of: currency, points, badges, merchandise.

16. A processor-readable context information injector non-transient physical medium storing processor-executable components, the components, comprising:
a component collection stored in the medium, including
a tracking link generating component, and
an attribution determining component;
wherein the tracking link generating component, stored in the medium, includes processor-issuable instructions to:
obtain, via at least one processor, a tracking link request from a source communication channel, wherein the tracking link request includes communication data contents sent from a source user to a receiving user via the source communication channel;
determine, via at least one processor, a match target for the communication data contents;
retrieve, via at least one processor, an attribution link associated with the match target,
generate, via at least one processor, a tracking link configured to identify the source communication channel and the attribution link;
provide, via at least one processor, the tracking link to the source communication channel;
wherein the attribution determining component, stored in the medium, includes processor-issuable instructions to:
obtain, via at least one processor, a tracking link click request associated with the tracking link from the receiving user,
analyze, via at least one processor, the tracking link to determine the source communication channel and the attribution link;
place, via at least one processor, a tracking cookie on the receiving user's client, wherein the tracking cookie includes information that identifies the source communication channel;
determine, via at least one processor, pixel drop data for a tracking pixel associated with a purchase order page of a vendor associated with the attribution link, wherein information that identifies the source communication channel is obtained from the tracking cookie when the tracking pixel is activated;
configure, via at least one processor, the attribution link using the pixel drop data; and
redirect, via at least one processor, the receiving user's client to the configured attribution link.

17. The medium of embodiment 16, wherein the communication data contents include a URI.

18. The medium of embodiment 16, wherein the communication data contents include at least one of: a text stream, an audio stream, a video stream.

19. The medium of embodiment 16, wherein the match target is a link provided in the communication data contents.

20. The medium of embodiment 16, wherein the match target is a product or service mentioned in the communication data contents.

21. The medium of embodiment 16, further, comprising:
the tracking link generating component, stored in the medium, includes processor-issuable instructions to:
determine, via at least one processor, a target merchant platform for the match target,
wherein the attribution link associated with the match target is retrieved based on the determined target merchant platform.

22. The medium of embodiment 16, further, comprising:
the tracking link generating component, stored in the medium, includes processor-issuable instructions to:
determine, via at least one processor, a match type for the match target, wherein the match type is one of: domain, product;
wherein the attribution link associated with the match target is retrieved based on the determined match type.
23. The medium of embodiment 16, wherein the tracking link is configured to also identify the source user, wherein the tracking cookie also includes information that identifies the source user, and wherein information that identifies the source user is also obtained from the tracking cookie when the tracking pixel is activated.
24. The medium of embodiment 16, wherein the pixel drop data includes a URI of the tracking pixel.
25. The medium of embodiment 16, wherein the pixel drop data includes an identifier utilized by a merchant platform to determine a URI of the tracking pixel.
26. The medium of embodiment 16, further, comprising:
the attribution determining component, stored in the medium, includes processor-issuable instructions to:
generate, via at least one processor, a fingerprint of the receiving user's client.
27. The medium of embodiment 16, further, comprising:
a commission settlement component in the component collection;
wherein the commission settlement component, stored in the medium, includes processor-issuable instructions to:
obtain, via at least one processor, a commission notification associated with a purchase transaction by the receiving user,
determine, via at least one processor, a commission amount associated with the purchase transaction;
determine, via at least one processor, the source communication channel based on analysis of the commission notification and analysis of stored data obtained as a result of tracking pixel activation;
calculate, via at least one processor, a commission allocation for the source communication channel based on the commission amount; and
facilitate, via at least one processor, providing the calculated commission allocation to the source communication channel.
28. The medium of embodiment 27, further, comprising:
the commission settlement component, stored in the medium, includes processor-issuable instructions to:
determine, via at least one processor, the source user based on analysis of the commission notification and analysis of stored data obtained as a result of tracking pixel activation;
calculate, via at least one processor, a commission reward for the source user based on the commission amount; and
facilitate, via at least one processor, providing the calculated commission reward to the source user.
29. The medium of embodiment 28, further, comprising:
the commission settlement component, stored in the medium, includes processor-issuable instructions to:
determine, via at least one processor, a reward type for the source user,
wherein the commission reward for the source user is calculated based on the determined reward type.
30. The medium of embodiment 29, wherein the reward type is one of: currency, points, badges, merchandise.

31. A processor-implemented context information injector system, comprising:
a tracking link generating component means, to:
obtain, via at least one processor, a tracking link request from a source communication channel, wherein the tracking link request includes communication data contents sent from a source user to a receiving user via the source communication channel;
determine, via at least one processor, a match target for the communication data contents;
retrieve, via at least one processor, an attribution link associated with the match target,
a generate, via at least one processor, a tracking link configured to identify the source communication channel and the attribution link;
provide, via at least one processor, the tracking link to the source communication channel;
an attribution determining component means, to:
obtain, via at least one processor, a tracking link click request associated with the tracking link from the receiving user,
analyze, via at least one processor, the tracking link to determine the source communication channel and the attribution link;
place, via at least one processor, a tracking cookie on the receiving user's client, wherein the tracking cookie includes information that identifies the source communication channel;
determine, via at least one processor, pixel drop data for a tracking pixel associated with a purchase order page of a vendor associated with the attribution link, wherein information that identifies the source communication channel is obtained from the tracking cookie when the tracking pixel is activated;
configure, via at least one processor, the attribution link using the pixel drop data; and
redirect, via at least one processor, the receiving user's client to the configured attribution link.
32. The system of embodiment 31, wherein the communication data contents include a URI.
33. The system of embodiment 31, wherein the communication data contents include at least one of: a text stream, an audio stream, a video stream.
34. The system of embodiment 31, wherein the match target is a link provided in the communication data contents.
35. The system of embodiment 31, wherein the match target is a product or service mentioned in the communication data contents.
36. The system of embodiment 31, further, comprising:
the tracking link generating component means, to:
determine, via at least one processor, a target merchant platform for the match target,
wherein the attribution link associated with the match target is retrieved based on the determined target merchant platform.
37. The system of embodiment 31, further, comprising:
the tracking link generating component means, to:
determine, via at least one processor, a match type for the match target, wherein the match type is one of: domain, product;
wherein the attribution link associated with the match target is retrieved based on the determined match type.
38. The system of embodiment 31, wherein the tracking link is configured to also identify the source user, wherein the tracking cookie also includes information that identifies the source user, and wherein information that identifies the source user is also obtained from the tracking cookie when the tracking pixel is activated.

39. The system of embodiment 31, wherein the pixel drop data includes a URI of the tracking pixel.

40. The system of embodiment 31, wherein the pixel drop data includes an identifier utilized by a merchant platform to determine a URI of the tracking pixel.

41. The system of embodiment 31, further, comprising:
the attribution determining component means, to:
generate, via at least one processor, a fingerprint of the receiving user's client.

42. The system of embodiment 31, further, comprising:
a commission settlement component means, to:
obtain, via at least one processor, a commission notification associated with a purchase transaction by the receiving user,
determine, via at least one processor, a commission amount associated with the purchase transaction;
determine, via at least one processor, the source communication channel based on analysis of the commission notification and analysis of stored data obtained as a result of tracking pixel activation;
calculate, via at least one processor, a commission allocation for the source communication channel based on the commission amount; and
facilitate, via at least one processor, providing the calculated commission allocation to the source communication channel.

43. The system of embodiment 42, further, comprising:
the commission settlement component means, to:
determine, via at least one processor, the source user based on analysis of the commission notification and analysis of stored data obtained as a result of tracking pixel activation;
calculate, via at least one processor, a commission reward for the source user based on the commission amount; and
facilitate, via at least one processor, providing the calculated commission reward to the source user.

44. The system of embodiment 43, further, comprising:
the commission settlement component means, to:
determine, via at least one processor, a reward type for the source user,
wherein the commission reward for the source user is calculated based on the determined reward type.

45. The system of embodiment 44, wherein the reward type is one of currency, points, badges, merchandise.

46. A processor-implemented context information injector method, comprising:
executing processor-implemented tracking link generating component instructions to:
obtain, via at least one processor, a tracking link request from a source communication channel, wherein the tracking link request includes communication data contents sent from a source user to a receiving user via the source communication channel;
determine, via at least one processor, a match target for the communication data contents;
retrieve, via at least one processor, an attribution link associated with the match target,
generate, via at least one processor, a tracking link configured to identify the source communication channel and the attribution link;
provide, via at least one processor, the tracking link to the source communication channel;
executing processor-implemented attribution determining component instructions to:

obtain, via at least one processor, a tracking link click request associated with the tracking link from the receiving user,
analyze, via at least one processor, the tracking link to determine the source communication channel and the attribution link;
place, via at least one processor, a tracking cookie on the receiving user's client, wherein the tracking cookie includes information that identifies the source communication channel;
determine, via at least one processor, pixel drop data for a tracking pixel associated with a purchase order page of a vendor associated with the attribution link, wherein information that identifies the source communication channel is obtained from the tracking cookie when the tracking pixel is activated;
configure, via at least one processor, the attribution link using the pixel drop data; and
redirect, via at least one processor, the receiving user's client to the configured attribution link.

47. The method of embodiment 46, wherein the communication data contents include a URI.

48. The method of embodiment 46, wherein the communication data contents include at least one of:
a text stream, an audio stream, a video stream.

49. The method of embodiment 46, wherein the match target is a link provided in the communication data contents.

50. The method of embodiment 46, wherein the match target is a product or service mentioned in the communication data contents.

51. The method of embodiment 46, further, comprising:
executing processor-implemented tracking link generating component instructions to:
determine, via at least one processor, a target merchant platform for the match target,
wherein the attribution link associated with the match target is retrieved based on the determined target merchant platform.

52. The method of embodiment 46, further, comprising:
executing processor-implemented tracking link generating component instructions to:
determine, via at least one processor, a match type for the match target, wherein the match type is one of: domain, product;
wherein the attribution link associated with the match target is retrieved based on the determined match type.

53. The method of embodiment 46, wherein the tracking link is configured to also identify the source user, wherein the tracking cookie also includes information that identifies the source user, and wherein information that identifies the source user is also obtained from the tracking cookie when the tracking pixel is activated.

54. The method of embodiment 46, wherein the pixel drop data includes a URI of the tracking pixel.

55. The method of embodiment 46, wherein the pixel drop data includes an identifier utilized by a merchant platform to determine a URI of the tracking pixel.

56. The method of embodiment 46, further, comprising:
executing processor-implemented attribution determining component instructions to: generate, via at least one processor, a fingerprint of the receiving user's client.

57. The method of embodiment 46, further, comprising:
executing processor-implemented commission settlement component instructions to:
obtain, via at least one processor, a commission notification associated with a purchase transaction by the receiving user,
determine, via at least one processor, a commission amount associated with the purchase transaction;
determine, via at least one processor, the source communication channel based on analysis of the commission notification and analysis of stored data obtained as a result of tracking pixel activation;
calculate, via at least one processor, a commission allocation for the source communication channel based on the commission amount; and
facilitate, via at least one processor, providing the calculated commission allocation to the source communication channel.

58. The method of embodiment 57, further, comprising:
executing processor-implemented commission settlement component instructions to:
determine, via at least one processor, the source user based on analysis of the commission notification and analysis of stored data obtained as a result of tracking pixel activation;
calculate, via at least one processor, a commission reward for the source user based on the commission amount; and
facilitate, via at least one processor, providing the calculated commission reward to the source user.

59. The method of embodiment 58, further, comprising:
executing processor-implemented commission settlement component instructions to:
determine, via at least one processor, a reward type for the source user,
wherein the commission reward for the source user is calculated based on the determined reward type.

60. The method of embodiment 59, wherein the reward type is one of currency, points, badges, merchandise.

101. A crowdfunded campaign control apparatus, comprising:
a memory;
a component collection in the memory, including
a campaign controlling component;
a processor disposed in communication with the memory, and configured to issue a plurality of processing instructions from the component collection stored in the memory,
wherein the processor issues instructions from the campaign controlling component, stored in the memory, to:
obtain, via at least one processor, a campaign control request for a crowdfunded campaign of a vendor,
determine, via at least one processor, an investor commission rate associated with the crowdfunded campaign, wherein the investor commission rate is specified by the vendor,
determine, via at least one processor, a set of campaign advertising channels associated with the crowdfunded campaign;
determine, via at least one processor, an earnings amount associated with a campaign advertising channel in the set of campaign advertising channels based on purchase tracker activations;
calculate, via at least one processor, an investor earnings amount associated with the campaign advertising channel based on the earnings amount and the investor commission rate;
determine, via at least one processor, an advertising cost amount associated with the campaign advertising channel based on click tracker activations;
calculate, via at least one processor, an investor yield associated with the campaign advertising channel based on the investor earnings amount and the advertising cost amount;
determine, via at least one processor, a budget reallocation method associated with the crowdfunded campaign, wherein the budget reallocation method is based on the respective investor yields of advertising channels in the set of campaign advertising channels; and
adjust, via at least one processor, channel advertising budget associated with the campaign advertising channel in accordance with the budget reallocation method.

102. The apparatus of embodiment 101, wherein the crowdfunded campaign is associated with an expected investor yield, wherein the expected investor yield satisfies a specified minimum investor yield quality metric.

103. The apparatus of embodiment 102, further, comprising:
a campaign generating component in the component collection, and
the processor issues instructions from the campaign generating component, stored in the memory, to:
retrieve, via at least one processor, historical campaign data associated with the vendor's previous campaigns;
determine, via at least one processor, an expected campaign earnings amount for the crowdfunded campaign using the historical campaign data;
calculate, via at least one processor, an expected investor earnings amount based on the expected campaign earnings amount and the investor commission rate;
determine, via at least one processor, an expected campaign advertising cost amount for the crowdfunded campaign using the historical campaign data; and
calculate, via at least one processor, the expected investor yield based on the expected investor earnings amount and the expected campaign advertising cost.

104. The apparatus of embodiment 103, wherein the vendor's previous campaigns include previous crowdfunded campaigns.

105. The apparatus of embodiment 103, wherein the vendor's previous campaigns include previous vendor funded campaigns.

106. The apparatus of embodiment 103, wherein the expected campaign earnings amount is calculated based on an average of the historical product EPC amounts for products associated with the crowdfunded campaign.

107. The apparatus of embodiment 103, wherein the expected campaign advertising cost amount is calculated based on an average of the historical product CPC amounts for products associated with the crowdfunded campaign.

108. The apparatus of embodiment 101, further, comprising:
a campaign matching component in the component collection, and
the processor issues instructions from the campaign matching component, stored in the memory, to:
obtain, via at least one processor, a set of search parameters from an investor watching the vendor, determine, via at least one processor, that the crowdfunded campaign matches the set of search parameters; and provide, via at least one processor, a notification to the investor that the crowdfunded campaign commenced.

109. The apparatus of embodiment 101, wherein a purchase tracker is a tracking pixel.

110. The apparatus of embodiment 101, wherein the earnings amount is calculated in real time.

111. The apparatus of embodiment 101, wherein a click tracker is a tracking link.

112. The apparatus of embodiment 111, further, comprising:
a visitor profile determining component in the component collection, and
the processor issues instructions from the visitor profile determining component, stored in the memory, to:
generate, via at least one processor, a visitor profile of a visitor who activated the tracking link; and
provide, via at least one processor, the visitor profile to the vendor via a vendor link redirect.

113. The apparatus of embodiment 112, further, comprising:
the processor issues instructions from the visitor profile determining component, stored in the memory, to:
preclude, via at least one processor, the visitor from visiting the vendor based on the visitor profile.

114. The apparatus of embodiment 101, further, comprising:
the processor issues instructions from the campaign controlling component, stored in the memory, to:
calculate, via at least one processor, a negative yield risk associated with the campaign advertising channel.

115. The apparatus of embodiment 114, wherein the budget reallocation method is also based on the respective negative yield risks of advertising channels in the set of campaign advertising channels.

116. A processor-readable crowdfunded campaign control non-transient physical medium storing processor-executable components, the components, comprising:
a component collection stored in the medium, including a campaign controlling component;
wherein the campaign controlling component, stored in the medium, includes processor-issuable instructions to:
obtain, via at least one processor, a campaign control request for a crowdfunded campaign of a vendor,
determine, via at least one processor, an investor commission rate associated with the crowdfunded campaign, wherein the investor commission rate is specified by the vendor,
determine, via at least one processor, a set of campaign advertising channels associated with the crowdfunded campaign;
determine, via at least one processor, an earnings amount associated with a campaign advertising channel in the set of campaign advertising channels based on purchase tracker activations;
calculate, via at least one processor, an investor earnings amount associated with the campaign advertising channel based on the earnings amount and the investor commission rate;
determine, via at least one processor, an advertising cost amount associated with the campaign advertising channel based on click tracker activations;
calculate, via at least one processor, an investor yield associated with the campaign advertising channel based on the investor earnings amount and the advertising cost amount;
determine, via at least one processor, a budget reallocation method associated with the crowdfunded campaign, wherein the budget reallocation method is based on the respective investor yields of advertising channels in the set of campaign advertising channels; and
adjust, via at least one processor, channel advertising budget associated with the campaign advertising channel in accordance with the budget reallocation method.

117. The medium of embodiment 116, wherein the crowdfunded campaign is associated with an expected investor yield, wherein the expected investor yield satisfies a specified minimum investor yield quality metric.

118. The medium of embodiment 117, further, comprising:
a campaign generating component in the component collection;
wherein the campaign generating component, stored in the medium, includes processor-issuable instructions to:
retrieve, via at least one processor, historical campaign data associated with the vendor's previous campaigns;
determine, via at least one processor, an expected campaign earnings amount for the crowdfunded campaign using the historical campaign data;
calculate, via at least one processor, an expected investor earnings amount based on the expected campaign earnings amount and the investor commission rate;
determine, via at least one processor, an expected campaign advertising cost amount for the crowdfunded campaign using the historical campaign data; and
calculate, via at least one processor, the expected investor yield based on the expected investor earnings amount and the expected campaign advertising cost.

119. The medium of embodiment 118, wherein the vendor's previous campaigns include previous crowdfunded campaigns.

120. The medium of embodiment 118, wherein the vendor's previous campaigns include previous vendor funded campaigns.

121. The medium of embodiment 118, wherein the expected campaign earnings amount is calculated based on an average of the historical product EPC amounts for products associated with the crowdfunded campaign.

122. The medium of embodiment 118, wherein the expected campaign advertising cost amount is calculated based on an average of the historical product CPC amounts for products associated with the crowdfunded campaign.

123. The medium of embodiment 116, further, comprising:
a campaign matching component in the component collection;
wherein the campaign matching component, stored in the medium, includes processor-issuable instructions to:
obtain, via at least one processor, a set of search parameters from an investor watching the vendor,
determine, via at least one processor, that the crowdfunded campaign matches the set of search parameters; and provide, via at least one processor, a notification to the investor that the crowdfunded campaign commenced.
124. The medium of embodiment 116, wherein a purchase tracker is a tracking pixel.
125. The medium of embodiment 116, wherein the earnings amount is calculated in real time.
126. The medium of embodiment 116, wherein a click tracker is a tracking link.
127. The medium of embodiment 126, further, comprising:
a visitor profile determining component in the component collection;
wherein the visitor profile determining component, stored in the medium, includes processor-issuable instructions to:
a generate, via at least one processor, a visitor profile of a visitor who activated the tracking link; and
provide, via at least one processor, the visitor profile to the vendor via a vendor link redirect.
128. The medium of embodiment 127, further, comprising:
the visitor profile determining component, stored in the medium, includes processor-issuable instructions to:
preclude, via at least one processor, the visitor from visiting the vendor based on the visitor profile.
129. The medium of embodiment 116, further, comprising:
the campaign controlling component, stored in the medium, includes processor-issuable instructions to:
calculate, via at least one processor, a negative yield risk associated with the campaign advertising channel.
130. The medium of embodiment 129, wherein the budget reallocation method is also based on the respective negative yield risks of advertising channels in the set of campaign advertising channels.
131. A processor-implemented crowdfunded campaign control system, comprising:
a campaign controlling component means, to:
obtain, via at least one processor, a campaign control request for a crowdfunded campaign of a vendor,
determine, via at least one processor, an investor commission rate associated with the crowdfunded campaign, wherein the investor commission rate is specified by the vendor,
determine, via at least one processor, a set of campaign advertising channels associated with the crowdfunded campaign;
determine, via at least one processor, an earnings amount associated with a campaign advertising channel in the set of campaign advertising channels based on purchase tracker activations;
calculate, via at least one processor, an investor earnings amount associated with the campaign advertising channel based on the earnings amount and the investor commission rate;
determine, via at least one processor, an advertising cost amount associated with the campaign advertising channel based on click tracker activations;
calculate, via at least one processor, an investor yield associated with the campaign advertising channel based on the investor earnings amount and the advertising cost amount;
determine, via at least one processor, a budget reallocation method associated with the crowdfunded campaign, wherein the budget reallocation method is based on the respective investor yields of advertising channels in the set of campaign advertising channels; and
adjust, via at least one processor, channel advertising budget associated with the campaign advertising channel in accordance with the budget reallocation method.
132. The system of embodiment 131, wherein the crowdfunded campaign is associated with an expected investor yield, wherein the expected investor yield satisfies a specified minimum investor yield quality metric.
133. The system of embodiment 132, further, comprising:
a campaign generating component means, to:
retrieve, via at least one processor, historical campaign data associated with the vendor's previous campaigns;
determine, via at least one processor, an expected campaign earnings amount for the crowdfunded campaign using the historical campaign data;
calculate, via at least one processor, an expected investor earnings amount based on the expected campaign earnings amount and the investor commission rate;
determine, via at least one processor, an expected campaign advertising cost amount for the crowdfunded campaign using the historical campaign data; and
calculate, via at least one processor, the expected investor yield based on the expected investor earnings amount and the expected campaign advertising cost.
134. The system of embodiment 133, wherein the vendor's previous campaigns include previous crowdfunded campaigns.
135. The system of embodiment 133, wherein the vendor's previous campaigns include previous vendor funded campaigns.
136. The system of embodiment 133, wherein the expected campaign earnings amount is calculated based on an average of the historical product EPC amounts for products associated with the crowdfunded campaign.
137. The system of embodiment 133, wherein the expected campaign advertising cost amount is calculated based on an average of the historical product CPC amounts for products associated with the crowdfunded campaign.
138. The system of embodiment 131, further, comprising:
a campaign matching component means, to:
obtain, via at least one processor, a set of search parameters from an investor watching the vendor,
determine, via at least one processor, that the crowdfunded campaign matches the set of search parameters; and
provide, via at least one processor, a notification to the investor that the crowdfunded campaign commenced.
139. The system of embodiment 131, wherein a purchase tracker is a tracking pixel.
140. The system of embodiment 131, wherein the earnings amount is calculated in real time.
141. The system of embodiment 131, wherein a click tracker is a tracking link.
142. The system of embodiment 141, further, comprising:
a visitor profile determining component means, to:
generate, via at least one processor, a visitor profile of a visitor who activated the tracking link; and
provide, via at least one processor, the visitor profile to the vendor via a vendor link redirect.
143. The system of embodiment 142, further, comprising:
the visitor profile determining component means, to:
preclude, via at least one processor, the visitor from visiting the vendor based on the visitor profile.

144. The system of embodiment 131, further, comprising:
the campaign controlling component means, to:
calculate, via at least one processor, a negative yield risk associated with the campaign advertising channel.
145. The system of embodiment 144, wherein the budget reallocation method is also based on the respective negative yield risks of advertising channels in the set of campaign advertising channels.
146. A processor-implemented crowdfunded campaign control method, comprising:
executing processor-implemented campaign controlling component instructions to:
obtain, via at least one processor, a campaign control request for a crowdfunded campaign of a vendor,
determine, via at least one processor, an investor commission rate associated with the crowdfunded campaign, wherein the investor commission rate is specified by the vendor,
determine, via at least one processor, a set of campaign advertising channels associated with the crowdfunded campaign;
determine, via at least one processor, an earnings amount associated with a campaign advertising channel in the set of campaign advertising channels based on purchase tracker activations;
calculate, via at least one processor, an investor earnings amount associated with the campaign advertising channel based on the earnings amount and the investor commission rate;
determine, via at least one processor, an advertising cost amount associated with the campaign advertising channel based on click tracker activations;
calculate, via at least one processor, an investor yield associated with the campaign advertising channel based on the investor earnings amount and the advertising cost amount;
determine, via at least one processor, a budget reallocation method associated with the crowdfunded campaign, wherein the budget reallocation method is based on the respective investor yields of advertising channels in the set of campaign advertising channels; and
adjust, via at least one processor, channel advertising budget associated with the campaign advertising channel in accordance with the budget reallocation method.
147. The method of embodiment 146, wherein the crowdfunded campaign is associated with an expected investor yield, wherein the expected investor yield satisfies a specified minimum investor yield quality metric.
148. The method of embodiment 147, further, comprising:
executing processor-implemented campaign generating component instructions to:
retrieve, via at least one processor, historical campaign data associated with the vendor's previous campaigns;
determine, via at least one processor, an expected campaign earnings amount for the crowdfunded campaign using the historical campaign data;
calculate, via at least one processor, an expected investor earnings amount based on the expected campaign earnings amount and the investor commission rate;
determine, via at least one processor, an expected campaign advertising cost amount for the crowdfunded campaign using the historical campaign data; and
calculate, via at least one processor, the expected investor yield based on the expected investor earnings amount and the expected campaign advertising cost.
149. The method of embodiment 148, wherein the vendor's previous campaigns include previous crowdfunded campaigns.
150. The method of embodiment 148, wherein the vendor's previous campaigns include previous vendor funded campaigns.
151. The method of embodiment 148, wherein the expected campaign earnings amount is calculated based on an average of the historical product EPC amounts for products associated with the crowdfunded campaign.
152. The method of embodiment 148, wherein the expected campaign advertising cost amount is calculated based on an average of the historical product CPC amounts for products associated with the crowdfunded campaign.
153. The method of embodiment 146, further, comprising:
executing processor-implemented campaign matching component instructions to:
obtain, via at least one processor, a set of search parameters from an investor watching the vendor,
determine, via at least one processor, that the crowdfunded campaign matches the set of search parameters; and
provide, via at least one processor, a notification to the investor that the crowdfunded campaign commenced.
154. The method of embodiment 146, wherein a purchase tracker is a tracking pixel.
155. The method of embodiment 146, wherein the earnings amount is calculated in real time.
156. The method of embodiment 146, wherein a click tracker is a tracking link.
157. The method of embodiment 156, further, comprising:
executing processor-implemented visitor profile determining component instructions to:
generate, via at least one processor, a visitor profile of a visitor who activated the tracking link; and
provide, via at least one processor, the visitor profile to the vendor via a vendor link redirect.
158. The method of embodiment 157, further, comprising:
executing processor-implemented visitor profile determining component instructions to:
preclude, via at least one processor, the visitor from visiting the vendor based on the visitor profile.
159. The method of embodiment 146, further, comprising:
executing processor-implemented campaign controlling component instructions to:
calculate, via at least one processor, a negative yield risk associated with the campaign advertising channel.
160. The method of embodiment 159, wherein the budget reallocation method is also based on the respective negative yield risks of advertising channels in the set of campaign advertising channels.
201. A profile based website configuring apparatus, comprising:
a memory;
a component collection in the memory, including
a visitor profile determining component;
a processor disposed in communication with the memory, and configured to issue a plurality of processing instructions from the component collection stored in the memory, wherein the processor issues instructions from the visitor profile determining component, stored in the memory, to:
  obtain, via at least one processor, a tracking link click request associated with a tracking link from a user,
  determine, via at least one processor, a user identifier associated with the user,
  retrieve, via at least one processor, historical visitor profile data from a database based on the user identifier,
  determine, via at least one processor, current visitor profile data from a tracking cookie associated with the user's client;
  generate, via at least one processor, visitor summary data for the user based on the historical visitor profile data and the current visitor profile data;
  generate, via at least one processor, a visitor profile for the user based on the visitor summary data;
  analyze, via at least one processor, the tracking link to determine a corresponding vendor link of a vendor,
  configure, via at least one processor, the vendor link using the visitor profile; and
  redirect, via at least one processor, the user's client to the configured vendor link, wherein the configured vendor link facilitates configuration of the vendor's website.

202. The apparatus of embodiment 201, wherein the user identifier is determined by generating a fingerprint of the user's client.

203. The apparatus of embodiment 201, wherein the user identifier is determined by retrieving the user identifier from the tracking cookie.

204. The apparatus of embodiment 201, wherein the historical visitor profile data includes any of: purchases data, refunds data, browsing behavior.

205. The apparatus of embodiment 201, wherein the visitor summary data includes a visitor type of the user.

206. The apparatus of embodiment 201, wherein the vendor link is configured to include the visitor profile via a URL query string.

207. The apparatus of embodiment 201, wherein the vendor link is configured such that the user is precluded from visiting the vendor's website.

211. A processor-readable profile based website configuring non-transient physical medium storing processor-executable components, the components, comprising:
a component collection stored in the medium, including
  a visitor profile determining component;
  wherein the visitor profile determining component, stored in the medium, includes processor-issuable instructions to:
    obtain, via at least one processor, a tracking link click request associated with a tracking link from a user,
    determine, via at least one processor, a user identifier associated with the user,
    retrieve, via at least one processor, historical visitor profile data from a database based on the user identifier
    determine, via at least one processor, current visitor profile data from a tracking cookie associated with the user's client;
    generate, via at least one processor, visitor summary data for the user based on the historical visitor profile data and the current visitor profile data;
    generate, via at least one processor, a visitor profile for the user based on the visitor summary data;
    analyze, via at least one processor, the tracking link to determine a corresponding vendor link of a vendor,
    configure, via at least one processor, the vendor link using the visitor profile; and
    redirect, via at least one processor, the user's client to the configured vendor link, wherein the configured vendor link facilitates configuration of the vendor's website.

212. The medium of embodiment 211, wherein the user identifier is determined by generating a fingerprint of the user's client.

213. The medium of embodiment 211, wherein the user identifier is determined by retrieving the user identifier from the tracking cookie.

214. The medium of embodiment 211, wherein the historical visitor profile data includes any of: purchases data, refunds data, browsing behavior.

215. The medium of embodiment 211, wherein the visitor summary data includes a visitor type of the user.

216. The medium of embodiment 211, wherein the vendor link is configured to include the visitor profile via a URL query string.

217. The medium of embodiment 211, wherein the vendor link is configured such that the user is precluded from visiting the vendor's website.

221. A processor-implemented profile based website configuring system, comprising:
  a visitor profile determining component means, to:
    obtain, via at least one processor, a tracking link click request associated with a tracking link from a user,
    determine, via at least one processor, a user identifier associated with the user,
    retrieve, via at least one processor, historical visitor profile data from a database based on the user identifier
    determine, via at least one processor, current visitor profile data from a tracking cookie associated with the user's client;
    generate, via at least one processor, visitor summary data for the user based on the historical visitor profile data and the current visitor profile data;
    generate, via at least one processor, a visitor profile for the user based on the visitor summary data;
    analyze, via at least one processor, the tracking link to determine a corresponding vendor link of a vendor,
    configure, via at least one processor, the vendor link using the visitor profile; and
    redirect, via at least one processor, the user's client to the configured vendor link, wherein the configured vendor link facilitates configuration of the vendor's website.

222. The system of embodiment 221, wherein the user identifier is determined by generating a fingerprint of the user's client.

223. The system of embodiment 221, wherein the user identifier is determined by retrieving the user identifier from the tracking cookie.

224. The system of embodiment 221, wherein the historical visitor profile data includes any of: purchases data, refunds data, browsing behavior.

225. The system of embodiment 221, wherein the visitor summary data includes a visitor type of the user.

226. The system of embodiment 221, wherein the vendor link is configured to include the visitor profile via a URL query string.

227. The system of embodiment 221, wherein the vendor link is configured such that the user is precluded from visiting the vendor's website.

231. A processor-implemented profile based website configuring method, comprising:
executing processor-implemented visitor profile determining component instructions to:
obtain, via at least one processor, a tracking link click request associated with a tracking link from a user,
determine, via at least one processor, a user identifier associated with the user,
retrieve, via at least one processor, historical visitor profile data from a database based on the user identifier
determine, via at least one processor, current visitor profile data from a tracking cookie associated with the user's client;
generate, via at least one processor, visitor summary data for the user based on the historical visitor profile data and the current visitor profile data;
generate, via at least one processor, a visitor profile for the user based on the visitor summary data;
analyze, via at least one processor, the tracking link to determine a corresponding vendor link of a vendor,
configure, via at least one processor, the vendor link using the visitor profile; and
redirect, via at least one processor, the user's client to the configured vendor link, wherein the configured vendor link facilitates configuration of the vendor's website.

232. The method of embodiment 231, wherein the user identifier is determined by generating a fingerprint of the user's client.

233. The method of embodiment 231, wherein the user identifier is determined by retrieving the user identifier from the tracking cookie.

234. The method of embodiment 231, wherein the historical visitor profile data includes any of: purchases data, refunds data, browsing behavior.

235. The method of embodiment 231, wherein the visitor summary data includes a visitor type of the user.

236. The method of embodiment 231, wherein the vendor link is configured to include the visitor profile via a URL query string.

237. The method of embodiment 231, wherein the vendor link is configured such that the user is precluded from visiting the vendor's website.

In order to address various issues and advance the art, the entirety of this application for Crowdsource and Conversational Contextual Information Injection Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CCCII individual and/or enterprise user, database configuration and/or relational model, data type, data transmission and/or network framework, syntax structure, and/or the like, various embodiments of the CCCII, may be implemented that enable a great deal of flexibility and customization. For example, aspects of the CCCII may be adapted for donations, parsing and enriching database and large information store data. While various embodiments and discussions of the CCCII have included parsing and detecting inquiries and data and crowdsourcing, however, it is to be understood that the embodiments described herein may be readily configured and/or customized for a wide variety of other applications and/or implementations.

What is claimed is:

1. A context information injector apparatus, comprising:
a memory;
a component collection in the memory, including:
a tracking link generating component, and
an attribution determining component;
a processor disposed in communication with the memory, and configured to issue a plurality of processing instructions from the component collection stored in the memory, wherein the processor issues instructions from the tracking link generating component, stored in the memory, to:
obtain, via at least one processor, a tracking link request from a source communication channel, wherein the tracking link request includes communication data contents sent from a source user to a receiving user via the source communication channel;
determine, via at least one processor, a match target for the communication data contents;
retrieve, via at least one processor, an attribution link associated with the match target;
generate, via at least one processor, a tracking link configured to identify the source communication channel and the attribution link;
provide, via at least one processor, the tracking link to the source communication channel;
wherein the processor issues instructions from the attribution determining component, stored in the memory, to:
obtain, via at least one processor, a tracking link click request associated with the tracking link from the receiving user;
analyze, via at least one processor, the tracking link to determine the source communication channel and the attribution link;
place, via at least one processor, a tracking cookie on the receiving user's client, wherein the tracking cookie includes information that identifies the source communication channel;
determine, via at least one processor, pixel drop data for a tracking pixel associated with a purchase order page of a vendor associated with the attribution link, wherein information that identifies the source communication channel is obtained from the tracking cookie when the tracking pixel is activated;
configure, via at least one processor, the attribution link using the pixel drop data; and
redirect, via at least one processor, the receiving user's client to the configured attribution link.

2. The apparatus of claim 1, wherein the communication data contents include a URI.

3. The apparatus of claim 1, wherein the communication data contents include at least one of: a text stream, an audio stream, a video stream.

4. The apparatus of claim 1, wherein the match target is a link provided in the communication data contents.

5. The apparatus of claim 1, wherein the match target is a product or service mentioned in the communication data contents.

6. The apparatus of claim 1, further, comprising: the processor issues instructions from the tracking link generating component, stored in the memory, to: determine, via at least one processor, a target merchant platform for the match target; wherein the attribution link associated with the match target is retrieved based on the determined target merchant platform.

7. The apparatus of claim 1, further, comprising: the processor issues instructions from the tracking link generating component, stored in the memory, to: determine, via at least one processor, a match type for the match target, wherein the match type is one of: domain, product; wherein the attribution link associated with the match target is retrieved based on the determined match type.

8. The apparatus of claim 1, wherein the tracking link is configured to also identify the source user, wherein the tracking cookie also includes information that identifies the source user, and wherein information that identifies the source user is also obtained from the tracking cookie when the tracking pixel is activated.

9. The apparatus of claim 1, wherein the pixel drop data includes a URI of the tracking pixel.

10. The apparatus of claim 1, wherein the pixel drop data includes an identifier utilized by a merchant platform to determine a URI of the tracking pixel.

11. The apparatus of claim 1, further, comprising: the processor issues instructions from the attribution determining component, stored in the memory, to: generate, via at least one processor, a fingerprint of the receiving user's client.

12. The apparatus of claim 1, further, comprising: a commission settlement component in the component collection, and the processor issues instructions from the commission settlement component, stored in the memory, to: obtain, via at least one processor, a commission notification associated with a purchase transaction by the receiving user; determine, via at least one processor, a commission amount associated with the purchase transaction; determine, via at least one processor, the source communication channel based on analysis of the commission notification and analysis of stored data obtained as a result of tracking pixel activation; calculate, via at least one processor, a commission allocation for the source communication channel based on the commission amount; and facilitate, via at least one processor, providing the calculated commission allocation to the source communication channel.

13. The apparatus of claim 12, further, comprising: the processor issues instructions from the commission settlement component, stored in the memory, to: determine, via at least one processor, the source user based on analysis of the commission notification and analysis of stored data obtained as a result of tracking pixel activation; calculate, via at least one processor, a commission reward for the source user based on the commission amount; and facilitate, via at least one processor, providing the calculated commission reward to the source user.

14. The apparatus of claim 13, further, comprising: the processor issues instructions from the commission settlement component, stored in the memory, to: determine, via at least one processor, a reward type for the source user; wherein the commission reward for the source user is calculated based on the determined reward type.

15. The apparatus of claim 14, wherein the reward type is one of: currency, points, badges, merchandise.

16. A processor-readable context information injector non-transient physical medium storing processor-executable components, the components, comprising:

a component collection stored in the medium, including:
  a tracking link generating component, and
  an attribution determining component;
    wherein the tracking link generating component, stored in the medium, includes processor-issuable instructions to:
      obtain, via at least one processor, a tracking link request from a source communication channel, wherein the tracking link request includes communication data contents sent from a source user to a receiving user via the source communication channel;
      determine, via at least one processor, a match target for the communication data contents;
      retrieve, via at least one processor, an attribution link associated with the match target;
      generate, via at least one processor, a tracking link configured to identify the source communication channel and the attribution link;
      provide, via at least one processor, the tracking link to the source communication channel;
    wherein the attribution determining component, stored in the medium, includes processor-issuable instructions to:
      obtain, via at least one processor, a tracking link click request associated with the tracking link from the receiving user;
      analyze, via at least one processor, the tracking link to determine the source communication channel and the attribution link;
      place, via at least one processor, a tracking cookie on the receiving user's client, wherein the tracking cookie includes information that identifies the source communication channel;
      determine, via at least one processor, pixel drop data for a tracking pixel associated with a purchase order page of a vendor associated with the attribution link, wherein information that identifies the source communication channel is obtained from the tracking cookie when the tracking pixel is activated;
      configure, via at least one processor, the attribution link using the pixel drop data; and
    redirect, via at least one processor, the receiving user's client to the configured attribution link.

17. A processor-implemented context information injector method, comprising:
  executing processor-implemented tracking link generating component instructions to:
    obtain, via at least one processor, a tracking link request from a source communication channel, wherein the tracking link request includes communication data contents sent from a source user to a receiving user via the source communication channel;
    determine, via at least one processor, a match target for the communication data contents;
    retrieve, via at least one processor, an attribution link associated with the match target;
    generate, via at least one processor, a tracking link configured to identify the source communication channel and the attribution link;
    provide, via at least one processor, the tracking link to the source communication channel; executing processor-implemented attribution determining component instructions to:
    obtain, via at least one processor, a tracking link click request associated with the tracking link from the receiving user;
    analyze, via at least one processor, the tracking link to determine the source communication channel and the attribution link;
    place, via at least one processor, a tracking cookie on the receiving user's client, wherein the tracking cookie includes information that identifies the source communication channel;
    determine, via at least one processor, pixel drop data for a tracking pixel associated with a purchase order page of a vendor associated with the attribution link, wherein information that identifies the source communication channel is obtained from the tracking cookie when the tracking pixel is activated;
    configure, via at least one processor, the attribution link using the pixel drop data; and
  redirect, via at least one processor, the receiving user's client to the configured attribution link.

* * * * *